(12) United States Patent
Liu et al.

(10) Patent No.: US 11,175,880 B2
(45) Date of Patent: Nov. 16, 2021

(54) SYSTEMS AND METHODS FOR VOICE-ASSISTED MEDIA CONTENT SELECTION

(71) Applicant: Sonos, Inc., Santa Barbara, CA (US)

(72) Inventors: Sherwin Liu, Boston, MA (US); Paul Bates, Seattle, WA (US)

(73) Assignee: Sonos, Inc., Santa Barbara, CA (US)

( * ) Notice: Subject to any disclaimer, the term of this patent is extended or adjusted under 35 U.S.C. 154(b) by 24 days.

(21) Appl. No.: 16/109,375

(22) Filed: Aug. 22, 2018

(65) Prior Publication Data

US 2019/0347063 A1    Nov. 14, 2019

Related U.S. Application Data

(60) Provisional application No. 62/669,385, filed on May 10, 2018.

(51) Int. Cl.
| | |
|---|---|
| *G10L 15/30* | (2013.01) |
| *G06F 3/16* | (2006.01) |
| *G10L 15/22* | (2006.01) |

(52) U.S. Cl.
CPC ............. *G06F 3/165* (2013.01); *G06F 3/167* (2013.01); *G10L 15/22* (2013.01); *G10L 15/30* (2013.01);
(Continued)

(58) Field of Classification Search
CPC ....... G10L 15/22; G10L 15/265; G06F 3/167; H04M 2201/40
(Continued)

(56) References Cited

U.S. PATENT DOCUMENTS

| | | |
|---|---|---|
| 4,741,038 A | 4/1988 | Elko et al. |
| 4,941,187 A | 7/1990 | Slater |

(Continued)

FOREIGN PATENT DOCUMENTS

| | | |
|---|---|---|
| AU | 2017100486 A4 | 6/2017 |
| AU | 2017100581 A4 | 6/2017 |

(Continued)

OTHER PUBLICATIONS

US 9,299,346 B1, 03/2016, Hart et al. (withdrawn)
(Continued)

*Primary Examiner* — Jesse S Pullias
(74) *Attorney, Agent, or Firm* — Fortem IP LLP; Matt Lincicum

(57) ABSTRACT

Systems and methods for media playback via a media playback system include (i) capturing a voice input comprising a request for media content, (ii) receiving information derived at least from the request for media content, (iii) requesting and receiving information from at least one remote computing device associated with a first media content service and at least one remote computing device associated with a second media content service, wherein (a) the information identifies first media content available via the first media content service for playback and identifies second media content available via the second media content service for playback, and (b) the first and second media content are related to the requested media content, and (iv) after receiving at least one of the first information and the second information, (a) selecting the first media content instead of the second media content, and (b) playing back the first media content.

19 Claims, 24 Drawing Sheets

(52) U.S. Cl.
CPC .. *G10L 2015/221* (2013.01); *G10L 2015/223* (2013.01)

(58) Field of Classification Search
USPC ........................................................ 704/275
See application file for complete search history.

(56) References Cited

U.S. PATENT DOCUMENTS

| | | | |
|---|---|---|---|
| 4,974,213 A | 11/1990 | Siwecki |
| 5,036,538 A | 7/1991 | Oken et al. |
| 5,440,644 A | 8/1995 | Farinelli et al. |
| 5,588,065 A | 12/1996 | Tanaka et al. |
| 5,740,260 A | 4/1998 | Odom |
| 5,761,320 A | 6/1998 | Farinelli et al. |
| 5,923,902 A | 7/1999 | Inagaki |
| 5,949,414 A | 9/1999 | Namikata et al. |
| 6,032,202 A | 2/2000 | Lea et al. |
| 6,088,459 A | 7/2000 | Hobelsberger |
| 6,256,554 B1 | 7/2001 | DiLorenzo |
| 6,301,603 B1 | 10/2001 | Maher et al. |
| 6,311,157 B1 | 10/2001 | Strong |
| 6,366,886 B1 | 4/2002 | Dragosh et al. |
| 6,404,811 B1 | 6/2002 | Cvetko et al. |
| 6,408,078 B1 | 6/2002 | Hobelsberger |
| 6,469,633 B1 | 10/2002 | Wachter |
| 6,522,886 B1 | 2/2003 | Youngs et al. |
| 6,594,347 B1 | 7/2003 | Calder et al. |
| 6,594,630 B1 | 7/2003 | Zlokarnik et al. |
| 6,611,537 B1 | 8/2003 | Edens et al. |
| 6,611,604 B1 | 8/2003 | Irby et al. |
| 6,631,410 B1 | 10/2003 | Kowalski et al. |
| 6,757,517 B2 | 6/2004 | Chang |
| 6,778,869 B2 | 8/2004 | Champion |
| 6,937,977 B2 | 8/2005 | Gerson |
| 7,099,821 B2 | 8/2006 | Visser et al. |
| 7,103,542 B2 | 9/2006 | Doyle |
| 7,130,608 B2 | 10/2006 | Hollstrom et al. |
| 7,130,616 B2 | 10/2006 | Janik |
| 7,143,939 B2 | 12/2006 | Henzerling |
| 7,174,299 B2 | 2/2007 | Fujii et al. |
| 7,228,275 B1 | 6/2007 | Endo et al. |
| 7,236,773 B2 | 6/2007 | Thomas |
| 7,295,548 B2 | 11/2007 | Blank et al. |
| 7,356,471 B2 | 4/2008 | Ito et al. |
| 7,383,297 B1 | 6/2008 | Atsmon et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,577,757 B2 | 8/2009 | Carter et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,661,107 B1 | 2/2010 | Van Dyke et al. |
| 7,702,508 B2 | 4/2010 | Bennett |
| 7,792,311 B1 | 9/2010 | Holmgren et al. |
| 7,853,341 B2 | 12/2010 | McCarty et al. |
| 7,961,892 B2 | 6/2011 | Fedigan |
| 7,987,294 B2 | 7/2011 | Bryce et al. |
| 8,014,423 B2 | 9/2011 | Thaler et al. |
| 8,019,076 B1 | 9/2011 | Lambert |
| 8,032,383 B1 | 10/2011 | Bhardwaj et al. |
| 8,041,565 B1 | 10/2011 | Bhardwaj et al. |
| 8,045,952 B2 | 10/2011 | Oureshey et al. |
| 8,073,125 B2 | 12/2011 | Zhang et al. |
| 8,073,681 B2 | 12/2011 | Baldwin et al. |
| 8,103,009 B2 | 1/2012 | McCarty et al. |
| 8,136,040 B2 | 3/2012 | Fleming |
| 8,165,867 B1 | 4/2012 | Fish |
| 8,234,395 B2 | 7/2012 | Millington et al. |
| 8,239,206 B1 | 8/2012 | Lebeau et al. |
| 8,255,224 B2 | 8/2012 | Singleton et al. |
| 8,284,982 B2 | 10/2012 | Bailey |
| 8,290,603 B1 | 10/2012 | Lambourne |
| 8,340,975 B1 | 12/2012 | Rosenberger |
| 8,364,481 B2 | 1/2013 | Strope et al. |
| 8,385,557 B2 | 2/2013 | Tashev et al. |
| 8,386,261 B2 | 2/2013 | Mellott et al. |
| 8,386,523 B2 | 2/2013 | Mody et al. |
| 8,423,893 B2 | 4/2013 | Ramsay et al. |
| 8,428,758 B2 | 4/2013 | Naik et al. |
| 8,453,058 B1 | 5/2013 | Coccaro et al. |
| 8,473,618 B2 | 6/2013 | Spear et al. |
| 8,483,853 B1 | 7/2013 | Lambourne |
| 8,484,025 B1 | 7/2013 | Moreno Mengibar et al. |
| 8,588,849 B2 | 11/2013 | Patterson et al. |
| 8,600,443 B2 | 12/2013 | Kawaguchi et al. |
| 8,710,970 B2 | 4/2014 | Oelrich et al. |
| 8,738,925 B1 | 5/2014 | Park et al. |
| 8,775,191 B1 | 7/2014 | Sharifi et al. |
| 8,831,761 B2 | 9/2014 | Kemp et al. |
| 8,831,957 B2 | 9/2014 | Taubman et al. |
| 8,848,879 B1 | 9/2014 | Coughlan et al. |
| 8,861,756 B2 | 10/2014 | Zhu et al. |
| 8,874,448 B1 | 10/2014 | Kauffmann et al. |
| 8,938,394 B1 | 1/2015 | Faaborg et al. |
| 8,942,252 B2 | 1/2015 | Balassanian et al. |
| 8,983,383 B1 | 3/2015 | Haskin |
| 8,983,844 B1 | 3/2015 | Thomas et al. |
| 9,015,049 B2 | 4/2015 | Baldwin et al. |
| 9,042,556 B2 | 5/2015 | Kallai et al. |
| 9,060,224 B1 | 6/2015 | List |
| 9,094,539 B1 | 7/2015 | Noble |
| 9,098,467 B1 | 8/2015 | Blanksteen et al. |
| 9,124,650 B2 | 9/2015 | Maharajh et al. |
| 9,124,711 B2 | 9/2015 | Park et al. |
| 9,148,742 B1 | 9/2015 | Koulomzin et al. |
| 9,190,043 B2 | 11/2015 | Krisch et al. |
| 9,208,785 B2 | 12/2015 | Ben-David et al. |
| 9,215,545 B2 | 12/2015 | Dublin et al. |
| 9,245,527 B2 | 1/2016 | Lindahl |
| 9,251,793 B2 | 2/2016 | Lebeau et al. |
| 9,253,572 B2 | 2/2016 | Beddingfield, Sr. et al. |
| 9,262,612 B2 | 2/2016 | Cheyer |
| 9,263,042 B1 | 2/2016 | Sharifi |
| 9,275,637 B1 | 3/2016 | Salvador et al. |
| 9,288,597 B2 | 3/2016 | Carlsson et al. |
| 9,300,266 B2 | 3/2016 | Grokop |
| 9,304,736 B1 | 4/2016 | Whiteley et al. |
| 9,307,321 B1 | 4/2016 | Unruh |
| 9,318,107 B1 | 4/2016 | Sharifi |
| 9,319,816 B1 | 4/2016 | Narayanan |
| 9,324,322 B1 | 4/2016 | Torok et al. |
| 9,335,819 B1 | 5/2016 | Jaeger et al. |
| 9,361,878 B2 | 6/2016 | Boukadakis |
| 9,368,105 B1 | 6/2016 | Freed et al. |
| 9,373,329 B2 | 6/2016 | Strope et al. |
| 9,374,634 B2 | 6/2016 | Macours |
| 9,386,154 B2 | 7/2016 | Baciu et al. |
| 9,390,708 B1 | 7/2016 | Hoffmeister |
| 9,401,058 B2 | 7/2016 | De La Fuente et al. |
| 9,412,392 B2 | 8/2016 | Lindahl et al. |
| 9,426,567 B2 | 8/2016 | Lee et al. |
| 9,431,021 B1 | 8/2016 | Scalise et al. |
| 9,443,527 B1 | 9/2016 | Watanabe et al. |
| 9,472,201 B1 | 10/2016 | Sleator |
| 9,472,203 B1 | 10/2016 | Ayrapetian et al. |
| 9,484,030 B1 | 11/2016 | Meaney et al. |
| 9,489,948 B1 | 11/2016 | Chu et al. |
| 9,494,683 B1 | 11/2016 | Sadek |
| 9,509,269 B1 | 11/2016 | Rosenberg |
| 9,510,101 B1 | 11/2016 | Polleros |
| 9,514,476 B2 | 12/2016 | Kay et al. |
| 9,514,752 B2 | 12/2016 | Sharifi |
| 9,516,081 B2 | 12/2016 | Tebbs et al. |
| 9,536,541 B2 | 1/2017 | Chen et al. |
| 9,548,053 B1 | 1/2017 | Basye et al. |
| 9,548,066 B2 | 1/2017 | Jain et al. |
| 9,552,816 B2 | 1/2017 | Vanlund et al. |
| 9,554,210 B1 | 1/2017 | Ayrapetian et al. |
| 9,560,441 B1 | 1/2017 | McDonough, Jr. et al. |
| 9,576,591 B2 | 2/2017 | Kim et al. |
| 9,601,116 B2 | 3/2017 | Casado et al. |
| 9,615,170 B2 | 4/2017 | Kirsch et al. |
| 9,615,171 B1 | 4/2017 | O'Neill et al. |

(56) References Cited

U.S. PATENT DOCUMENTS

| | | |
|---|---|---|
| 9,626,695 B2 | 4/2017 | Balasubramanian et al. |
| 9,632,748 B2 | 4/2017 | Faaborg et al. |
| 9,633,186 B2 | 4/2017 | Ingrassia, Jr. et al. |
| 9,633,368 B2 | 4/2017 | Greenzeiger et al. |
| 9,633,660 B2 | 4/2017 | Haughay et al. |
| 9,633,661 B1 | 4/2017 | Typrin et al. |
| 9,633,671 B2 | 4/2017 | Giacobello et al. |
| 9,633,674 B2 | 4/2017 | Sinha et al. |
| 9,640,179 B1 | 5/2017 | Hart et al. |
| 9,640,183 B2 | 5/2017 | Jung et al. |
| 9,641,919 B1 | 5/2017 | Poole et al. |
| 9,646,614 B2 | 5/2017 | Bellegarda et al. |
| 9,648,564 B1 | 5/2017 | Cui et al. |
| 9,653,060 B1 | 5/2017 | Hilmes et al. |
| 9,653,075 B1 | 5/2017 | Chen et al. |
| 9,659,555 B1 | 5/2017 | Hilmes et al. |
| 9,672,821 B2 | 6/2017 | Krishnaswamy et al. |
| 9,685,171 B1 | 6/2017 | Yang |
| 9,691,378 B1 | 6/2017 | Meyers et al. |
| 9,691,379 B1 | 6/2017 | Mathias et al. |
| 9,697,826 B2 | 7/2017 | Sainath et al. |
| 9,697,828 B1 | 7/2017 | Prasad et al. |
| 9,698,999 B2 | 7/2017 | Mutagi et al. |
| 9,704,478 B1 | 7/2017 | Vitaladevuni et al. |
| 9,721,566 B2 | 8/2017 | Newendorp et al. |
| 9,721,568 B1 | 8/2017 | Polansky et al. |
| 9,721,570 B1 | 8/2017 | Beal et al. |
| 9,728,188 B1 | 8/2017 | Rosen et al. |
| 9,734,822 B1 | 8/2017 | Sundaram et al. |
| 9,736,578 B2 | 8/2017 | Iyengar et al. |
| 9,743,204 B1 | 8/2017 | Welch et al. |
| 9,743,207 B1 | 8/2017 | Hartung |
| 9,747,011 B2 | 8/2017 | Lewis et al. |
| 9,747,899 B2 | 8/2017 | Pogue et al. |
| 9,747,920 B2 | 8/2017 | Ayrapetian et al. |
| 9,747,926 B2 | 8/2017 | Sharifi et al. |
| 9,749,760 B2 | 8/2017 | Lambourne |
| 9,754,605 B1 | 9/2017 | Chhetri |
| 9,762,967 B2 | 9/2017 | Clarke et al. |
| 9,769,420 B1 | 9/2017 | Moses |
| 9,779,725 B2 | 10/2017 | Sun et al. |
| 9,779,735 B2 | 10/2017 | Civelli et al. |
| 9,811,314 B2 | 11/2017 | Plagge et al. |
| 9,813,810 B1 | 11/2017 | Nongpiur |
| 9,813,812 B2 | 11/2017 | Berthelsen et al. |
| 9,818,407 B1 | 11/2017 | Secker-Walker |
| 9,820,036 B1 | 11/2017 | Tritschler et al. |
| 9,820,039 B2 | 11/2017 | Lang |
| 9,826,306 B2 | 11/2017 | Lang |
| 9,865,259 B1 | 1/2018 | Typrin et al. |
| 9,865,264 B2 | 1/2018 | Gelfenbeyn et al. |
| 9,881,616 B2 | 1/2018 | Beckley et al. |
| 9,900,723 B1 | 2/2018 | Choisel et al. |
| 9,916,839 B1 | 3/2018 | Scalise et al. |
| 9,947,316 B2 | 4/2018 | Millington et al. |
| 9,947,333 B1 | 4/2018 | David |
| 9,972,318 B1* | 5/2018 | Kelly ................ G10L 15/22 |
| 9,972,343 B1 | 5/2018 | Thorson et al. |
| 9,973,849 B1 | 5/2018 | Zhang et al. |
| 9,979,560 B2 | 5/2018 | Kim et al. |
| 10,013,381 B2 | 7/2018 | Mayman et al. |
| 10,013,995 B1 | 7/2018 | Lashkari et al. |
| 10,026,401 B1 | 7/2018 | Mutagi et al. |
| 10,048,930 B1 | 8/2018 | Vega et al. |
| 10,049,675 B2* | 8/2018 | Haughay ............ G10L 17/08 |
| 10,051,366 B1 | 8/2018 | Buoni et al. |
| 10,051,600 B1 | 8/2018 | Zhong et al. |
| 10,057,698 B2 | 8/2018 | Drinkwater et al. |
| RE47,049 E | 9/2018 | Zhu et al. |
| 10,068,573 B1* | 9/2018 | Aykac ................ G06F 3/165 |
| 10,074,369 B2 | 9/2018 | Devaraj et al. |
| 10,074,371 B1* | 9/2018 | Wang ................ G10L 15/22 |
| 10,079,015 B1 | 9/2018 | Lockhart et al. |
| 10,108,393 B2 | 10/2018 | Millington et al. |
| 10,115,400 B2 | 10/2018 | Wilberding |
| 10,116,748 B2 | 10/2018 | Farmer et al. |
| 10,127,911 B2 | 11/2018 | Kim et al. |
| 10,134,399 B2 | 11/2018 | Lang et al. |
| 10,136,204 B1 | 11/2018 | Poole et al. |
| 10,152,969 B2 | 12/2018 | Reilly et al. |
| 10,181,323 B2 | 1/2019 | Beckhardt et al. |
| 10,186,265 B1 | 1/2019 | Lockhart et al. |
| 10,192,546 B1 | 1/2019 | Piersol et al. |
| 10,224,056 B1 | 3/2019 | Torok et al. |
| 10,225,651 B2 | 3/2019 | Lang |
| 10,248,376 B2 | 4/2019 | Keyser-Allen et al. |
| 10,276,161 B2 | 4/2019 | Hughes et al. |
| 10,297,256 B2 | 5/2019 | Reilly et al. |
| 10,339,917 B2 | 7/2019 | Aleksic et al. |
| 10,346,122 B1 | 7/2019 | Morgan |
| 10,354,650 B2 | 7/2019 | Gruenstein et al. |
| 10,365,887 B1 | 7/2019 | Mulherkar |
| 10,365,889 B2 | 7/2019 | Plagge et al. |
| 10,366,688 B2 | 7/2019 | Gunn et al. |
| 10,366,699 B1 | 7/2019 | Dharia et al. |
| 10,374,816 B1 | 8/2019 | Leblang et al. |
| 10,381,001 B2 | 8/2019 | Gunn et al. |
| 10,381,002 B2 | 8/2019 | Gunn et al. |
| 10,381,003 B2 | 8/2019 | Wakisaka et al. |
| 10,388,272 B1 | 8/2019 | Thomson et al. |
| 10,433,058 B1 | 10/2019 | Torgerson et al. |
| 10,445,057 B2 | 10/2019 | Vega et al. |
| 10,469,966 B2 | 11/2019 | Lambourne |
| 10,499,146 B2 | 12/2019 | Lang et al. |
| 10,510,340 B1 | 12/2019 | Fu et al. |
| 10,511,904 B2 | 12/2019 | Buoni et al. |
| 10,522,146 B1 | 12/2019 | Tushinskiy |
| 10,546,583 B2 | 1/2020 | White et al. |
| 10,573,321 B1 | 2/2020 | Smith et al. |
| 10,586,540 B1 | 3/2020 | Smith et al. |
| 10,599,287 B2 | 3/2020 | Kumar et al. |
| 10,602,268 B1 | 3/2020 | Soto |
| 10,614,807 B2 | 4/2020 | Beckhardt et al. |
| 10,622,009 B1 | 4/2020 | Zhang et al. |
| 10,624,612 B2 | 4/2020 | Sumi et al. |
| 10,645,130 B2 | 5/2020 | Corbin et al. |
| 10,672,383 B1 | 6/2020 | Thomson et al. |
| 10,679,625 B1 | 6/2020 | Lockhart et al. |
| 10,681,460 B2 | 6/2020 | Woo et al. |
| 10,694,608 B2 | 6/2020 | Baker et al. |
| 10,712,997 B2 | 7/2020 | Wilberding et al. |
| 10,740,065 B2 | 8/2020 | Jarvis et al. |
| 10,762,896 B1 | 9/2020 | Yavagal et al. |
| 10,847,143 B2 | 11/2020 | Millington et al. |
| 10,848,885 B2 | 11/2020 | Lambourne |
| RE48,371 E | 12/2020 | Zhu et al. |
| 10,878,811 B2 | 12/2020 | Smith et al. |
| 10,897,679 B2 | 1/2021 | Lambourne |
| 10,943,598 B2 | 3/2021 | Singh et al. |
| 10,971,158 B1 | 4/2021 | Patangay et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0034280 A1 | 3/2002 | Infosino |
| 2002/0046023 A1 | 4/2002 | Fujii et al. |
| 2002/0072816 A1 | 6/2002 | Shdema et al. |
| 2002/0116196 A1 | 8/2002 | Tran |
| 2002/0124097 A1 | 9/2002 | Isely et al. |
| 2003/0015354 A1 | 1/2003 | Edwards et al. |
| 2003/0038848 A1 | 2/2003 | Lee et al. |
| 2003/0040908 A1 | 2/2003 | Yang et al. |
| 2003/0070182 A1 | 4/2003 | Pierre et al. |
| 2003/0070869 A1 | 4/2003 | Hlibowicki |
| 2003/0072462 A1 | 4/2003 | Hlibowicki |
| 2003/0095672 A1 | 5/2003 | Hobelsberger |
| 2003/0130850 A1 | 7/2003 | Badt et al. |
| 2003/0157951 A1 | 8/2003 | Hasty |
| 2003/0235244 A1 | 12/2003 | Pessoa et al. |
| 2004/0024478 A1 | 2/2004 | Hans et al. |
| 2004/0093219 A1 | 5/2004 | Shin et al. |
| 2004/0105566 A1 | 6/2004 | Matsunaga et al. |
| 2004/0127241 A1 | 7/2004 | Shostak |
| 2004/0128135 A1 | 7/2004 | Anastasakos et al. |
| 2004/0234088 A1 | 11/2004 | McCarty et al. |

(56) References Cited

U.S. PATENT DOCUMENTS

| | | |
|---|---|---|
| 2005/0031131 A1 | 2/2005 | Browning et al. |
| 2005/0031132 A1 | 2/2005 | Browning et al. |
| 2005/0031133 A1 | 2/2005 | Browning et al. |
| 2005/0031134 A1 | 2/2005 | Leske |
| 2005/0031137 A1 | 2/2005 | Browning et al. |
| 2005/0031138 A1 | 2/2005 | Browning et al. |
| 2005/0031139 A1 | 2/2005 | Browning et al. |
| 2005/0031140 A1 | 2/2005 | Browning |
| 2005/0047606 A1 | 3/2005 | Lee et al. |
| 2005/0077843 A1 | 4/2005 | Benditt |
| 2005/0164664 A1 | 7/2005 | DiFonzo et al. |
| 2005/0195988 A1 | 9/2005 | Tashev et al. |
| 2005/0201254 A1 | 9/2005 | Looney et al. |
| 2005/0207584 A1 | 9/2005 | Bright |
| 2005/0235334 A1 | 10/2005 | Togashi et al. |
| 2005/0268234 A1 | 12/2005 | Rossi et al. |
| 2005/0283330 A1 | 12/2005 | Laraia et al. |
| 2005/0283475 A1 | 12/2005 | Beranek et al. |
| 2006/0004834 A1 | 1/2006 | Pyhalammi et al. |
| 2006/0023945 A1 | 2/2006 | King et al. |
| 2006/0041431 A1 | 2/2006 | Maes |
| 2006/0093128 A1 | 5/2006 | Oxford |
| 2006/0104451 A1 | 5/2006 | Browning et al. |
| 2006/0147058 A1 | 7/2006 | Wang |
| 2006/0190269 A1 | 8/2006 | Tessel et al. |
| 2006/0190968 A1 | 8/2006 | Jung et al. |
| 2006/0247913 A1 | 11/2006 | Huerta et al. |
| 2006/0262943 A1 | 11/2006 | Oxford |
| 2007/0018844 A1 | 1/2007 | Sutardja |
| 2007/0019815 A1 | 1/2007 | Asada et al. |
| 2007/0033043 A1 | 2/2007 | Hyakumoto |
| 2007/0071206 A1 | 3/2007 | Gainsboro et al. |
| 2007/0071255 A1 | 3/2007 | Schobben |
| 2007/0076131 A1 | 4/2007 | Li et al. |
| 2007/0076906 A1 | 4/2007 | Takagi et al. |
| 2007/0140058 A1 | 6/2007 | McIntosh et al. |
| 2007/0140521 A1 | 6/2007 | Mitobe et al. |
| 2007/0142944 A1 | 6/2007 | Goldberg et al. |
| 2007/0147651 A1 | 6/2007 | Mitobe et al. |
| 2007/0201639 A1 | 8/2007 | Park et al. |
| 2007/0254604 A1 | 11/2007 | Kim |
| 2008/0037814 A1 | 2/2008 | Shau |
| 2008/0090537 A1 | 4/2008 | Sutardja |
| 2008/0090617 A1 | 4/2008 | Sutardja |
| 2008/0146289 A1 | 6/2008 | Korneluk et al. |
| 2008/0182518 A1 | 7/2008 | Lo |
| 2008/0207115 A1 | 8/2008 | Lee et al. |
| 2008/0208594 A1 | 8/2008 | Cross et al. |
| 2008/0221897 A1 | 9/2008 | Cerra et al. |
| 2008/0247530 A1 | 10/2008 | Barton et al. |
| 2008/0248797 A1 | 10/2008 | Freeman et al. |
| 2008/0291896 A1 | 11/2008 | Tuubel et al. |
| 2008/0301729 A1 | 12/2008 | Broos et al. |
| 2009/0003620 A1 | 1/2009 | McKillop et al. |
| 2009/0005893 A1 | 1/2009 | Sugii et al. |
| 2009/0010445 A1 | 1/2009 | Matsuo |
| 2009/0018828 A1 | 1/2009 | Nakadai et al. |
| 2009/0043206 A1 | 2/2009 | Towfiq et al. |
| 2009/0052688 A1 | 2/2009 | Ishibashi et al. |
| 2009/0076821 A1 | 3/2009 | Brenner et al. |
| 2009/0153289 A1 | 6/2009 | Hope et al. |
| 2009/0191854 A1 | 7/2009 | Beason |
| 2009/0197524 A1 | 8/2009 | Haff et al. |
| 2009/0220107 A1 | 9/2009 | Every et al. |
| 2009/0228919 A1 | 9/2009 | Zott et al. |
| 2009/0238377 A1 | 9/2009 | Ramakrishnan et al. |
| 2009/0238386 A1 | 9/2009 | Usher et al. |
| 2009/0248397 A1 | 10/2009 | Garcia et al. |
| 2009/0249222 A1 | 10/2009 | Schmidt et al. |
| 2009/0264072 A1 | 10/2009 | Dai |
| 2009/0323907 A1 | 12/2009 | Gupta et al. |
| 2009/0326949 A1 | 12/2009 | Douthitt et al. |
| 2010/0014690 A1 | 1/2010 | Wolff et al. |
| 2010/0023638 A1 | 1/2010 | Bowman |
| 2010/0035593 A1 | 2/2010 | Franco et al. |
| 2010/0070922 A1 | 3/2010 | DeMaio et al. |
| 2010/0075723 A1 | 3/2010 | Min et al. |
| 2010/0088100 A1 | 4/2010 | Lindahl |
| 2010/0092004 A1 | 4/2010 | Kuze |
| 2010/0161335 A1 | 6/2010 | Whynot |
| 2010/0172516 A1 | 7/2010 | Lastrucci |
| 2010/0178873 A1 | 7/2010 | Lee et al. |
| 2010/0179874 A1 | 7/2010 | Higgins et al. |
| 2010/0185448 A1 | 7/2010 | Meisel |
| 2010/0211199 A1 | 8/2010 | Naik et al. |
| 2011/0033059 A1 | 2/2011 | Bhaskar et al. |
| 2011/0035580 A1 | 2/2011 | Wang et al. |
| 2011/0044461 A1 | 2/2011 | Kuech et al. |
| 2011/0044489 A1 | 2/2011 | Saiki et al. |
| 2011/0066634 A1 | 3/2011 | Phillips et al. |
| 2011/0091055 A1 | 4/2011 | Leblanc |
| 2011/0103615 A1 | 5/2011 | Sun |
| 2011/0145581 A1 | 6/2011 | Malhotra et al. |
| 2011/0170707 A1 | 7/2011 | Yamada et al. |
| 2011/0182436 A1 | 7/2011 | Murgia et al. |
| 2011/0202924 A1 | 8/2011 | Banguero et al. |
| 2011/0218656 A1 | 9/2011 | Bishop et al. |
| 2011/0267985 A1 | 11/2011 | Wilkinson et al. |
| 2011/0276333 A1 | 11/2011 | Wang et al. |
| 2011/0280422 A1 | 11/2011 | Neumeyer et al. |
| 2011/0285808 A1 | 11/2011 | Feng et al. |
| 2011/0289506 A1 | 11/2011 | Trivi et al. |
| 2011/0299706 A1 | 12/2011 | Sakai |
| 2012/0020486 A1 | 1/2012 | Fried et al. |
| 2012/0022863 A1 | 1/2012 | Cho et al. |
| 2012/0022864 A1 | 1/2012 | Leman et al. |
| 2012/0078635 A1 | 3/2012 | Rothkopf et al. |
| 2012/0086568 A1 | 4/2012 | Scott et al. |
| 2012/0123268 A1 | 5/2012 | Tanaka et al. |
| 2012/0128160 A1 | 5/2012 | Kim et al. |
| 2012/0131125 A1 | 5/2012 | Seidel et al. |
| 2012/0148075 A1 | 6/2012 | Goh et al. |
| 2012/0162540 A1 | 6/2012 | Ouchi et al. |
| 2012/0163603 A1 | 6/2012 | Abe et al. |
| 2012/0177215 A1 | 7/2012 | Bose et al. |
| 2012/0183149 A1 | 7/2012 | Hiroe |
| 2012/0224715 A1 | 9/2012 | Kikkeri |
| 2012/0297284 A1 | 11/2012 | Matthews, III et al. |
| 2012/0308044 A1 | 12/2012 | Vander et al. |
| 2012/0308046 A1 | 12/2012 | Muza |
| 2013/0006453 A1 | 1/2013 | Wang et al. |
| 2013/0024018 A1 | 1/2013 | Chang et al. |
| 2013/0034241 A1 | 2/2013 | Pandey et al. |
| 2013/0039527 A1 | 2/2013 | Jensen et al. |
| 2013/0058492 A1 | 3/2013 | Silzle et al. |
| 2013/0066453 A1 | 3/2013 | Seefeldt |
| 2013/0080146 A1 | 3/2013 | Kato et al. |
| 2013/0124211 A1 | 5/2013 | McDonough |
| 2013/0148821 A1 | 6/2013 | Sorensen |
| 2013/0170647 A1 | 7/2013 | Reilly et al. |
| 2013/0179173 A1 | 7/2013 | Lee et al. |
| 2013/0183944 A1 | 7/2013 | Mozer et al. |
| 2013/0191119 A1 | 7/2013 | Sugiyama |
| 2013/0191122 A1 | 7/2013 | Mason |
| 2013/0198298 A1 | 8/2013 | Li et al. |
| 2013/0211826 A1 | 8/2013 | Mannby |
| 2013/0216056 A1 | 8/2013 | Thyssen |
| 2013/0262101 A1 | 10/2013 | Srinivasan |
| 2013/0315420 A1 | 11/2013 | You |
| 2013/0317635 A1 | 11/2013 | Bates et al. |
| 2013/0322462 A1 | 12/2013 | Poulsen |
| 2013/0322665 A1 | 12/2013 | Bennett et al. |
| 2013/0324031 A1 | 12/2013 | Loureiro |
| 2013/0329896 A1 | 12/2013 | Krishnaswamy et al. |
| 2013/0331970 A1 | 12/2013 | Beckhardt et al. |
| 2013/0332165 A1 | 12/2013 | Beckley et al. |
| 2013/0339028 A1 | 12/2013 | Rosner et al. |
| 2013/0343567 A1 | 12/2013 | Triplett et al. |
| 2014/0003611 A1 | 1/2014 | Mohammad et al. |
| 2014/0003625 A1 | 1/2014 | Sheen et al. |
| 2014/0003635 A1 | 1/2014 | Mohammad et al. |
| 2014/0005813 A1 | 1/2014 | Reimann |
| 2014/0006026 A1 | 1/2014 | Lamb et al. |
| 2014/0006825 A1 | 1/2014 | Shenhav |

(56) References Cited

U.S. PATENT DOCUMENTS

| | | |
|---|---|---|
| 2014/0019743 A1 | 1/2014 | DeLuca |
| 2014/0034929 A1 | 2/2014 | Hamada et al. |
| 2014/0046464 A1 | 2/2014 | Reimann |
| 2014/0064501 A1 | 3/2014 | Olsen et al. |
| 2014/0073298 A1 | 3/2014 | Rossmann |
| 2014/0075306 A1 | 3/2014 | Rega |
| 2014/0075311 A1 | 3/2014 | Boettcher et al. |
| 2014/0094151 A1 | 4/2014 | Klappert et al. |
| 2014/0100854 A1 | 4/2014 | Chen et al. |
| 2014/0109138 A1 | 4/2014 | Cannistraro et al. |
| 2014/0122075 A1 | 5/2014 | Bak et al. |
| 2014/0136195 A1 | 5/2014 | Abdossalami et al. |
| 2014/0145168 A1 | 5/2014 | Ohsawa et al. |
| 2014/0146983 A1 | 5/2014 | Kim et al. |
| 2014/0163978 A1 | 6/2014 | Basye et al. |
| 2014/0164400 A1 | 6/2014 | Kruglick |
| 2014/0167931 A1 | 6/2014 | Lee et al. |
| 2014/0168344 A1 | 6/2014 | Shoemake et al. |
| 2014/0172953 A1 | 6/2014 | Blanksteen |
| 2014/0181271 A1 | 6/2014 | Millington |
| 2014/0192986 A1 | 7/2014 | Lee et al. |
| 2014/0195252 A1 | 7/2014 | Gruber et al. |
| 2014/0207457 A1 | 7/2014 | Biatov et al. |
| 2014/0214429 A1 | 7/2014 | Pantel |
| 2014/0215332 A1 | 7/2014 | Lee et al. |
| 2014/0219472 A1 | 8/2014 | Huang et al. |
| 2014/0222436 A1 | 8/2014 | Binder et al. |
| 2014/0229184 A1 | 8/2014 | Shires |
| 2014/0244013 A1 | 8/2014 | Reilly |
| 2014/0244712 A1 | 8/2014 | Walters et al. |
| 2014/0249817 A1 | 9/2014 | Hart et al. |
| 2014/0252386 A1 | 9/2014 | Ito et al. |
| 2014/0254805 A1 | 9/2014 | Su et al. |
| 2014/0258292 A1 | 9/2014 | Thramann |
| 2014/0259075 A1 | 9/2014 | Chang et al. |
| 2014/0269757 A1 | 9/2014 | Park et al. |
| 2014/0270282 A1 | 9/2014 | Tammi et al. |
| 2014/0274185 A1 | 9/2014 | Luna et al. |
| 2014/0274203 A1 | 9/2014 | Ganong, III et al. |
| 2014/0274218 A1 | 9/2014 | Kadiwala et al. |
| 2014/0277650 A1 | 9/2014 | Zurek et al. |
| 2014/0291642 A1 | 10/2014 | Watabe et al. |
| 2014/0310002 A1 | 10/2014 | Nitz et al. |
| 2014/0310614 A1 | 10/2014 | Jones |
| 2014/0340888 A1 | 11/2014 | Ishisone et al. |
| 2014/0357248 A1 | 12/2014 | Tonshal et al. |
| 2014/0363022 A1 | 12/2014 | Dizon et al. |
| 2014/0363024 A1 | 12/2014 | Apodaca |
| 2014/0365227 A1 | 12/2014 | Cash et al. |
| 2014/0369491 A1 | 12/2014 | Kloberdans et al. |
| 2014/0372109 A1 | 12/2014 | Iyer et al. |
| 2015/0006176 A1 | 1/2015 | Pogue et al. |
| 2015/0006184 A1 | 1/2015 | Marti et al. |
| 2015/0010169 A1 | 1/2015 | Popova et al. |
| 2015/0014680 A1 | 1/2015 | Yamazaki et al. |
| 2015/0016642 A1 | 1/2015 | Walsh et al. |
| 2015/0018992 A1 | 1/2015 | Griffiths et al. |
| 2015/0019201 A1 | 1/2015 | Schoenbach |
| 2015/0019219 A1 | 1/2015 | Tzirkel-Hancock et al. |
| 2015/0036831 A1 | 2/2015 | Klippel |
| 2015/0039303 A1 | 2/2015 | Lesso et al. |
| 2015/0063580 A1 | 3/2015 | Huang et al. |
| 2015/0086034 A1 | 3/2015 | Lombardi et al. |
| 2015/0091709 A1 | 4/2015 | Reichert et al. |
| 2015/0092947 A1 | 4/2015 | Gossain et al. |
| 2015/0104037 A1 | 4/2015 | Lee et al. |
| 2015/0106085 A1 | 4/2015 | Lindahl |
| 2015/0110294 A1 | 4/2015 | Chen et al. |
| 2015/0112672 A1 | 4/2015 | Giacobello et al. |
| 2015/0124975 A1 | 5/2015 | Pontoppidan |
| 2015/0128065 A1 | 5/2015 | Torii et al. |
| 2015/0134456 A1 | 5/2015 | Baldwin |
| 2015/0154976 A1 | 6/2015 | Mutagi |
| 2015/0161990 A1 | 6/2015 | Sharifi |
| 2015/0169279 A1 | 6/2015 | Duga |
| 2015/0170645 A1 | 6/2015 | Di et al. |
| 2015/0172843 A1 | 6/2015 | Quan |
| 2015/0179181 A1 | 6/2015 | Morris et al. |
| 2015/0180432 A1 | 6/2015 | Gao et al. |
| 2015/0181318 A1 | 6/2015 | Gautama et al. |
| 2015/0189438 A1 | 7/2015 | Hampiholi et al. |
| 2015/0200454 A1 | 7/2015 | Heusdens et al. |
| 2015/0201271 A1 | 7/2015 | Diethorn et al. |
| 2015/0221678 A1 | 8/2015 | Yamazaki et al. |
| 2015/0222563 A1 | 8/2015 | Burns et al. |
| 2015/0222987 A1 | 8/2015 | Angel, Jr. et al. |
| 2015/0228274 A1 | 8/2015 | Leppänen et al. |
| 2015/0228803 A1 | 8/2015 | Koezuka et al. |
| 2015/0237406 A1 | 8/2015 | Ochoa et al. |
| 2015/0243287 A1 | 8/2015 | Nakano et al. |
| 2015/0245152 A1 | 8/2015 | Ding et al. |
| 2015/0245154 A1 | 8/2015 | Dadu et al. |
| 2015/0249889 A1 | 9/2015 | Iyer et al. |
| 2015/0253292 A1 | 9/2015 | Larkin et al. |
| 2015/0253960 A1 | 9/2015 | Lin et al. |
| 2015/0254057 A1 | 9/2015 | Klein et al. |
| 2015/0263174 A1 | 9/2015 | Yamazaki et al. |
| 2015/0271593 A1 | 9/2015 | Sun et al. |
| 2015/0277846 A1 | 10/2015 | Yen et al. |
| 2015/0280676 A1 | 10/2015 | Holman et al. |
| 2015/0296299 A1 | 10/2015 | Klippel et al. |
| 2015/0302856 A1 | 10/2015 | Kim et al. |
| 2015/0319529 A1 | 11/2015 | Klippel |
| 2015/0325267 A1 | 11/2015 | Lee et al. |
| 2015/0331663 A1 | 11/2015 | Beckhardt et al. |
| 2015/0334471 A1 | 11/2015 | Innes et al. |
| 2015/0338917 A1 | 11/2015 | Steiner et al. |
| 2015/0341406 A1 | 11/2015 | Rockefeller et al. |
| 2015/0346845 A1 | 12/2015 | Di et al. |
| 2015/0348548 A1 | 12/2015 | Piernot et al. |
| 2015/0348551 A1 | 12/2015 | Gruber et al. |
| 2015/0355878 A1 | 12/2015 | Corbin |
| 2015/0363061 A1 | 12/2015 | De, III et al. |
| 2015/0363401 A1 | 12/2015 | Chen et al. |
| 2015/0370531 A1 | 12/2015 | Faaborg |
| 2015/0371657 A1 | 12/2015 | Gao et al. |
| 2015/0371659 A1 | 12/2015 | Gao |
| 2015/0371664 A1 | 12/2015 | Bar-Or et al. |
| 2015/0380010 A1 | 12/2015 | Srinivasan et al. |
| 2015/0382047 A1 | 12/2015 | Van Os et al. |
| 2016/0007116 A1 | 1/2016 | Holman |
| 2016/0021458 A1 | 1/2016 | Johnson et al. |
| 2016/0026428 A1 | 1/2016 | Morganstern et al. |
| 2016/0029142 A1 | 1/2016 | Isaac et al. |
| 2016/0035321 A1 | 2/2016 | Cho et al. |
| 2016/0036962 A1 | 2/2016 | Rand et al. |
| 2016/0042748 A1 | 2/2016 | Jain et al. |
| 2016/0044151 A1 | 2/2016 | Shoemaker et al. |
| 2016/0050488 A1 | 2/2016 | Matheja et al. |
| 2016/0057522 A1 | 2/2016 | Choisel et al. |
| 2016/0072804 A1 | 3/2016 | Chien et al. |
| 2016/0077710 A1 | 3/2016 | Lewis et al. |
| 2016/0086609 A1 | 3/2016 | Yue et al. |
| 2016/0088392 A1 | 3/2016 | Huttunen et al. |
| 2016/0093304 A1 | 3/2016 | Kim et al. |
| 2016/0094718 A1 | 3/2016 | Mani et al. |
| 2016/0094917 A1 | 3/2016 | Wilk et al. |
| 2016/0098393 A1 | 4/2016 | Hebert |
| 2016/0098992 A1 | 4/2016 | Renard et al. |
| 2016/0103653 A1 | 4/2016 | Jang |
| 2016/0104480 A1 | 4/2016 | Sharifi |
| 2016/0111110 A1 | 4/2016 | Gautama et al. |
| 2016/0125876 A1 | 5/2016 | Schroeter et al. |
| 2016/0127780 A1 | 5/2016 | Roberts et al. |
| 2016/0133259 A1 | 5/2016 | Rubin et al. |
| 2016/0134966 A1 | 5/2016 | Fitzgerald et al. |
| 2016/0134982 A1 | 5/2016 | Iyer |
| 2016/0154089 A1 | 6/2016 | Altman |
| 2016/0155442 A1 | 6/2016 | Kannan et al. |
| 2016/0155443 A1 | 6/2016 | Khan et al. |
| 2016/0157035 A1 | 6/2016 | Russell et al. |
| 2016/0162469 A1 | 6/2016 | Santos |
| 2016/0171976 A1 | 6/2016 | Sun et al. |
| 2016/0173578 A1 | 6/2016 | Sharma et al. |

(56) References Cited

U.S. PATENT DOCUMENTS

| | | |
|---|---|---|
| 2016/0173983 A1 | 6/2016 | Berthelsen et al. |
| 2016/0180853 A1 | 6/2016 | Vanlund et al. |
| 2016/0189716 A1 | 6/2016 | Lindahl et al. |
| 2016/0196499 A1 | 7/2016 | Khan et al. |
| 2016/0203331 A1 | 7/2016 | Khan et al. |
| 2016/0210110 A1 | 7/2016 | Feldman |
| 2016/0212538 A1 | 7/2016 | Fullam et al. |
| 2016/0216938 A1 | 7/2016 | Millington |
| 2016/0225385 A1 | 8/2016 | Hammarqvist |
| 2016/0232451 A1 | 8/2016 | Scherzer |
| 2016/0234204 A1 | 8/2016 | Rishi et al. |
| 2016/0234615 A1 | 8/2016 | Lambourne |
| 2016/0239255 A1 | 8/2016 | Chavez et al. |
| 2016/0240192 A1 | 8/2016 | Raghuvir |
| 2016/0241976 A1 | 8/2016 | Pearson |
| 2016/0253050 A1 | 9/2016 | Mishra et al. |
| 2016/0260431 A1 | 9/2016 | Newendorp et al. |
| 2016/0283841 A1 | 9/2016 | Sainath et al. |
| 2016/0302018 A1 | 10/2016 | Russell et al. |
| 2016/0314782 A1 | 10/2016 | Klimanis |
| 2016/0316293 A1 | 10/2016 | Klimanis |
| 2016/0322045 A1 | 11/2016 | Hatfield et al. |
| 2016/0336519 A1 | 11/2016 | Seo et al. |
| 2016/0343866 A1 | 11/2016 | Koezuka et al. |
| 2016/0343949 A1 | 11/2016 | Seo et al. |
| 2016/0343954 A1 | 11/2016 | Seo et al. |
| 2016/0345114 A1 | 11/2016 | Hanna et al. |
| 2016/0352915 A1 | 12/2016 | Gautama |
| 2016/0353217 A1 | 12/2016 | Starobin et al. |
| 2016/0353218 A1 | 12/2016 | Starobin et al. |
| 2016/0357503 A1 | 12/2016 | Triplett et al. |
| 2016/0364206 A1 | 12/2016 | Keyser-Allen et al. |
| 2016/0366515 A1 | 12/2016 | Mendes et al. |
| 2016/0372688 A1 | 12/2016 | Seo et al. |
| 2016/0373269 A1 | 12/2016 | Okubo et al. |
| 2016/0373909 A1 | 12/2016 | Rasmussen et al. |
| 2016/0379634 A1 | 12/2016 | Yamamoto et al. |
| 2017/0003931 A1 | 1/2017 | Dvortsov et al. |
| 2017/0012207 A1 | 1/2017 | Seo et al. |
| 2017/0012232 A1 | 1/2017 | Kataishi et al. |
| 2017/0019732 A1 | 1/2017 | Mendes et al. |
| 2017/0025615 A1 | 1/2017 | Seo et al. |
| 2017/0025630 A1 | 1/2017 | Seo et al. |
| 2017/0026769 A1 | 1/2017 | Patel |
| 2017/0034263 A1 | 2/2017 | Archambault et al. |
| 2017/0039025 A1 | 2/2017 | Kielak |
| 2017/0040018 A1* | 2/2017 | Tormey ............... H04L 12/4633 |
| 2017/0041724 A1 | 2/2017 | Master et al. |
| 2017/0060526 A1 | 3/2017 | Barton et al. |
| 2017/0062734 A1 | 3/2017 | Suzuki et al. |
| 2017/0070478 A1 | 3/2017 | Park et al. |
| 2017/0076212 A1 | 3/2017 | Shams et al. |
| 2017/0076720 A1 | 3/2017 | Gopalan et al. |
| 2017/0078824 A1 | 3/2017 | Heo |
| 2017/0083285 A1 | 3/2017 | Meyers et al. |
| 2017/0084277 A1 | 3/2017 | Sharifi |
| 2017/0084292 A1 | 3/2017 | Yoo |
| 2017/0084295 A1 | 3/2017 | Tsiartas et al. |
| 2017/0090864 A1 | 3/2017 | Jorgovanovic |
| 2017/0092278 A1 | 3/2017 | Evermann et al. |
| 2017/0092297 A1 | 3/2017 | Sainath et al. |
| 2017/0092299 A1 | 3/2017 | Matsuo |
| 2017/0092889 A1 | 3/2017 | Seo et al. |
| 2017/0092890 A1 | 3/2017 | Seo et al. |
| 2017/0094215 A1 | 3/2017 | Western |
| 2017/0103754 A1 | 4/2017 | Higbie et al. |
| 2017/0103755 A1 | 4/2017 | Jeon et al. |
| 2017/0110124 A1 | 4/2017 | Boesen et al. |
| 2017/0110144 A1 | 4/2017 | Sharifi et al. |
| 2017/0117497 A1 | 4/2017 | Seo et al. |
| 2017/0123251 A1 | 5/2017 | Nakada et al. |
| 2017/0125037 A1 | 5/2017 | Shin |
| 2017/0125456 A1 | 5/2017 | Kasahara |
| 2017/0133007 A1 | 5/2017 | Drewes |
| 2017/0133011 A1 | 5/2017 | Chen et al. |
| 2017/0134872 A1 | 5/2017 | Silva et al. |
| 2017/0139720 A1 | 5/2017 | Stein |
| 2017/0140449 A1 | 5/2017 | Kannan |
| 2017/0140748 A1 | 5/2017 | Roberts et al. |
| 2017/0140759 A1 | 5/2017 | Kumar et al. |
| 2017/0177585 A1 | 6/2017 | Rodger et al. |
| 2017/0178662 A1 | 6/2017 | Ayrapetian et al. |
| 2017/0180561 A1 | 6/2017 | Kadiwala et al. |
| 2017/0188150 A1 | 6/2017 | Brunet et al. |
| 2017/0188437 A1 | 6/2017 | Banta |
| 2017/0193999 A1 | 7/2017 | Aleksic et al. |
| 2017/0206896 A1 | 7/2017 | Ko et al. |
| 2017/0206900 A1 | 7/2017 | Lee et al. |
| 2017/0214996 A1 | 7/2017 | Yeo |
| 2017/0236512 A1 | 8/2017 | Williams et al. |
| 2017/0236515 A1 | 8/2017 | Pinsky et al. |
| 2017/0242649 A1 | 8/2017 | Jarvis et al. |
| 2017/0242651 A1 | 8/2017 | Lang et al. |
| 2017/0242653 A1 | 8/2017 | Lang et al. |
| 2017/0242657 A1 | 8/2017 | Jarvis et al. |
| 2017/0243576 A1 | 8/2017 | Millington et al. |
| 2017/0243587 A1 | 8/2017 | Plagge et al. |
| 2017/0245076 A1 | 8/2017 | Kusano et al. |
| 2017/0255612 A1 | 9/2017 | Kaya et al. |
| 2017/0257686 A1 | 9/2017 | Gautama et al. |
| 2017/0270919 A1 | 9/2017 | Parthasarathi et al. |
| 2017/0278512 A1 | 9/2017 | Pandya et al. |
| 2017/0287485 A1 | 10/2017 | Civelli et al. |
| 2017/0330565 A1 | 11/2017 | Daley et al. |
| 2017/0332168 A1 | 11/2017 | Moghimi et al. |
| 2017/0346872 A1 | 11/2017 | Naik et al. |
| 2017/0352357 A1 | 12/2017 | Fink |
| 2017/0353789 A1 | 12/2017 | Kim et al. |
| 2017/0357475 A1 | 12/2017 | Lee et al. |
| 2017/0357478 A1 | 12/2017 | Piersol et al. |
| 2017/0366393 A1 | 12/2017 | Shaker et al. |
| 2017/0374454 A1 | 12/2017 | Bernardini et al. |
| 2018/0018964 A1 | 1/2018 | Reilly et al. |
| 2018/0018967 A1 | 1/2018 | Lang et al. |
| 2018/0020306 A1 | 1/2018 | Sheen |
| 2018/0025733 A1 | 1/2018 | Qian et al. |
| 2018/0033428 A1 | 2/2018 | Kim et al. |
| 2018/0040324 A1 | 2/2018 | Wilberding |
| 2018/0047394 A1 | 2/2018 | Tian et al. |
| 2018/0053504 A1 | 2/2018 | Wang et al. |
| 2018/0054506 A1 | 2/2018 | Hart et al. |
| 2018/0061396 A1 | 3/2018 | Srinivasan et al. |
| 2018/0061402 A1 | 3/2018 | Devaraj et al. |
| 2018/0061404 A1 | 3/2018 | Devaraj et al. |
| 2018/0061419 A1 | 3/2018 | Melendo Casado et al. |
| 2018/0061420 A1 | 3/2018 | Patil et al. |
| 2018/0062871 A1 | 3/2018 | Jones et al. |
| 2018/0084367 A1 | 3/2018 | Greff et al. |
| 2018/0088900 A1 | 3/2018 | Glaser et al. |
| 2018/0091898 A1 | 3/2018 | Yoon et al. |
| 2018/0091913 A1 | 3/2018 | Hartung et al. |
| 2018/0096683 A1 | 4/2018 | James et al. |
| 2018/0096696 A1 | 4/2018 | Mixter |
| 2018/0107446 A1 | 4/2018 | Wilberding et al. |
| 2018/0108351 A1 | 4/2018 | Beckhardt et al. |
| 2018/0122372 A1 | 5/2018 | Wanderlust |
| 2018/0122378 A1 | 5/2018 | Mixter et al. |
| 2018/0130469 A1 | 5/2018 | Gruenstein et al. |
| 2018/0132217 A1 | 5/2018 | Stirling-Gallacher |
| 2018/0132298 A1 | 5/2018 | Birnam et al. |
| 2018/0137861 A1 | 5/2018 | Ogawa |
| 2018/0165055 A1 | 6/2018 | Yu et al. |
| 2018/0167981 A1 | 6/2018 | Jonna et al. |
| 2018/0174597 A1 | 6/2018 | Lee et al. |
| 2018/0182390 A1 | 6/2018 | Hughes et al. |
| 2018/0190285 A1 | 7/2018 | Heckman et al. |
| 2018/0197533 A1 | 7/2018 | Lyon et al. |
| 2018/0199146 A1 | 7/2018 | Sheen |
| 2018/0204569 A1 | 7/2018 | Nadkar et al. |
| 2018/0205963 A1 | 7/2018 | Matei et al. |
| 2018/0210698 A1 | 7/2018 | Park et al. |
| 2018/0218747 A1 | 8/2018 | Moghimi et al. |
| 2018/0219976 A1 | 8/2018 | Decenzo et al. |
| 2018/0225933 A1 | 8/2018 | Park et al. |

(56) References Cited

U.S. PATENT DOCUMENTS

| | | |
|---|---|---|
| 2018/0228006 A1 | 8/2018 | Baker et al. |
| 2018/0233136 A1 | 8/2018 | Torok et al. |
| 2018/0233137 A1 | 8/2018 | Torok et al. |
| 2018/0233139 A1 | 8/2018 | Finkelstein et al. |
| 2018/0234765 A1 | 8/2018 | Torok et al. |
| 2018/0262793 A1 | 9/2018 | Lau et al. |
| 2018/0262831 A1 | 9/2018 | Matheja et al. |
| 2018/0270565 A1 | 9/2018 | Ganeshkumar |
| 2018/0277107 A1 | 9/2018 | Kim |
| 2018/0277113 A1 | 9/2018 | Hartung et al. |
| 2018/0277119 A1 | 9/2018 | Baba et al. |
| 2018/0277133 A1 | 9/2018 | Deetz et al. |
| 2018/0293484 A1 | 10/2018 | Wang et al. |
| 2018/0308470 A1 | 10/2018 | Park et al. |
| 2018/0314552 A1 | 11/2018 | Kim et al. |
| 2018/0324756 A1 | 11/2018 | Ryu et al. |
| 2018/0335903 A1 | 11/2018 | Coffman et al. |
| 2018/0336274 A1 | 11/2018 | Choudhury et al. |
| 2018/0358009 A1 | 12/2018 | Daley et al. |
| 2018/0365567 A1* | 12/2018 | Kolavennu ............ G06N 5/022 |
| 2018/0367944 A1 | 12/2018 | Heo et al. |
| 2019/0012141 A1 | 1/2019 | Piersol et al. |
| 2019/0013019 A1 | 1/2019 | Lawrence |
| 2019/0014592 A1 | 1/2019 | Hampel et al. |
| 2019/0033446 A1 | 1/2019 | Bultan et al. |
| 2019/0042187 A1 | 2/2019 | Truong et al. |
| 2019/0043492 A1 | 2/2019 | Lang |
| 2019/0066672 A1 | 2/2019 | Wood et al. |
| 2019/0074025 A1 | 3/2019 | Lashkari et al. |
| 2019/0079724 A1 | 3/2019 | Feuz et al. |
| 2019/0081507 A1 | 3/2019 | Ide |
| 2019/0082255 A1 | 3/2019 | Tajiri et al. |
| 2019/0088261 A1 | 3/2019 | Lang et al. |
| 2019/0090056 A1 | 3/2019 | Rexach et al. |
| 2019/0098400 A1 | 3/2019 | Buoni et al. |
| 2019/0104119 A1 | 4/2019 | Giorgi et al. |
| 2019/0104373 A1 | 4/2019 | Wodrich et al. |
| 2019/0108839 A1 | 4/2019 | Reilly et al. |
| 2019/0115011 A1 | 4/2019 | Khellah et al. |
| 2019/0130906 A1 | 5/2019 | Kobayashi et al. |
| 2019/0163153 A1 | 5/2019 | Price et al. |
| 2019/0172452 A1 | 6/2019 | Smith et al. |
| 2019/0173687 A1 | 6/2019 | Mackay et al. |
| 2019/0179607 A1 | 6/2019 | Thangarathnam et al. |
| 2019/0179611 A1 | 6/2019 | Wojogbe et al. |
| 2019/0182072 A1 | 6/2019 | Roe et al. |
| 2019/0206412 A1 | 7/2019 | Li et al. |
| 2019/0220246 A1 | 7/2019 | Orr et al. |
| 2019/0237067 A1 | 8/2019 | Friedman et al. |
| 2019/0239008 A1 | 8/2019 | Lambourne |
| 2019/0239009 A1 | 8/2019 | Lambourne |
| 2019/0243603 A1 | 8/2019 | Keyser-Allen et al. |
| 2019/0243606 A1 | 8/2019 | Jayakumar et al. |
| 2019/0281397 A1 | 9/2019 | Lambourne |
| 2019/0287546 A1 | 9/2019 | Kumar |
| 2019/0295563 A1 | 9/2019 | Kamdar et al. |
| 2019/0297388 A1 | 9/2019 | Panchaksharaiah et al. |
| 2019/0304443 A1 | 10/2019 | Bhagwan |
| 2019/0311710 A1 | 10/2019 | Eraslan et al. |
| 2019/0311712 A1 | 10/2019 | Firik et al. |
| 2019/0311720 A1 | 10/2019 | Pasko |
| 2019/0317606 A1 | 10/2019 | Jain et al. |
| 2019/0342962 A1 | 11/2019 | Chang et al. |
| 2019/0364375 A1 | 11/2019 | Soto et al. |
| 2020/0007987 A1 | 1/2020 | Woo et al. |
| 2020/0034492 A1 | 1/2020 | Verbeke et al. |
| 2020/0051554 A1 | 2/2020 | Kim et al. |
| 2020/0092687 A1 | 3/2020 | Devaraj et al. |
| 2020/0105256 A1 | 4/2020 | Fainberg et al. |
| 2020/0175989 A1 | 6/2020 | Lockhart et al. |
| 2020/0184980 A1 | 6/2020 | Wilberding |
| 2020/0193973 A1 | 6/2020 | Tolomei et al. |
| 2020/0211556 A1 | 7/2020 | Mixter et al. |
| 2020/0213729 A1 | 7/2020 | Soto |
| 2020/0216089 A1 | 7/2020 | Garcia et al. |
| 2020/0336846 A1 | 10/2020 | Rohde et al. |
| 2020/0395006 A1 | 12/2020 | Smith et al. |
| 2020/0395010 A1 | 12/2020 | Smith et al. |
| 2020/0395013 A1 | 12/2020 | Smith et al. |
| 2020/0409652 A1 | 12/2020 | Wilberding et al. |
| 2021/0035561 A1 | 2/2021 | D'Amato et al. |
| 2021/0035572 A1 | 2/2021 | D'Amato et al. |
| 2021/0118429 A1 | 4/2021 | Shan |

FOREIGN PATENT DOCUMENTS

| | | |
|---|---|---|
| CN | 101310558 A | 11/2008 |
| CN | 101480039 A | 7/2009 |
| CN | 101661753 A | 3/2010 |
| CN | 101686282 A | 3/2010 |
| CN | 101907983 A | 12/2010 |
| CN | 102123188 A | 7/2011 |
| CN | 102256098 A | 11/2011 |
| CN | 102567468 A | 7/2012 |
| CN | 103052001 A | 4/2013 |
| CN | 103181192 A | 6/2013 |
| CN | 103210663 A | 7/2013 |
| CN | 103546616 A | 1/2014 |
| CN | 103811007 A | 5/2014 |
| CN | 104010251 A | 8/2014 |
| CN | 104035743 A | 9/2014 |
| CN | 104053088 A | 9/2014 |
| CN | 104092936 A | 10/2014 |
| CN | 104104769 A | 10/2014 |
| CN | 104538030 A | 4/2015 |
| CN | 104575504 A | 4/2015 |
| CN | 104635539 A | 5/2015 |
| CN | 104865550 A | 8/2015 |
| CN | 105187907 A | 12/2015 |
| CN | 105204357 A | 12/2015 |
| CN | 105206281 A | 12/2015 |
| CN | 105284076 A | 1/2016 |
| CN | 105493442 A | 4/2016 |
| CN | 106028223 A | 10/2016 |
| CN | 106375902 A | 2/2017 |
| CN | 106531165 A | 3/2017 |
| CN | 106708403 A | 5/2017 |
| CN | 107004410 A | 8/2017 |
| CN | 107919123 A | 4/2018 |
| EP | 1349146 A1 | 10/2003 |
| EP | 1389853 A1 | 2/2004 |
| EP | 2166737 A1 | 3/2010 |
| EP | 2683147 A1 | 1/2014 |
| EP | 3128767 A2 | 2/2017 |
| EP | 2351021 B1 | 9/2017 |
| EP | 3270377 A1 | 1/2018 |
| EP | 3285502 A1 | 2/2018 |
| JP | 2001236093 A | 8/2001 |
| JP | 2003223188 A | 8/2003 |
| JP | 2004347943 A | 12/2004 |
| JP | 2004354721 A | 12/2004 |
| JP | 2005242134 A | 9/2005 |
| JP | 2005250867 A | 9/2005 |
| JP | 2005284492 A | 10/2005 |
| JP | 2006092482 A | 4/2006 |
| JP | 2007013400 A | 1/2007 |
| JP | 2007142595 A | 6/2007 |
| JP | 2008079256 A | 4/2008 |
| JP | 2008158868 A | 7/2008 |
| JP | 2010141748 A | 6/2010 |
| JP | 2013037148 A | 2/2013 |
| JP | 2014071138 A | 4/2014 |
| JP | 2014137590 A | 7/2014 |
| JP | 2015161551 A | 9/2015 |
| JP | 2015527768 A | 9/2015 |
| JP | 2016095383 A | 5/2016 |
| JP | 2017072857 A | 4/2017 |
| KR | 20100036351 A | 4/2010 |
| KR | 100966415 B1 | 6/2010 |
| KR | 20100111071 A | 10/2010 |
| KR | 20130050987 A | 5/2013 |
| KR | 20140035310 A | 3/2014 |
| KR | 20140112900 A | 9/2014 |
| WO | 200153994 | 7/2001 |

(56) References Cited

FOREIGN PATENT DOCUMENTS

| WO | 2003093950 A2 | 11/2003 |
|---|---|---|
| WO | 2008048599 A1 | 4/2008 |
| WO | 2012166386 A2 | 12/2012 |
| WO | 2013184792 A1 | 12/2013 |
| WO | 2014064531 A1 | 5/2014 |
| WO | 2014159581 A1 | 10/2014 |
| WO | 2015017303 A1 | 2/2015 |
| WO | 2015037396 A1 | 3/2015 |
| WO | 2015131024 A1 | 9/2015 |
| WO | 2015178950 A1 | 11/2015 |
| WO | 2016014142 A1 | 1/2016 |
| WO | 2016022926 A1 | 2/2016 |
| WO | 2016033364 A1 | 3/2016 |
| WO | 2016057268 A1 | 4/2016 |
| WO | 2016085775 A2 | 6/2016 |
| WO | 2016165067 A1 | 10/2016 |
| WO | 2016171956 A1 | 10/2016 |
| WO | 2016200593 A1 | 12/2016 |
| WO | 2017039632 A1 | 3/2017 |
| WO | 2017058654 A1 | 4/2017 |
| WO | 2017138934 A1 | 8/2017 |
| WO | 2017147075 A1 | 8/2017 |
| WO | 2017147936 A1 | 9/2017 |
| WO | 2018027142 A1 | 2/2018 |
| WO | 2018067404 A1 | 4/2018 |

OTHER PUBLICATIONS

Advisory Action dated Jun. 28, 2018, issued in connection with U.S. Appl. No. 15/438,744, filed on Feb. 21, 2017, 3 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
"Automatic Parameter Tying in Neural Networks" ICLR 2018, 14 pages.
Bluetooth "Specification of the Bluetooth System: The ad hoc SCATTERNET for affordable and highly functional wireless connectivity," Core, Version 1.0 A, Jul. 26, 1999,1068 pages.
Bluetooth "Specification of the Bluetooth System: Wireless connections made easy," Core, Version 1.0 B, Dec. 1, 1999, 1076 pages.
Corrected Notice of Allowability dated Mar. 8, 2017, issued in connection with U.S. Appl. No. 15/229,855, filed on Aug. 5, 2016, 6 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Extended Search Report dated Oct. 30, 2017, issued in connection with EP Application No. 17174435.2, 11 pages.
Final Office Action dated Oct. 6, 2017, issued in connection with U.S. Appl. No. 15/098,760, filed on Apr. 14, 2016, 25 pages.
Final Office Action dated Aug. 11, 2017, issued in connection with U.S. Patent Application No. 15/131,776, filed on Apr. 18, 2016, 7 pages.
Final Office Action dated Apr. 13, 2018, issued in connection with U.S. Appl. No. 15/131,254, filed on Apr. 18, 2016, 18 pages.
Final Office Action dated Apr. 13, 2018, issued in connection with U.S. Appl. No. 15/438,744, filed on Feb. 21, 2017, 20 pages.
Final Office Action dated Jun. 15, 2017, issued in connection with U.S. Appl. No. 15/098,718, filed on Apr. 14, 2016, 15 pages.
Final Office Action dated Oct. 15, 2018, issued in connection with U.S. Appl. No. 15/804,776, filed on Nov. 6, 2017, 18 pages.
Final Office Action dated Oct. 16, 2018, issued in connection with U.S. Appl. No. 15/438,725, filed on Feb. 21, 2017, 10 pages.
Final Office Action dated Feb. 21, 2018, issued in connection with U.S. Appl. No. 15/297,627, filed on Oct. 19, 2016, 12 pages.
Fiorenza Arisio et al. "Deliverable 1.1 User Study, analysis of requirements and definition of the application task," May 31, 2012, http://dirha.fbk.eu/sites/dirha.fbk.eu/files/docs/DIRHA_D1.1., 31 pages.

Freiberger, Karl, "Development and Evaluation of Source Localization Algorithms for Coincident Microphone Arrays," Diploma Thesis, Apr. 1, 2010, 106 pages.
Han et al. "Deep Compression: Compressing Deep Neural Networks with Pruning, Trained Quantization and Huffman Coding." ICLR 2016, Feb. 15, 2016, 14 pages.
International Bureau, International Preliminary Report on Patentability, dated Sep. 7, 2018, issued in connection with International Application No. PCT/US2017/018728, filed on Feb. 21, 2017, 8 pages.
International Bureau, International Preliminary Report on Patentability, dated Sep. 7, 2018, issued in connection with International Application No. PCT/US2017/018739, filed on Feb. 21, 2017, 7 pages.
International Searching Authority, International Search Report and Written Opinion dated Nov. 22, 2017, issued in connection with International Application No. PCT/US2017/054063, filed on Sep. 28, 2017, 11 pages.
International Searching Authority, International Search Report and Written Opinion dated Jan. 23, 2018, issued in connection with International Application No. PCT/US2017/57220, filed on Oct. 18, 2017, 8 pages.
International Searching Authority, International Search Report and Written Opinion dated May 23, 2017, issued in connection with International Application No. PCT/US2017/018739, Filed on Feb. 21, 2017, 10 pages.
Souden et al. "On Optimal Frequency-Domain Multichannel Linear Filtering for Noise Reduction." IEEE Transactions an Audio, Speech, and Language Processing, vol. 18, No. 2, Feb. 2010, 17pages.
Steven J. Nowlan and Geoffrey E. Hinton "Simplifying Neural Networks by Soft Weight-Sharing" Neural Computation 4, 1992, 21 pages.
Tsiami et al. "Experiments in acoustic source localization using sparse arrays in adverse indoors environments", 2014 22nd European Signal Processing Conference, Sep. 1, 2014, 5 pages.
Ullrich et al. "Soft Weight-Sharing for Neural Network Compression." ICLR 2017, 16 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Vacher at al. "Recognition of voice commands by multisource ASR and noise cancellation in a smart home environment" Signal Processing Conference 2012 Proceedings of the 20th European, IEEE, Aug. 27, 2012, 5 pages.
Xiao et al. "A Learning-Based Approach to Direction of Arrival Estimation in Noisy and Reverberant Environments," 2015 IEEE International Conference on Acoustics, Speech and Signal Processing, Apr. 19, 2015, 5 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Non-Final Office Action dated Jan. 13, 2017, issued in connection with U.S. Appl. No. 15/098,805, filed on Apr. 14, 2016, 11 pages.
Non-Final Office Action dated Dec. 12, 2016, issued in connection with U.S. Appl. No. 15/098,718, filed on Apr. 14, 2016, 11 pages.
Non-Final Office Action dated Sep. 10, 2018, issued in connection with U.S. Appl. No. 15/670,361, filed on Aug. 7, 2017, 17 pages.
Non-Final Office Action dated Jan. 10, 2018, issued in connection with U.S. Appl. No. 15/438,725, filed on Feb. 21, 2017, 15 pages.
Non-Final Office Action dated Jan. 10, 2018, issued in connection with U.S. Appl. No. 15/229,868, filed on Aug. 5, 2016, 13 pages.
Non-Final Office Action dated Jan. 10, 2018, issued in connection with U.S. Appl. No. 15/098,718, filed on Apr. 14, 2016, 15 pages.
Non-Final Office Action dated Mar. 9, 2017, issued in connection with U.S. Appl. No. 15/098,760, filed on Apr. 14, 2016, 13 pages.

(56) References Cited

OTHER PUBLICATIONS

Non-Final Office Action dated Feb. 8, 2017, issued in connection with U.S. Appl. No. 15/098,892, filed on Apr. 14, 2016, 17 pages.
Non-Final Office Action dated Feb. 7, 2017, issued in connection with U.S. Appl. No. 15/131,244, filed on Apr. 18, 2016, 12 pages.
Non-Final Office Action dated Nov. 3, 2017, issued in connection with U.S. Appl. No. 15/438,741, filed on Feb. 21, 2017, 11 pages.
Non-Final Office Action dated Nov. 2, 2017, issued in connection with U.S. Appl. No. 15/584,782, filed on May 2, 2017, 11 pages.
Non-Final Office Action dated Jun. 1, 2017, issued in connection with U.S. Appl. No. 15/223,218, filed on Jul. 29, 2016, 7 pages.
Ngo et al. "Incorporating the Conditional Speech Presence Probability in Multi-Channel Wiener Filter Based Noise Reduction in Hearing Aids." EURASIP Journal on Advances in Signal Processing vol. 2009, Jun. 2, 2009, 11 pages.
Morales-Cordovilla et al. "Room Localization for Distant Speech Recognition," Proceedings of Interspeech 2014, Sep. 14, 2014, 4 pages.
Maja Taseska and Emanual A.P. Habets, "MMSE-Based Blind Source Extraction in Diffuse Noise Fields Using a Complex Coherence-Based a Priori Sap Estimator." International Workshop on Acoustic Signal Enhancement 2012, Sep. 4-6, 2012, 4pages.
Louderback, Jim, "Affordable Audio Receiver Furnishes Homes With MP3," TechTV Vault. Jun. 28, 2000 retrieved Jul. 10, 2014, 2 pages.
Jose Alvarez and Mathieu Salzmann "Compression-aware Training of Deep Networks" 31st Conference on Neural Information Processing Systems, Nov. 13, 2017, 12pages.
Jones, Stephen, "Dell Digital Audio Receiver: Digital upgrade for your analog stereo," Analog Stereo, Jun. 24, 2000 retrieved Jun. 18, 2014, 2 pages.
Jo et al., "Synchronized One-to-many Media Streaming with Adaptive Playout Control," Proceedings of SPIE, 2002, pp. 71-82, vol. 4861.
International Searching Authority, International Search Report and Written Opinion dated May 30, 2017, issued in connection with International Application No. PCT/US2017/018728, Filed on Feb. 21, 2017, 11 pages.
International Searching Authority, International Search Report and Written Opinion dated Oct. 23, 2017, issued in connection with International Application No. PCT/US2017/042170, filed on Jul. 14, 2017, 15 pages.
International Searching Authority, International Search Report and Written Opinion dated Oct. 24, 2017, issued in connection with International Application No. PCT/US2017/042227, filed on Jul. 14, 2017, 16 pages.
Non-Final Office Action dated Sep. 14, 2017, issued in connection with U.S. Appl. No. 15/178,180, filed on Jun. 9, 2016, 16 pages.
Non-Final Office Action dated Sep. 14, 2018, issued in connection with U.S. Appl. No. 15/959,907, filed on Apr. 23, 2018, 15 pages.
Non-Final Office Action dated Mar. 16, 2018, issued in connection with U.S. Appl. No. 15/681,937, filed on Aug. 21, 2017, 5 pages.
Non-Final Office Action dated Oct. 16, 2018, issued in connection with U.S. Appl. No. 15/131,254, filed on Apr. 18, 2016, 16 pages.
Non-Final Office Action dated Apr. 18, 2018, issued in connection with U.S. Appl. No. 15/811,468 filed on Nov. 13, 2017, 14 pages.
Non-Final Office Action dated Apr. 19, 2017, issued in connection with U.S. Appl. No. 15/131,776, filed on Apr. 18, 2016, 12 pages.
Non-Final Office Action dated Feb. 20, 2018, issued in connection with U.S. Appl. No. 15/211,748, filed on Jul. 15, 2016, 31 pages.
Non-Final Office Action dated May 22, 2018, issued in connection with U.S. Appl. No. 15/946,599, filed on Apr. 5, 2018, 19 pages.
Non-Final Office Action dated Aug. 24, 2017, issued in connection with U.S. Appl. No. 15/297,627, filed on Oct. 19, 2016, 13 pages.
Non-Final Office Action dated Jul. 25, 2017, issued in connection with U.S. Appl. No. 15/273,679, filed on Jul. 22, 2016, 11 pages.
Non-Final Office Action dated Jan. 26, 2017, issued in connection with U.S. Appl. No. 15/098,867, filed on Apr. 14, 2016, 16 pages.
Non-Final Office Action dated Oct. 26, 2017, issued in connection with U.S. Appl. No. 15/438,744, filed on Feb. 21, 2017, 12 pages.
Non-Final Office Action dated Jun. 27, 2018, issued in connection with U.S. Appl. No. 15/438,749, filed on Feb. 21, 2017, 16 pages.
Non-Final Office Action dated Jun. 30, 2017, issued in connection with U.S. Appl. No. 15/277,810, filed on Sep. 27, 2016, 13 pages.
Non-Final Office Action dated Feb. 6, 2018, issued in connection with U.S. Appl. No. 15/211,689, filed on Jul. 15, 2016, 32 pages.
Non-Final Office Action dated Feb. 6, 2018, issued in connection with U.S. Appl. No. 15/237,133, filed on Aug. 15, 2016, 6 pages.
Non-Final Office Action dated Sep. 6, 2017, issued in connection with U.S. Appl. No. 15/131,254, filed on Apr. 18, 2016, 13 pages.
Non-Final Office Action dated Sep. 6, 2018, issued in connection with U.S. Appl. No. 15/098,760, filed on Apr. 14, 2016, 29 pages.
Non-Final Office Action dated Apr. 9, 2018, issued in connection with U.S. Appl. No. 15/804,776, filed on Nov. 6, 2017, 18 pages.
Non-Final Office Action dated May 9, 2018, issued in connection with U.S. Appl. No. 15/818,051, filed on Nov. 20, 2017, 22 pages.
Notice of Allowance dated Dec. 4, 2017, issued in connection with U.S. Appl. No. 15/277,810, filed on Sep. 27, 2016, 5 pages.
Notice of Allowance dated Jul. 5, 2018, issued in connection with U.S. Appl. No. 15/237,133, filed on Aug. 15, 2016, 5 pages.
Notice of Allowance dated Jul. 9, 2018, issued in connection with U.S. Appl. No. 15/438,741, filed on Feb. 21, 2017, 5 pages.
Notice of Allowance dated Aug. 1, 2018, issued in connection with U.S. Appl. No. 15/297,627, filed on Oct. 19, 2016, 9 pages.
Notice of Allowance dated Apr. 11, 2018, issued in connection with U.S. Appl. No. 15/719,454, filed on Sep. 28, 2017, 15 pages.
Notice of Allowance dated Jul. 12, 2017, issued in connection with U.S. Appl. No. 15/098,805, filed on Apr. 14, 2016, 8 pages.
Notice of Allowance dated Sep. 12, 2018, issued in connection with U.S. Appl. No. 15/438,744, filed on Feb. 21, 2017, 15 pages.
Notice of Allowance dated Dec. 13, 2017, issued in connection with U.S. Appl. No. 15/784,952, filed on Oct. 16, 2017, 9 pages.
Notice of Allowance dated Aug. 14, 2017, issued in connection with U.S. Appl. No. 15/098,867, filed on Apr. 14, 2016, 10 pages.
Notice of Allowance dated Feb. 14, 2017, issued in connection with U.S. Appl. No. 15/229,855, filed on Aug. 5, 2016, 11 pages.
Notice of Allowance dated Jun. 14, 2017, issued in connection with U.S. Appl. No. 15/282,554, filed on Sep. 30, 2016, 11 pages.
Notice of Allowance dated Dec. 15, 2017, issued in connection with U.S. Appl. No. 15/223,218, filed on Jul. 29, 2016, 7 pages.
Notice of Allowance dated Aug. 16, 2017, issued in connection with U.S. Appl. No. 15/098,892, filed on Apr. 14, 2016, 9 pages.
Notice of Allowance dated Aug. 17, 2017, issued in connection with U.S. Appl. No. 15/131,244, filed on Apr. 18, 2016, 9 pages.
Notice of Allowance dated Sep. 17, 2018, issued in connection with U.S. Appl. No. 15/211,689, filed on Jul. 15, 2016, 6 pages.
Notice of Allowance dated Jul. 19, 2018, issued in connection with U.S. Appl. No. 15/681,937, filed on Aug. 21, 2017, 7 pages.
Notice of Allowance dated Mar. 20, 2018, issued in connection with U.S. Appl. No. 15/784,952, filed on Oct. 16, 2017, 7 pages.
Notice of Allowance dated Sep. 20, 2018, issued in connection with U.S. Appl. No. 15/946,559, filed on Apr. 5, 2018, 7 pages.
Notice of Allowance dated Aug. 22, 2017, issued in connection with U.S. Appl. No. 15/273,679, filed on Sep. 22, 2016, 5 pages.
Notice of Allowance dated Jan. 22, 2018, issued in connection with U.S. Appl. No. 15/178,180, filed on Jun. 9, 2016, 9 pages.
Notice of Allowance dated Dec. 29, 2017, issued in connection with U.S. Appl. No. 15/131,776, filed on Apr. 18, 2016, 13 pages.
Notice of Allowance dated Jul. 30, 2018, issued in connection with U.S. Appl. No. 15/098,718, filed on Apr. 14, 2016, 5 pages.
Notice of Allowance dated Oct. 5, 2018, issued in connection with U.S. Appl. No. 15/211,748, filed on Jul. 15, 2018, 10 pages.
Notice of Allowance dated Aug. 9, 2018, issued in connection with U.S. Appl. No. 15/229,868, filed on Aug. 5, 2016, 11 pages.
Notice of Allowance dated Mar. 9, 2018, issued in connection with U.S. Appl. No. 15/584,782, filed on May 2, 2017, 8 pages.
Palm, Inc., "Handbook for the Palm VII Handheld," May 2000, 311 pages.
Presentations at WinHEC 2000, May 2000, 138 pages.
Restriction Requirement dated Aug. 9, 2018, issued in connection with U.S. Appl. No. 15/717,621, filed on Sep. 27, 2017, 8 pages.

(56) References Cited

OTHER PUBLICATIONS

Souden et al. "An Integrated Solution for Online Multichannel Noise Tracking and Reduction." IEEE Transactions on Audio, Speech, and Language Processing, vol. 19. No. 7, Sep. 7, 2011, 11 pages.
Souden et al. "Gaussian Model-Based Multichannel Speech Presence Probability" IEEE Transactions on Audio, Speech, and Language Processing, vol. 18, No. 5, Jul. 5, 2010, 6 pages.
Final Office Action dated Dec. 11, 2019, issued in connection with U.S. Appl. No. 16/227,308, filed on Dec. 20, 2018, 10 pages.
Final Office Action dated Sep. 11, 2019, issued in connection with U.S. Appl. No. 16/178,122, filed on Nov. 1, 2018, 13 pages.
Final Office Action dated May 13, 2020, issued in connection with U.S. Appl. No. 16/153,530, filed on Oct. 5, 2018, 20 pages.
Final Office Action dated May 18, 2020, issued in connection with U.S. Appl. No. 16/177,185, filed on Oct. 31, 2018, 16 pages.
Final Office Action dated May 21, 2020, issued in connection with U.S. Appl. No. 15/989,715, filed on May 25, 2018, 21 pages.
Final Office Action dated Feb. 22, 2021, issued in connection with U.S. Appl. No. 15/936,177, filed on Mar. 26, 2018, 20 pages.
Final Office Action dated Feb. 22, 2021, issued in connection with U.S. Appl. No. 16/213,570, filed on Dec. 7, 2018, 12 pages.
Final Office Action dated Jun. 22, 2020, issued in connection with U.S. Appl. No. 16/179,779, filed on Nov. 2, 2018, 16 pages.
Final Office Action dated Mar. 23, 2020, issued in connection with U.S. Appl. No. 16/145,275, filed on Sep. 28, 2018, 11 pages.
Final Office Action dated Feb. 24, 2020, issued in connection with U.S. Appl. No. 15/936,177, filed on Mar. 26, 2018, 20 pages.
Final Office Action dated Apr. 26, 2019, issued in connection with U.S. Appl. No. 15/721,141, filed on Sep. 29, 2017, 20 pages.
Final Office Action dated Apr. 30, 2019, issued in connection with U.S. Appl. No. 15/098,760, filed on Apr. 14, 2016, 6 pages.
Final Office Action dated Feb. 5, 2019, issued in connection with U.S. Appl. No. 15/438,749, filed on Feb. 21, 2017, 17 pages.
Final Office Action dated Feb. 7, 2020, issued in connection with U.S. Appl. No. 15/948,541, filed on Apr. 9, 2018, 8 pages.
Final Office Action dated Sep. 8, 2020, issued in connection with U.S. Appl. No. 16/213,570, filed on Dec. 7, 2018, 12 pages.
First Action Interview Office Action dated Mar. 8, 2021, issued in connection with U.S. Appl. No. 16/798,967, filed on Feb. 24, 2020, 4 pages.
First Action Interview Office Action dated Aug. 14, 2019, issued in connection with U.S. Appl. No. 16/227,308, filed on Dec. 20, 2018, 4 pages.
First Action Interview Office Action dated Jun. 15, 2020, issued in connection with U.S. Appl. No. 16/213,570, filed on Dec. 7, 2018, 4 pages.
First Action Interview Office Action dated Jan. 22, 2020, issued in connection with U.S. Appl. No. 15/989,715, filed on May 25, 2018, 3 pages.
First Action Interview Office Action dated Jul. 5, 2019, issued in connection with U.S. Appl. No. 16/227,308, filed on Dec. 20, 2018, 4 pages.
Giacobello et al. "A Sparse Nonuniformly Partitioned Multidelay Filter for Acoustic Echo Cancellation," 2013, IEEE Workshop on Applications of Signal Processing to Audio and Acoustics, Oct. 2013, New Paltz, NY, 4 pages.
Giacobello et al. "Tuning Methodology for Speech Enhancement Algorithms using a Simulated Conversational Database and Perceptual Objective Measures," 2014, 4th Joint Workshop on Hands-free Speech Communication and Microphone Arrays HSCMA, 2014, 5 pages.
Hans Speidel: "Chatbot Training: How to use training data to provide fully automated customer support", Jun. 29, 2017, pp. 1-3, XP055473185, Retrieved from the Internet: URL:https://www.crowdguru.de/wp-content/uploads/Case-Study-Chatbot-training-How-to-use-training-data-to-provide-fully-automated-customer-support.pdf [retrieved on May 7, 2018].

Helwani et al. "Source-domain adaptive filtering for MIMO systems with application to acoustic echo cancellation", Acoustics Speech and Signal Processing, 2010 IEEE International Conference, Mar. 14, 2010, 4 pages.
Hirano et al. "A Noise-Robust Stochastic Gradient Algorithm with an Adaptive Step-Size Suitable for Mobile Hands-Free Telephones," 1995, International Conference on Acoustics, Speech, and Signal Processing, vol. 2, 4 pages.
Indian Patent Office, Examination Report dated Feb. 25, 2021, issued in connection with Indian Patent Application No. 201847035625, 6 pages.
International Bureau, International Preliminary Report on Patentability and Written Opinion, dated Apr. 1, 2021, issued in connection with International Application No. PCT/US2019/052129, filed on Sep. 20, 2019, 13 pages.
International Bureau, International Preliminary Report on Patentability and Written Opinion, dated Dec. 10, 2020, issued in connection with International Application No. PCT/US2019/033945, filed on May 25, 2018, 7 pages.
International Bureau, International Preliminary Report on Patentability and Written Opinion, dated Apr. 15, 2021, issued in connection with International Application No. PCT/US2019/054332, filed on Oct. 2, 2019, 9 pages.
International Bureau, International Preliminary Report on Patentability and Written Opinion, dated Mar. 25, 2021, issued in connection with International Application No. PCT/US2019/050852, filed on Sep. 12, 2019, 8 pages.
International Bureau, International Preliminary Report on Patentability and Written Opinion, dated Jan. 7, 2021, issued in connection with International Application No. PCT/US2019/039828, filed on Jun. 28, 2019, 11 pages.
International Bureau, International Preliminary Report on Patentability and Written Opinion, dated Apr. 8, 2021, issued in connection with International Application No. PCT/US2019/052654, filed on Sep. 24, 2019, 7 pages.
International Bureau, International Preliminary Report on Patentability and Written Opinion, dated Apr. 8, 2021, issued in connection with International Application No. PCT/US2019/052841, filed on Sep. 25, 2019, 8 pages.
International Bureau, International Preliminary Report on Patentability and Written Opinion, dated Apr. 8, 2021, issued in connection with International Application No. PCT/US2019/053253, filed on Sep. 26, 2019, 10 pages.
International Bureau, International Preliminary Report on Patentability, dated Apr. 11, 2019, issued in connection with International Application No. PCT/US2017/0054063, filed on Sep. 28, 2017, 9 pages.
International Bureau, International Preliminary Report on Patentability, dated Feb. 20, 2020, issued in connection with International Application No. PCT/US2018/045397, filed on Aug. 6, 2018, 8 pages.
International Bureau, International Preliminary Report on Patentability, dated Apr. 23, 2019, issued in connection with International Application No. PCT/US2017/057220, filed on Oct. 18, 2017, 7 pages.
International Bureau, International Preliminary Report on Patentability, dated Mar. 31, 2020, issued in connection with International Application No. PCT/US2018053123, filed on Sep. 27, 2018, 12 pages.
International Bureau, International Preliminary Report on Patentability, dated Mar. 31, 2020, issued in connection with International Application No. PCT/US2018053472, filed on Sep. 28, 2018, 8 pages.
International Bureau, International Preliminary Report on Patentability, dated Mar. 31, 2020, issued in connection with International Application No. PCT/US2018053517, filed on Sep. 28, 2018, 10 pages.
International Bureau, International Search Report and Written Opinion dated Nov. 10, 2020, issued in connection with International Application No. PCT/US2020/044250, filed on Jul. 30, 2020, 15 pages.

(56) References Cited

OTHER PUBLICATIONS

International Bureau, International Search Report and Written Opinion dated Jul. 14, 2020, issued in connection with International Application No. PCT/US2020/017150, filed on Feb. 7, 2020, 27 pages.
International Bureau, International Search Report and Written Opinion dated Nov. 18, 2019, issued in connection with International Application No. PCT/US2019052841, filed on Sep. 25, 2019, 12 pages.
International Bureau, International Search Report and Written Opinion dated Mar. 2, 2020, issued in connection with International Application No. PCT/US2019064907, filed on Dec. 6, 2019, 11 pages.
International Bureau, International Search Report and Written Opinion dated Dec. 20, 2019, issued in connection with International Application No. PCT/US2019052654, filed on Sep. 24, 2019, 11 pages.
International Bureau, International Search Report and Written Opinion dated Sep. 21, 2020, issued in connection with International Application No. PCT/US2020/037229, filed on Jun. 11, 2020, 17 pages.
International Bureau, International Search Report and Written Opinion dated Apr. 23, 2021, issued in connection with International Application No. PCT/US2021/070007, filed on Jan. 6, 2021, 11 pages.
International Bureau, International Search Report and Written Opinion datedn Dec. 6, 2019, issued in connection with International Application No. PCT/US2019050852, filed on Sep. 12, 2019, 10 pages.
International Bureau, International Search Report and Written Opinion dated Apr. 8, 2020, issued in connection with International Application No. PCT/US2019/067576, filed on Dec. 19, 2019, 12 pages.
International Searching Authority, International Search Report and Written Opinion dated Dec. 19, 2018, in connection with International Application No. PCT/US2018/053517, 13 pages.
Notice of Allowance dated Aug. 10, 2020, issued in connection with U.S. Appl. No. 16/424,825, filed on May 29, 2019, 9 pages.
Notice of Allowance dated Feb. 10, 2021, issued in connection with U.S. Appl. No. 16/138,111, filed on Sep. 21, 2018, 8 pages.
Notice of Allowance dated Oct. 11, 2019, issued in connection with U.S. Appl. No. 16/437,476, filed on Jun. 11, 2019, 9 pages.
Notice of Allowance dated Sep. 11, 2019, issued in connection with U.S. Appl. No. 16/154,071, filed on Oct. 8, 2018, 5 pages.
Notice of Allowance dated Dec. 12, 2018, issued in connection with U.S. Appl. No. 15/811,468, filed on Nov. 13, 2017, 9 pages.
Notice of Allowance dated Jun. 12, 2019, issued in connection with U.S. Appl. No. 15/670,361, filed on Aug. 7, 2017, 7 pages.
Notice of Allowance dated May 12, 2021, issued in connection with U.S. Appl. No. 16/402,617, filed on May 3, 2019, 8 pages.
Notice of Allowance dated Feb. 13, 2019, issued in connection with U.S. Appl. No. 15/959,907, filed on Apr. 23, 2018, 10 pages.
Notice of Allowance dated Jan. 13, 2020, issued in connection with U.S. Appl. No. 16/192,126, filed on Nov. 15, 2018, 6 pages.
Notice of Allowance dated Jan. 13, 2021, issued in connection with U.S. Appl. No. 16/539,843, filed on Aug. 13, 2019, 5 pages.
Notice of Allowance dated Nov. 13, 2020, issued in connection with U.S. Appl. No. 16/131,409, filed on Sep. 14, 2018, 11 pages.
Notice of Allowance dated Aug. 14, 2020, issued in connection with U.S. Appl. No. 16/598,125, filed on Oct. 10, 2019, 5 pages.
Notice of Allowance dated Jan. 14, 2021, issued in connection with U.S. Appl. No. 17/087,423, filed on Nov. 2, 2020, 8 pages.
Notice of Allowance dated Nov. 14, 2018, issued in connection with U.S. Appl. No. 15/297,627, filed on Oct. 19, 2016, 5 pages.
Notice of Allowance dated Jan. 15, 2020, issued in connection with U.S. Appl. No. 16/439,009, filed on Jun. 12, 2019, 9 pages.
Notice of Allowance dated Mar. 15, 2019, issued in connection with U.S. Appl. No. 15/804,776, filed on Nov. 6, 2017, 9 pages.
Notice of Allowance dated Oct. 15, 2019, issued in connection with U.S. Appl. No. 16/437,437, filed on Jun. 11, 2019, 9 pages.
Notice of Allowance dated Oct. 15, 2020, issued in connection with U.S. Appl. No. 16/715,713, filed on Dec. 16, 2019, 9 pages.
Notice of Allowance dated Apr. 16, 2021, issued in connection with U.S. Appl. No. 16/798,967, filed on Feb. 24, 2020, 16 pages.
Notice of Allowance dated Feb. 17, 2021, issued in connection with U.S. Appl. No. 16/715,984, filed on Dec. 16, 2019, 8 pages.
Notice of Allowance dated Jul. 17, 2019, issued in connection with U.S. Appl. No. 15/718,911, filed on Sep. 28, 2017, 5 pages.
Notice of Allowance dated Jun. 17, 2020, issued in connection with U.S. Appl. No. 16/141,875, filed on Sep. 25, 2018, 6 pages.
Notice of Allowance dated Apr. 18, 2019, issued in connection with U.S. Appl. No. 16/173,797, filed on Oct. 29, 2018, 9 pages.
Notice of Allowance dated Dec. 18, 2019, issued in connection with U.S. Appl. No. 16/434,426, filed on Jun. 7, 2019, 13 pages.
Notice of Allowance dated Feb. 18, 2020, issued in connection with U.S. Appl. No. 16/022,662, filed on Jun. 28, 2018, 8 pages.
Notice of Allowance dated Jul. 18, 2019, issued in connection with U.S. Appl. No. 15/438,749, filed on Feb. 21, 2017, 9 pages.
Notice of Allowance dated Jul. 18, 2019, issued in connection with U.S. Appl. No. 15/721,141, filed on Sep. 29, 2017, 8 pages.
Notice of Allowance dated Mar. 18, 2021, issued in connection with U.S. Appl. No. 16/177,185, filed on Oct. 31, 2018, 8 pages.
Notice of Allowance dated Aug. 19, 2020, issued in connection with U.S. Appl. No. 16/271,560, filed on Feb. 8, 2019, 9 pages.
Notice of Allowance dated Dec. 19, 2018, issued in connection with U.S. Appl. No. 15/818,051, filed on Nov. 20, 2017, 9 pages.
Notice of Allowance dated Mar. 19, 2021, issued in connection with U.S. Appl. No. 17/157,686, filed on Jan. 25, 2021, 11 pages.
Notice of Allowance dated Aug. 2, 2019, issued in connection with U.S. Appl. No. 16/102,650, filed on Aug. 13, 2018, 5 pages.
Notice of Allowance dated Dec. 2, 2020, issued in connection with U.S. Appl. No. 15/989,715, filed on May 25, 2018, 11 pages.
Notice of Allowance dated Sep. 2, 2020, issued in connection with U.S. Appl. No. 16/214,711, filed on Dec. 10, 2018, 9 pages.
Notice of Allowance dated Jul. 20, 2020, issued in connection with U.S. Appl. No. 15/984,073, filed on May 18, 2018, 12 pages.
Notice of Allowance dated Apr. 21, 2021, issued in connection with U.S. Appl. No. 16/145,275, filed on Sep. 28, 2018, 8 pages.
Notice of Allowance dated Feb. 21, 2020, issued in connection with U.S. Appl. No. 16/416,752, filed on May 20, 2019, 6 pages.
Notice of Allowance dated Jan. 21, 2020, issued in connection with U.S. Appl. No. 16/672,764, filed on Nov. 4, 2019, 10 pages.
Notice of Allowance dated Jan. 21, 2021, issued in connection with U.S. Appl. No. 16/600,644, filed on Oct. 14, 2019, 7 pages.
Notice of Allowance dated Oct. 21, 2019, issued in connection with U.S. Appl. No. 15/946,585, filed on Apr. 5, 2018, 5 pages.
Notice of Allowance dated Jul. 22, 2020, issued in connection with U.S. Appl. No. 16/131,409, filed on Sep. 14, 2018, 13 pages.
Notice of Allowance dated Jul. 22, 2020, issued in connection with U.S. Appl. No. 16/790,621, filed on Feb. 13, 2020, 10 pages.
Notice of Allowance dated Apr. 24, 2019, issued in connection with U.S. Appl. No. 16/154,469, filed on Oct. 3, 2018, 5 pages.
Notice of Allowance dated Aug. 26, 2020, issued in connection with U.S. Appl. No. 15/948,541, filed on Apr. 9, 2018, 9 pages.
Notice of Allowance dated Apr. 27, 2020, issued in connection with U.S. Appl. No. 16/700,607, filed on Dec. 2, 2019, 10 pages.
Notice of Allowance dated Mar. 27, 2019, issued in connection with U.S. Appl. No. 16/214,666, filed on Dec. 10, 2018, 6 pages.
Notice of Allowance dated Mar. 28, 2018, issued in connection with U.S. Appl. No. 15/699,982, filed on Sep. 8, 2017, 17 pages.
Notice of Allowance dated Jan. 29, 2021, issued in connection with U.S. Appl. No. 16/290,599, filed on Mar. 1, 2019, 9 pages.
Notice of Allowance dated Jun. 29, 2020, issued in connection with U.S. Appl. No. 16/216,357, filed on Dec. 11, 2018, 8 pages.
Notice of Allowance dated Mar. 29, 2021, issued in connection with U.S. Appl. No. 16/600,949, filed on Oct. 14, 2019, 9 pages.
Non-Final Office Action dated Nov. 15, 2019, issued in connection with U.S. Appl. No. 16/153,530, filed on Oct. 5, 2018, 17 pages.
Non-Final Office Action dated Sep. 17, 2020, issued in connection with U.S. Appl. No. 16/600,949, filed on Oct. 14, 2019, 29 pages.
Non-Final Office Action dated Jan. 18, 2019, issued in connection with U.S. Appl. No. 15/721,141, filed on Sep. 29, 2017, 18 pages.

(56) References Cited

OTHER PUBLICATIONS

Non-Final Office Action dated Oct. 18, 2019, issued in connection with U.S. Appl. No. 15/098,760, filed on Apr. 14, 2016, 27 pages.
Non-Final Office Action dated Sep. 18, 2019, issued in connection with U.S. Appl. No. 16/179,779, filed on Nov. 2, 2018, 14 pages.
Non-Final Office Action dated Dec. 19, 2019, issued in connection with U.S. Appl. No. 16/147,710, filed on Sep. 29, 2018, 10 pages.
Non-Final Office Action dated Feb. 19, 2020, issued in connection with U.S. Appl. No. 16/148,879, filed on Oct. 1, 2018, 15 pages.
Non-Final Office Action dated Sep. 2, 2020, issued in connection with U.S. Appl. No. 16/290,599, filed on Mar. 1, 2019, 17 pages.
Non-Final Office Action dated Jun. 20, 2019, issued in connection with U.S. Appl. No. 15/946,585, filed on Apr. 5, 2018, 10 pages.
Non-Final Office Action dated Aug. 21, 2019, issued in connection with U.S. Appl. No. 16/192,126, filed on Nov. 15, 2018, 8 pages.
Non-Final Office Action dated Feb. 21, 2019, issued in connection with U.S. Appl. No. 16/214,666, filed on Dec. 10, 2018, 12 pages.
Non-Final Office Action dated Jan. 21, 2020, issued in connection with U.S. Appl. No. 16/214,711, filed on Dec. 10, 2018, 9 pages.
Non-Final Office Action dated Jan. 21, 2020, issued in connection with U.S. Appl. No. 16/598,125, filed on Oct. 10, 2019, 25 pages.
Non-Final Office Action dated Oct. 21, 2019, issued in connection with U.S. Appl. No. 15/973,413, filed on May 7, 2018, 10 pages.
Non-Final Office Action dated Jul. 22, 2020, issued in connection with U.S. Appl. No. 16/145,275, filed on Sep. 28, 2018, 11 pages.
Non-Final Office Action dated Sep. 22, 2020, issued in connection with U.S. Appl. No. 16/539,843, filed on Aug. 13, 2019, 7 pages.
Non-Final Office Action dated May 23, 2019, issued in connection with U.S. Appl. No. 16/154,071, filed on Oct. 8, 2018, 36 pages.
Non-Final Office Action dated Nov. 23, 2020, issued in connection with U.S. Appl. No. 16/524,306, filed on Jul. 29, 2019, 14 pages.
Non-Final Office Action dated Sep. 23, 2020, issued in connection with U.S. Appl. No. 16/177,185, filed Oct. 31, 2018, 17 pages.
Non-Final Office Action dated Jul. 24, 2019, issued in connection with U.S. Appl. No. 16/439,009, filed on Jun. 12, 2019, 26 pages.
Non-Final Office Action dated Dec. 26, 2018, issued in connection with U.S. Appl. No. 16/154,469, filed on Oct. 8, 2018, 7 pages.
Non-Final Office Action dated Jun. 27, 2019, issued in connection with U.S. Appl. No. 16/437,437, filed on Jun. 11, 2019, 8 pages.
Non-Final Office Action dated Jun. 27, 2019, issued in connection with U.S. Appl. No. 16/437,476, filed on Jun. 11, 2019, 8 pages.
Non-Final Office Action dated Mar. 27, 2020, issued in connection with U.S. Appl. No. 16/790,621, filed on Feb. 13, 2020, 8 pages.
Non-Final Office Action dated May 27, 2020, issued in connection with U.S. Appl. No. 16/715,713, filed on Dec. 16, 2019, 14 pages.
Non-Final Office Action dated Oct. 27, 2020, issued in connection with U.S. Appl. No. 16/213,570, filed on Dec. 7, 2018, 13 pages.
Non-Final Office Action dated Oct. 27, 2020, issued in connection with U.S. Appl. No. 16/715,984, filed on Dec. 16, 2019, 14 pages.
Non-Final Office Action dated Oct. 27, 2020, issued in connection with U.S. Appl. No. 16/819,755, filed on Mar. 16, 2020, 8 pages.
Non-Final Office Action dated Oct. 28, 2019, issued in connection with U.S. Appl. No. 16/145,275, filed on Sep. 28, 2018, 11 pages.
Non-Final Office Action dated Mar. 29, 2019, issued in connection with U.S. Appl. No. 16/102,650, filed on Aug. 13, 2018, 11 pages.
Non-Final Office Action dated Mar. 29, 2021, issued in connection with U.S. Appl. No. 16/528,265, filed on Jul. 31, 2019, 18 pages.
Non-Final Office Action dated Sep. 29, 2020, issued in connection with U.S. Appl. No. 16/402,617, filed on May 3, 2019, 12 pages.
Non-Final Office Action dated Dec. 3, 2020, issued in connection with U.S. Appl. No. 16/145,275, filed on Sep. 28, 2018, 11 pages.
Non-Final Office Action dated Jul. 3, 2019, issued in connection with U.S. Appl. No. 15/948,541, filed on Apr. 9, 2018, 7 pages.
Non-Final Office Action dated May 3, 2019, issued in connection with U.S. Appl. No. 16/178,122, filed on Nov. 1, 2018, 14 pages.
Non-Final Office Action dated Oct. 3, 2018, issued in connection with U.S. Appl. No. 16/102,153, filed on Aug. 13, 2018, 20 pages.
Non-Final Office Action dated Apr. 30, 2019, issued in connection with U.S. Appl. No. 15/718,521, filed on Sep. 28, 2017, 39 pages.
Non-Final Office Action dated Apr. 4, 2019, issued in connection with U.S. Appl. No. 15/718,911, filed on Sep. 28, 2017, 21 pages.
Non-Final Office Action dated Aug. 4, 2020, issued in connection with U.S. Appl. No. 16/600,644, filed on Oct. 14, 2019, 30 pages.
Non-Final Office Action dated Jan. 4, 2019, issued in connection with U.S. Appl. No. 15/948,541, filed on Apr. 9, 2018, 6 pages.
Non-Final Office Action dated Apr. 6, 2020, issued in connection with U.S. Appl. No. 16/424,825, filed on May 29, 2019, 22 pages.
Non-Final Office Action dated Jan. 6, 2021, issued in connection with U.S. Appl. No. 16/439,046, filed on Jun. 12, 2019, 13 pages.
Non-Final Office Action dated Mar. 6, 2020, issued in connection with U.S. Appl. No. 16/141,875, filed on Sep. 25, 2018, 8 pages.
Non-Final Office Action dated Sep. 8, 2020, issued in connection with U.S. Appl. No. 15/936,177, filed on Mar. 26, 2018, 19 pages.
Non-Final Office Action dated Apr. 9, 2021, issued in connection with U.S. Appl. No. 16/780,483, filed on Feb. 3, 2020, 45 pages.
Non-Final Office Action dated Feb. 9, 2021, issued in connection with U.S. Appl. No. 16/806,747, filed on Mar. 2, 2020, 16 pages.
Non-Final Office Action dated Sep. 9, 2020, issued in connection with U.S. Appl. No. 16/168,389, filed on Oct. 23, 2018, 29 pages.
Notice of Allowance dated Mar. 31, 2021, issued in connection with U.S. Appl. No. 16/813,643, filed on Mar. 9, 2020, 11 pages.
Notice of Allowance dated Dec. 2, 2019, issued in connection with U.S. Appl. No. 15/718,521, filed on Sep. 28, 2017, 15 pages.
Notice of Allowance dated Apr. 1, 2019, issued in connection with U.S. Appl. No. 15/935,966, filed on Mar. 26, 2018, 5 pages.
Notice of Allowance dated May 29, 2020, issued in connection with U.S. Appl. No. 16/148,879, filed on Oct. 1, 2018, 6 pages.
Notice of Allowance dated Apr. 3, 2019, issued in connection with U.S. Appl. No. 16/160,107, filed on Oct. 15, 2018, 7 pages.
Notice of Allowance dated Jul. 30, 2019, issued in connection with U.S. Appl. No. 15/131,254, filed on Apr. 18, 2016, 9 pages.
Notice of Allowance dated Mar. 30, 2020, issued in connection with U.S. Appl. No. 15/973,413, filed on May 7, 2018, 5 pages.
Notice of Allowance dated Nov. 30, 2018, issued in connection with U.S. Appl. No. 15/438,725, filed on Feb. 21, 2017, 5 pages.
Notice of Allowance dated Oct. 30, 2019, issued in connection with U.S. Appl. No. 16/131,392, filed on Sep. 14, 2018, 9 pages.
Notice of Allowance dated Oct. 30, 2020, issued in connection with U.S. Appl. No. 16/528,016, filed on Jul. 31, 2019, 10 pages.
Notice of Allowance dated May 31, 2019, issued in connection with U.S. Appl. No. 15/717,621, filed on Sep. 27, 2017, 9 pages.
Notice of Allowance dated Mar. 4, 2020, issued in connection with U.S. Appl. No. 16/444,975, filed on Jun. 18, 2019, 10 pages.
Notice of Allowance dated Feb. 5, 2020, issued in connection with U.S. Appl. No. 16/178,122, filed on Nov. 1, 2018, 9 pages.
Notice of Allowance dated Feb. 6, 2019, issued in connection with U.S. Appl. No. 16/102,153, filed on Aug. 13, 2018, 9 pages.
Notice of Allowance dated Feb. 6, 2020, issued in connection with U.S. Appl. No. 16/227,308, filed on Dec. 20, 2018, 7 pages.
Notice of Allowance dated Apr. 7, 2020, issued in connection with U.S. Appl. No. 15/098,760, filed on Apr. 14, 2016, 7 pages.
Notice of Allowance dated Apr. 7, 2020, issued in connection with U.S. Appl. No. 16/147,710, filed on Sep. 29, 2018, 15 pages.
Notice of Allowance dated Jun. 7, 2019, issued in connection with U.S. Appl. No. 16/102,153, filed on Aug. 13, 2018, 9 pages.
Optimizing Siri on HomePod in Far-Field Settings. Audio Software Engineering and Siri Speech Team, Machine Learning Journal vol. 1, Issue 12. https://machinelearning.apple.com/2018/12/03/optimizing-siri-on-homepod-in-far-field-settings.html. Dec. 2018, 18 pages.
Preinterview First Office Action dated Aug. 5, 2019, issued in connection with U.S. Appl. No. 16/434,426, filed on Jun. 7, 2019, 4 pages.
Preinterview First Office Action dated Sep. 30, 2019, issued in connection with U.S. Appl. No. 15/989,715, filed on May 25, 2018, 4 pages.
Preinterview First Office Action dated May 7, 2020, issued in connection with U.S. Appl. No. 16/213,570, filed on Dec. 7, 2018, 5 pages.
Preinterview First Office Action dated Jan. 8, 2021, issued in connection with U.S. Appl. No. 16/798,967, filed on Feb. 24, 2020, 4 pages.

(56) References Cited

OTHER PUBLICATIONS

Restriction Requirement dated Aug. 14, 2019, issued in connection with U.S. Appl. No. 16/214,711, filed on Dec. 10, 2018, 5 pages.
Rottondi et al., "An Overview on Networked Music Performance Technologies," IEEE Access, vol. 4, pp. 8823-8843, 2016, DOI: 10.1109/ACCESS.2016.2628440, 21 pages.
Tsung-Hsien Wen et al.: "A Network-based End-to-End Trainable Task-oriented Dialogue System", CORR ARXIV, vol. 1604.045621, Apr. 15, 2016, pp. 1-11, XP055396370, Stroudsburg, PA, USA.
Tweet: "How to start using Google app voice commands to make your life easier Share This Story shop @Bullet", Jan. 21, 2016, https://bgr.com/2016/01/21/best-ok-google-voice-commands/, 3 page.
Vacher et al. "Speech Recognition in a Smart Home: Some Experiments for Telemonitoring," 2009 Proceedings of the 5th Conference on Speech Technology and Human-Computer Dialogoue, Constant, 2009, 10 pages.
"S Voice or Google Now?"; https://web.archive.org/web/20160807040123/lowdown.carphonewarehouse.com/news/s-voice-or-google-now/ . . . , Apr. 28, 2015; 4 pages.
Wung et al. "Robust Acoustic Echo Cancellation in the Short-Time Fourier Transform Domain Using Adaptive Crossband Filters" IEEE International Conference on Acoustic, Speech and Signal Processing ICASSP, 2014, p. 1300-1304.
Yamaha DME Designer 3.0 Owner's Manual; Copyright 2008, 501 pages.
Japanese Patent Office, English Translation of Office Action dated Nov. 17, 2020, issued in connection with Japanese Application No. 2019-145039, 5 pages.
Japanese Patent Office, English Translation of Office Action dated Aug. 27, 2020, issued in connection with Japanese Application No. 2019-073349, 6 pages.
Japanese Patent Office, English Translation of Office Action dated Jul. 30, 2020, issued in connection with Japanese Application No. 2019-517281, 26 pages.
Japanese Patent Office, Non-Final Office Action and Translation dated Nov. 5, 2019, issued in connection with Japanese Patent Application No. 2019-517281, 6 pages.
Japanese Patent Office, Office Action and Translation dated Mar. 16, 2021, issued in connection with Japanese Patent Application No. 2020-506725, 7 pages.
Japanese Patent Office, Office Action and Translation dated Nov. 17, 2020, issued in connection with Japanese Patent Application No. 2019-145039, 7 pages.
Japanese Patent Office, Office Action and Translation dated Apr. 20, 2021, issued in connection with Japanese Patent Application No. 2020-513852, 9 pages.
Japanese Patent Office, Office Action and Translation dated Feb. 24, 2021, issued in connection with Japanese Patent Application No. 2019-517281, 4 pages.
Japanese Patent Office, Office Action and Translation dated Apr. 27, 2021, issued in connection with Japanese Patent Application No. 2020-518400, 10 pages.
Japanese Patent Office, Office Action and Translation dated Aug. 27, 2020, issued in connection with Japanese Patent Application No. 2019-073349, 6 pages.
Japanese Patent Office, Office Action and Translation dated Jul. 30, 2020, issued in connection with Japanese Patent Application No. 2019-517281, 6 pages.
Japanese Patent Office, Office Action and Translation dated Jul. 6, 2020, issued in connection with Japanese Patent Application No. 2019-073348, 10 pages.
Japanese Patent Office, Office Action and Translation dated Oct. 8, 2019, issued in connection with Japanese Patent Application No. 2019-521032, 5 pages.
Japanese Patent Office, Office Action Translation dated Nov. 5, 2019, issued in connection with Japanese Patent Application No. 2019-517281, 2 pages.
Japanese Patent Office, Office Action Translation dated Oct. 8, 2019, issued in connection with Japanese Patent Application No. 2019-521032, 8 pages.

Johnson, "Implementing Neural Networks into Modem Technology," IJCNN'99. International Joint Conference on Neural Networks. Proceedings [Cat. No. 99CH36339], Washington, DC, USA, 1999, pp. 1028-1032, vol. 2, doi 10.1109/IJCNN.1999.831096. [retrieved on Jun. 22, 2020].
Joseph Szurley et al, "Efficient computation of microphone utility in a wireless acoustic sensor network with multi-channel Wiener filter based noise reduction", 2012 IEEE International Conference on Acoustics, Speech and Signal Processing, Kyoto, Japan, Mar. 25-30, 2012, pp. 2657-2660, XP032227701, DOI: 10.1109/ICASSP .2012. 6288463 ISBN: 978-1-4673-0045-2.
Korean Patent Office, Korean Examination Report and Translation dated Apr. 26, 2021, issued in connection with Korean Application No. 10-2021-7008937, 15 pages.
Korean Patent Office, Korean Office Action and Translation dated Aug. 16, 2019, issued in connection with Korean Application No. 10-2018-7027452, 14 pages.
Korean Patent Office, Korean Office Action and Translation dated Apr. 2, 2020, issued in connection with Korean Application No. 10-2020-7008486, 12 pages.
Korean Patent Office, Korean Office Action and Translation dated Mar. 25, 2020, issued in connection with Korean Application No. 10-2019-7012192, 14 pages.
Korean Patent Office, Korean Office Action and Translation dated Aug. 26, 2020, issued in connection with Korean Application No. 10-2019-7027640, 16 pages.
Korean Patent Office, Korean Office Action and Translation dated Mar. 30, 2020, issued in connection with Korean Application No. 10-2020-7004425, 5 pages.
Korean Patent Office, Korean Office Action and Translation dated Jan. 4, 2021, issued in connection with Korean Application No. 10-2020-7034425, 14 pages.
Korean Patent Office, Korean Office Action and Translation dated Sep. 9, 2019, issued in connection with Korean Application No. 10-2018-7027451, 21 pages.
Korean Patent Office, Korean Office Action dated May 8, 2019, issued in connection with Korean Application No. 10-2018-7027451, 7 pages.
Korean Patent Office, Korean Office Action dated May 8, 2019, issued in connection with Korean Application No. 10-2018-7027452, 5 pages.
Newman, Jared. "Chromecast Audio's multi-room support has arrived," Dec. 11, 2015, https://www.pcworld.com/article/3014204/customer-electronic/chromcase-audio-s-multi-room-support-has . . . , 1 page.
Non-Final Office Action dated Dec. 21, 2020, issued in connection with U.S. Appl. No. 16/153,530, filed Oct. 5, 2018, 22 pages.
Non-Final Office Action dated Apr. 23, 2021, issued in connection with U.S. Appl. No. 16/660,197, filed Oct. 22, 2019, 9 pages.
Non-Final Office Action dated Dec. 9, 2020, issued in connection with U.S. Appl. No. 16/271,550, filed Feb. 8, 2019, 35 pages.
Non-Final Office Action dated Nov. 4, 2019, issued in connection with U.S. Appl. No. 16/022,662, filed Jun. 28, 2018, 16 pages.
Non-Final Office Action dated Sep. 5, 2019, issued in connection with U.S. Appl. No. 16/416,752, filed on May 20, 2019, 14 pages.
Non-Final Office Action dated Oct. 9, 2019, issued in connection with U.S. Appl. No. 15/936,177, filed on Mar. 26, 2018, 16 pages.
Non-Final Office Action dated Jul. 1, 2020, issued in connection with U.S. Appl. No. 16/138,111, filed on Sep. 21, 2018, 14 pages.
Non-Final Office Action dated Feb. 11, 2021, issued in connection with U.S. Appl. No. 16/876,493, filed on May 18, 2020, 16 pages.
Non-Final Office Action dated Mar. 11, 2021, issued in connection with U.S. Appl. No. 16/834,483, filed on Mar. 30, 2020, 11 pages.
Non-Final Office Action dated Oct. 11, 2019, issued in connection with U.S. Appl. No. 16/177,185, filed on Oct. 31, 2018, 14 pages.
Non-Final Office Action dated Sep. 11, 2020, issued in connection with U.S. Appl. No. 15/989,715, filed on May 25, 2018, 8 pages.
Non-Final Office Action dated Sep. 11, 2020, issued in connection with U.S. Appl. No. 16/219,702, filed on Dec. 13, 2018, 9 pages.
Non-Final Office Action dated Apr. 12, 2021, issued in connection with U.S. Appl. No. 16/528,224, filed on Jul. 31, 2019, 9 pages.
Non-Final Office Action dated Feb. 12, 2019, issued in connection with U.S. Appl. No. 15/670,361, filed on Aug. 7, 2017, 13 pages.

(56) References Cited

OTHER PUBLICATIONS

Non-Final Office Action dated Nov. 13, 2018, issued in connection with U.S. Appl. No. 15/717,621, filed on Sep. 27, 2017, 23 pages.
Non-Final Office Action dated Nov. 13, 2018, issued in connection with U.S. Appl. No. 16/160,107, filed on Oct. 15, 2018, 8 pages.
Non-Final Office Action dated Nov. 13, 2019, issued in connection with U.S. Appl. No. 15/984,073, filed on May 18, 2018, 18 pages.
Non-Final Office Action dated May 14, 2020, issued in connection with U.S. Appl. No. 15/948,541, filed on Apr. 9, 2018, 8 pages.
Non-Final Office Action dated Apr. 15, 2020, issued in connection with U.S. Appl. No. 16/138,111, filed on Sep. 21, 2018, 15 pages.
Non-Final Office Action dated Dec. 15, 2020, issued in connection with U.S. Appl. No. 17/087,423, filed on Nov. 2, 2020, 7 pages.
Non-Final Office Action dated Jan. 15, 2019, issued in connection with U.S. Appl. No. 16/173,797, filed on Oct. 29, 2018, 6 pages.
Australian Patent Office, Examination Report dated Jun. 28, 2021, issued in connection with Australian Patent Application No. 2019395022, 2 pages.
Chinese Patent Office, Chinese Office Action and Translation dated Jul. 2, 2021, issued in connection with Chinese Application No. 201880077216.4, 22 pages.
Chinese Patent Office, First Office Action and Translation dated May 27, 2021, issued in connection with Chinese Application No. 201880026360.5, 15 pages.
Final Office Action dated Jul. 15, 2021, issued in connection with U.S. Appl. No. 16/153,530, filed Oct. 5, 2018, 22 pages.
Final Office Action dated Jun. 15, 2021, issued in connection with U.S. Appl. No. 16/819,755, filed on Mar. 16, 2020, 12 pages.
Final Office Action dated Jun. 4, 2021, issued in connection with U.S. Appl. No. 16/168,389, filed on Oct. 23, 2018, 38 pages.
Final Office Action dated Jun. 8, 2021, issued in connection with U.S. Appl. No. 16/271,550, filed on Feb. 8, 2019, 41 pages.
Indian Patent Office, Examination Report dated May 24, 2021, issued in connection with Indian Patent Application No. 201847035595, 6 pages.
International Bureau, International Preliminary Report on Patentability and Written Opinion, dated Jul. 1, 2021, issued in connection with International Application No. PCT/US2019/067576, filed on Dec. 19, 2019, 8 pages.
International Bureau, International Preliminary Report on Patentability, dated Jun. 17, 2021, issued in connection with International Application No. PCT/US2019/064907, filed on Dec. 6, 2019, 8 pages.
International Bureau, International Preliminary Report on Patentability, dated Mar. 2, 2021, issued in connection with International Application No. PCT/US2019/048558, filed on Aug. 28, 2019, 8 pages.
International Bureau, International Search Report and Written Opinion dated Dec. 11, 2019, issued in connection with International Application No. PCT/US2019/052129, filed on Sep. 20, 2019, 18 pages.
International Bureau, International Search Report and Written Opinion dated Nov. 13, 2018, issued in connection with International Application No. PCT/US2018/045397, filed on Aug. 6, 2018, 11 pages.
International Bureau, International Search Report and Written Opinion dated Jan. 14, 2019, issued in connection with International Application No. PCT/US2018053472, filed on Sep. 28, 2018, 10 pages.
International BUREAU, International Search Report and Written Opinion dated Jul. 17, 2019, issued in connection with International Application No. PCT/US2019/032934, filed on May 17, 2019, 17 pages.
International Bureau, International Search Report and Written Opinion dated Nov. 18, 2019, issued in connection with International Application No. PCT/US2019/048558, filed on Aug. 28, 2019, 11 pages.
International Bureau, International Search Report and Written Opinion dated Sep. 27, 2019, issued in connection with International Application No. PCT/US2019/039828, filed on Jun. 28, 2019, 13 pages.
International Bureau, International Search Report and Written Opinion dated Nov. 29, 2019, issued in connection with International Application No. PCT/US2019/053523, filed on Sep. 29, 2019, 14 pages.
International Bureau, International Search Report and Written Opinion dated Sep. 4, 2019, issued in connection with International Application No. PCT/US2019/033945, filed on May 24, 2019, 8 pages.
Japanese Patent Office, Decision of Refusal and Translation dated Jun. 8, 2021, issued in connection with Japanese Patent Application No. 2019-073348, 5 pages.
Japanese Patent Office, Notice of Reasons for Refusal and Translation dated Jun. 22, 2021, issued in connection with Japanese Patent Application No. 2020-517935, 4 pages.
Japanese Patent Office, Office Action and Translation dated Jul. 6, 2021, issued in connection with Japanese Patent Application No. 2019-073349, 6 pages.
Non-Final Office Action dated Jul. 12, 2021, issued in connection with U.S. Appl. No. 17/008,104, filed Aug. 31, 2020, 6 pages.
Non-Final Office Action dated Jun. 18, 2021, issued in connection with U.S. Appl. No. 17/236,559, filed Apr. 21, 2021, 9 pages.
Non-Final Office Action dated Jun. 25, 2021, issued in connection with U.S. Appl. No. 16/213,570, filed Dec. 7, 2018, 11 pages.
Non-Final Office Action dated Jul. 8, 2021, issued in connection with U.S. Appl. No. 16/813,643, filed Mar. 9, 2020, 12 pages.
Non-Final Office Action dated Jul. 9, 2021, issued in connection with U.S. Appl. No. 16/806,747, filed Mar. 2, 2020, 18 pages.
Non-Final Office Action dated Jun. 23, 2021, issued in connection with U.S. Appl. No. 16/439,032, filed on Jun. 12, 2019, 13 pages.
Notice of Allowance dated Jun. 1, 2021, issued in connection with U.S. Appl. No. 16/219,702, filed on Dec. 13, 2018, 8 pages.
Notice of Allowance dated Jun. 1, 2021, issued in connection with U.S. Appl. No. 16/685,135, filed on Nov. 15, 2019, 10 pages.
Notice of Allowance dated Jun. 23, 2021, issued in connection with U.S. Appl. No. 16/814,844, filed on Mar. 10, 2020, 8 pages.
Notice of Allowance dated May 26, 2021, issued in connection with U.S. Appl. No. 16/927,670, filed on Jul. 13, 2020, 10 pages.
Notice of Allowance dated May 28, 2021, issued in connection with U.S. Appl. No. 16/524,306, filed on Jul. 29, 2019, 9 pages.
Notice of Allowance dated Jun. 3, 2021, issued in connection with U.S. Appl. No. 16/876,493, filed on May 18, 2020, 7 pages.
Notice of Allowance dated Jun. 4, 2021, issued in connection with U.S. Appl. No. 16/528,265, filed on Jul. 31, 2019, 17 pages.
Notice of Allowance dated Jun. 7, 2021, issued in connection with U.S. Appl. No. 16/528,224, filed on Jul. 31, 2019, 9 pages.
Pre-Appeal Brief Decision dated Jun. 2, 2021, issued in connection with U.S. Appl. No. 16/213,570, filed on Dec. 7, 2018, 2 pages.
Advisory Action dated Jun. 10, 2020, issued in connection with U.S. Appl. No. 15/936,177, filed on Mar. 26, 2018, 4 pages.
Advisory Action dated Apr. 23, 2021, issued in connection with U.S. Appl. No. 16/219,702, filed on Dec. 13, 2018, 3 pages.
Advisory Action dated Apr. 24, 2020, issued in connection with U.S. Appl. No. 15/948,541, filed on Apr. 9, 2018, 4 pages.
Advisory Action dated Dec. 31, 2018, issued in connection with U.S. Appl. No. 15/804,776, filed on Nov. 6, 2017, 4 pages.
Advisory Action dated Jun. 9, 2020, issued in connection with U.S. Appl. No. 16/145,275, filed on Sep. 28, 2018, 3 pages.
Anonymous,. S Voice or Google Now—The Lowdown. Apr. 28, 2015, 9 pages, [online], [retrieved on Nov. 29, 2017], Retrieved from the Internet (URL:http://web.archive.org/web/20160807040123/http://lowdown.carphonewarehouse.com/news/s-voice-or-google-now/29958/).
Anonymous: "What are the function of 4 Microphones on iPhone 6S/6S+?", ETrade Supply, Dec. 24, 2015, XP055646381, Retrieved from the Internet: URL:https://www.etradesupply.com/blog/4-microphones-iphone-6s6s-for/ [retrieved on Nov. 26, 2019].
Australian Patent Office, Australian Examination Report Action dated Apr. 14, 2020, issued in connection with Australian Application No. 2019202257, 3 pages.

(56) References Cited

OTHER PUBLICATIONS

Australian Patent Office, Australian Examination Report Action dated Oct. 3, 2019, issued in connection with Australian Application No. 2018230932, 3 pages.
Australian Patent Office, Australian Examination Report Action dated Apr. 7, 2021, issued in connection with Australian Application No. 2019333058, 2 pages.
Australian Patent Office, Australian Examination Report Action dated Aug. 7, 2020, issued in connection with Australian Application No. 2019236722, 4 pages.
Australian Patent Office, Examination Report dated Oct. 30, 2018, issued in connection with Australian Application No. 2017222436, 3 pages.
Bertrand et al. "Adaptive Distributed Noise Reduction for Speech Enhancement in Wireless Acoustic Sensor Networks" Jan. 2010, 4 pages.
Canadian Patent Office, Canadian Examination Report dated Mar. 9, 2021, issued in connection with Canadian Application No. 3067776, 5 pages.
Canadian Patent Office, Canadian Office Action dated Nov. 14, 2018, issued in connection with Canadian Application No. 3015491, 3 pages.
Chinese Patent Office, Chinese Office Action and Translation dated Mar. 30, 2021, issued in connection with Chinese Application No. 202010302650.7, 15 pages.
Chinese Patent Office, First Office Action and Translation dated Mar. 20, 2019, issued in connection with Chinese Application No. 201780025028.2, 18 pages.
Chinese Patent Office, First Office Action and Translation dated Mar. 27, 2019, issued in connection with Chinese Application No. 201780025029.7, 9 pages.
Chinese Patent Office, First Office Action and Translation dated Dec. 28, 2020, issued in connection with Chinese Application No. 201880072203.8, 11 pages.
Chinese Patent Office, First Office Action and Translation dated Nov. 5, 2019, issued in connection with Chinese Application No. 201780072651.3, 19 pages.
Chinese Patent Office, First Office Action dated Feb. 28, 2020, issued in connection with Chinese Application No. 201780061543.6, 29 pages.
Chinese Patent Office, Second Office Action and Translation dated May 11, 2020, issued in connection with Chinese Application No. 201780061543.6, 17 pages.
Chinese Patent Office, Second Office Action and Translation dated Jul. 18, 2019, issued in connection with Chinese Application No. 201780025029.7, 14 pages.
Chinese Patent Office, Second Office Action and Translation dated Sep. 23, 2019, issued in connection with Chinese Application No. 201780025028.2, 15 pages.
Chinese Patent Office, Second Office Action and Translation dated Mar. 31, 2020, issued in connection with Chinese Application No. 201780072651.3, 17 pages.
Chinese Patent Office, Third Office Action and Translation dated Sep. 16, 2019, issued in connection with Chinese Application No. 201780025029.7, 14 pages.
Chinese Patent Office, Third Office Action and Translation dated Aug. 5, 2020, issued in connection with Chinese Application No. 201780072651.3, 10 pages.
Chinese Patent Office, Translation of Office Action dated Jul. 18, 2019, issued in connection with Chinese Application No. 201780025029.7, 8 pages.
Cipriani,. The complete list of OK, Google commands—CNET. Jul. 1, 2016, 5 pages, [online], [retrieved on Jan. 15, 2020]. Retrieved from the Internet: (URL:https://web.archive.org/web/20160803230926/https://www.cnet.com/how-to/complete-list-of-ok-google-commands/).
European Patent Office, European EPC Article 94.3 dated Feb. 23, 2021, issued in connection with European Application No. 17200837.7, 8 pages.
European Patent Office, European EPC Article 94.3 dated Feb. 26, 2021, issued in connection with European Application No. 18789515.6, 8 pages.
European Patent Office, European Extended Search Report dated Nov. 25, 2020, issued in connection with European Application No. 20185599.6, 9 pages.
European Patent Office, European Extended Search Report dated Feb. 3, 2020, issued in connection with European Application No. 19197116.7, 9 pages.
European Patent Office, European Extended Search Report dated Jan. 3, 2019, issued in connection with European Application No. 177570702, 8 pages.
European Patent Office, European Extended Search Report dated Jan. 3, 2019, issued in connection with European Application No. 17757075.1, 9 pages.
European Patent Office, European Extended Search Report dated Aug. 6, 2020, issued in connection with European Application No. 20166332.5, 10 pages.
European Patent Office, European Office Action dated Jul. 1, 2020, issued in connection with European Application No. 17757075.1, 7 pages.
European Patent Office, European Office Action dated Jan. 14, 2020, issued in connection with European Application No. 17757070.2, 7 pages.
European Patent Office, European Office Action dated Jan. 21, 2021, issued in connection with European Application No. 17792272.1, 7 pages.
European Patent Office, European Office Action dated Jan. 22, 2019, issued in connection with European Application No. 17174435.2, 9 pages.
European Patent Office, European Office Action dated Sep. 23, 2020, issued in connection with European Application No. 18788976.1, 7 pages.
European Patent Office, European Office Action dated Oct. 26, 2020, issued in connection with European Application No. 18760101.8, 4 pages.
European Patent Office, European Office Action dated Aug. 30, 2019, issued in connection with European Application No. 17781608.9, 6 pages.
European Patent Office, European Office Action dated Sep. 9, 2020, issued in connection with European Application No. 18792656.3, 10 pages.
European Patent Office, Summons to Attend Oral Proceedings dated Dec. 20, 2019, issued in connection with European Application No. 17174435.2, 13 pages.
Fadilpasic,"Cortana can now be the default PDA on your Android", IT Pro Portal: Accessed via WayBack Machine; http://web.archive.org/web/20171129124915/https://www.itproportal.com/2015/08/11/cortana-can-now-be- . . . , Aug. 11, 2015, 6 pages.
Final Office Action dated Feb. 10, 2021, issued in connection with U.S. Appl. No. 16/219,702, filed on Dec. 13, 2018, 9 pages.
Final Office Action dated Feb. 10, 2021, issued in connection with U.S. Appl. No. 16/402,617, filed on May 3, 2019, 13 pages.
Final Office Action dated Nov. 10, 2020, issued in connection with U.S. Appl. No. 16/600,644, filed on Oct. 14, 2019, 19 pages.
Final Office Action dated Apr. 11, 2019, issued in connection with U.S. Appl. No. 15/131,254, filed on Apr. 18, 2016, 17 pages.

* cited by examiner

| EXAMPLES OF FIELD TYPES 870 | EXAMPLES OF ASSOCIATED DERIVED PAYLOADS 783a |
|---|---|
| Artist | "Britney Spears," etc. |
| Album | "In the Zone," etc. |
| Song | "Toxic," etc. |
| Genre | "Pop"<br>"Country"<br>"Christmas"<br>etc. |
| Activity | "Running"<br>"Party"<br>"Cooking"<br>etc. |
| Playlist | "Discover Weekly"<br>"My Driving Playlist"<br>etc. |
| Station | "KIIS-FM"<br>"Coldplay"<br>etc. |
| Mood | "Upbeat"<br>"Sad"<br>etc. |
| Time | "1980-1989," etc. |
| Traits | "Popular"<br>"Similar"<br>"Latest"<br>"Theme Song"<br>"Live"<br>"Deep Track"<br>"Cover"<br>"Soundtrack"<br>etc. |
| Producer | "Quincy Jones," etc. |
| Lyrics | "I miss the sweet Kanye"<br>"All the leaves are brown"<br>etc. |
| Type | "User Playlist"<br>"[MCP] Playlist"<br>"[MCP] Station"<br>"Radio Station"<br>"Audiobook"<br>etc. |
| MCP | "SPOTIFY"<br>"ITUNES"<br>"I HEART RADIO"<br>"PANDORA"<br>etc. |

*Figure 8A*

| Example No. | REQUEST TYPE 880 | EXAMPLE UTTERANCE 882 | DESIRED PAYLOAD 884 | ACTIONS/INACTIONS 886 |
|---|---|---|---|---|
| 1 | Artist | "Play George Strait" | {artist:"George Strait"} | MPS 100 resolves these requests. |
| 2 | Album or Album by Artist | 2a: "Play the Love is Everything album"<br>2b: "Play the Love is Everything album by George Strait" | {album:"Love is Everything"}<br>{album:"Love is Everything", artist:"George Strait"} | MPS 100 resolves these requests. |
| 3 | Song or Song by Artist | "Play Amarillo by Morning" | {track:"Amarillo", artist:"Morning"} | MPS 100 resolves these requests. |
| 4 | Genre | "Play country music" | {genre:"country music"} | MPS 100 resolves these requests. |
| 5 | Live Radio Station Call Sign | "Play WKLB radio" | {callsign:"WKLB"} | MPS 100 resolves these requests. |
| 6 | Live Radio Station Frequency | "Play 99.1" | {location:..., channel:"99.1"} | MPS 100 resolves these requests. Location format TBD. Falls back to using MPS 100 user's radio location setting or the account profile, and only works for US zipcodes. |
| 7 | Open-ended (suggestion) | "Play something (all content types)" | {} | MPS 100 resolves these requests. |
| 8 | Open-ended (music suggestion) | "Play some music" | {} | MPS 100 resolves these requests. |
| 9 | Open-ended (radio suggestion) | "Turn on the radio" | {types:[station]} | MPS 100 resolves these requests. |
| 10 | Track-seeded radio | "Play Beat It radio/station" | {types:[station], track:"Beat It"} | MPS 100 resolves these requests. This maps to the MPS 100 station.track item type. |
| 11 | Artist-seeded radio | "Play Prince radio/station" | {types:[station], artist:"Prince"} | MPS 100 resolves these requests. This maps to the MPS 100 station.artist item type. |
| 12 | Genre-seeded radio | "Play Heavy Metal radio/station" | {types:[station], genre:"heavy metal"} | MPS 100 resolves these requests. This maps to the MPS 100 station.genre item type. |
| 13 | Service Station | "Play Beats 1" | {station:"Beats 1"} | MPS 100 resolves these requests. Ambiguous stations names across services would require user to specify the service. |
| 14 | Service Playlist | "Play Discover Weekly" | {playlist:"Discover Weekly"} | MPS 100 resolves these requests. Ambiguous playlist names across services would require user to specify the service. |

*Figure 8B (1/7)*

| Example No. | REQUEST TYPE 880 | EXAMPLE UTTERANCE 882 | DESIRED PAYLOAD 884 | ACTIONS/INACTIONS 886 |
|---|---|---|---|---|
| 15 | User Playlist | "Play my cooking playlist" | {types:[playlist.user], playlist:"my cooking playlist"} or {types:[playlist], playlist:"my cooking playlist"} | Prefer if VAS knows it is a user playlist, so MPS 100 can map to playlist.user. MPS 100 can fall back to searching on all playlists (service+user). Ambiguous playlist names across services would require user to specify the service. |
| 16 | User Station | "Play my country station" | {types:[station.user], station:"my country station"} or {types:[station], station:"my country station"} | Prefer if VAS knows it is a user station, so MPS 100 can map to station.user. MPS 100 can fall back to searching on all stations (service+user). |
| 17 | Songs by artist | "Play songs by Adele" | {artist:"Adele"} | MPS 100 can resolve these requests with playlist.artist.only and station.artist.only |
| 18 | Popular songs by artist | "Play popular songs by The National" | {traits:["popular"], artist:"The National"} | MPS 100 can resolve these requests with playlist.artist.topTracks |
| 19 | Something like artist | "Play something like Ed Sheeran" | {traits:["similar"], artist:"Prince"} | MPS 100 can resolve these requests with station.artist.similar. |
| 20 | Latest album from artist | "Play the latest album from John Legend" | {traits:['latest'], artist:"John Legend", suggestedItems:[ {album:"Darkness and Light", artist:"John Legend"} ]} | Requires VAS to resolve, but would like the "latest" tag. |
| 21 | Latest songs by artist/genre | "Play the latest songs by Adele" | {traits:["latest"], artist:"Adele", suggestedItems:[ {artist:"Adele", track:"Alive"}, {artist:"Adele", track:"Water Under the Bridge"}, {artist:"Adele", track:"Sweetest Devotion"}, ... ]} | Requires VAS to resolve, but would like the "latest" tag. |
| 22 | Time | "Play music from the 80s" | {date:"1980-1989", suggestedItems=[...]} | MPS 100 resolves these requests. |

Figure 8B (2/7)

| Example No. | REQUEST TYPE 880 | EXAMPLE UTTERANCE 882 | DESIRED PAYLOAD 884 | ACTIONS/INACTIONS 886 |
|---|---|---|---|---|
| 23 | Songs from Movie | 23a: "Play songs from La La Land" | {album:"La La Land", suggestedItems:[ {album:"La La Land (Original Motion Picture Soundtrack)"} ]} | Prefer VAS to resolve. Would like any associated tags.<br><br>Ambiguous requests require user to be more specific (e.g. "West Side Story" soundtrack vs broadway vs concert hall version, etc.). |
|  |  | 23b: "Play the soundtrack for West Side Story" | {traits:["soundtrack"], album:"West Side Story", suggestedItems:[ {album:"West Side Story (Original Motion Picture Soundtrack)"} ]} |  |
| 24 | Songs from TV Show | 24a: "Play songs from Glee" | {album:"Glee", suggestedItems:[ {album:"Glee: The Music, Volume 1"} ]} | Prefer VAS to resolve. Would like any associated tags. |
|  |  | 24b: "Play the theme song from Game of Thrones" | {traits:["theme song"], suggestedItems:[ {"artist":"Ramin Djawadi", "album":"Game of Thrones: Season 7 (Music from the HBO® Series)", "track":"Main Titles"} ]} |  |
| 25 | New/Recent | "Play new music" | {traits:["new"], suggestedItems:[...]} | Requires VAS to resolve, but would like the "new" or "recent" tag. |

*Figure 8B (3/7)*

| Example No. | REQUEST TYPE 880 | EXAMPLE UTTERANCE 882 | DESIRED PAYLOAD 884 | ACTIONS/INACTIONS 886 |
|---|---|---|---|---|
| 26 | Artist & Time | "Play David Bowie songs from the 80s" | {date:"1980-1989", artist:"David Bowie", suggestedItems:[ {artist:"David Bowie",track:"Under Pressure"}, {artist:"David Bowie",track:"Cat People"}, ... ]} | Prefer VAS to resolve, but would like to have the original structured intent. |
| 27 | Genre & Artist | "Play rock songs by David Bowie" | {genre:"rock", artist:"David Bowie", suggestedItems:[ {artist:"David Bowie",track:"Space Oddity"}, {artist:"David Bowie",track:"Rebel Rebel"}, ... ]} | Prefer VAS to resolve, but would like to have the "genre" tag. |
| 28 | Genre & Time | 28a: "Play the newest hip hop" | {genre:"hip hop", suggestedItems:[ {artist:"Cardi B",track:"I Do"}, {artist:"Post Malone",track:"Psycho"}, ... ]} | Prefer VAS to resolve, but would like to have the "newest" tag. |
| | | 28b: "Play old school funk" | {genre:"old school funk", suggestedItems:[ {artist:"Tom Browne",track:"Funkin' for Jamaica"}, {artist:"Rick James",track:"Bustin' Out"}, ... ]} | Prefer VAS to resolve, but would like to have the "old school" tag. |
| 29 | Activity | 29a: "Play music for cooking" | {genre:"cooking", suggestedItems=[...]} | Prefer VAS to resolve, but would like to have the activity tag. |
| | | 29b: "Play workout music" | {genre:"workout", suggestedItems=[...]} | |

*Figure 8B (4/7)*

| Example No. | REQUEST TYPE 880 | EXAMPLE UTTERANCE 882 | DESIRED PAYLOAD 884 | ACTIONS/INACTIONS 886 |
|---|---|---|---|---|
| 30 | Activity & Time | "Play workout music from the 90's" | {date:"1990-1999", genre:"workout", suggestedItems:[...]} | Prefer VAS to resolve, but would like to have the "90s" tag. |
| 31 | Tempo | "Play something upbeat" | {traits:["upbeat"], suggestedItems:[...]} | Requires VAS to resolve, but would like to have the "upbeat" tag. |
| 32 | Tempo & Time | "Play upbeat music from the 70's" | {traits:["upbeat"], date:"1970-1979", suggestedItems:[...]} | Requires VAS to resolve, but would like to have the "upbeat" and "70s" tags. |
| 33 | Mood | "Play something sad" | {traits:["sad"], suggestedItems=[...]} | Prefer VAS to resolve, but would like to have the "sad" tag. |
| 34 | Mood & Time | "Play happy songs from the 80's" | {traits:["happy"], date:"1980-1989", suggestedItems:[...]} | Prefer VAS to resolve, but would like to have the "happy" and "80s" tags. |
| 35 | Holiday | "Play Christmas music" | {genre="christmas", suggestedItems=[...]} | MPS 100 resolves these requests. |
| 36 | Live version of a song | "Play a live version of Ring of Fire" | {traits:["live"], track: "Ring of Fire", suggestedItems:[ {artist:"Johnny Cash", album:"Live from Austin, TX: Johnny Cash", track: "Ring of Fire"} ]} | Prefer VAS to resolve, but would like to also have the "live" tag. |
| 37 | Live songs by artist | "Play live Johnny Cash songs" | {traits:["live"], types:[playlist], artist:"Johnny Cash", suggestedItems:[ {artist:"Johnny Cash", album:"Live from Austin, TX: Johnny Cash", track: "Ring of Fire"}, {artist:"Johnny Cash", album:"Johnny Cash at San Quentin (Live)", track: "Wanted Man"}, ... ]} | Prefer VAS to resolve, but would like to also have the "live" tag. |
| 38 | Composed by | "Play music composed by Mozart" | {artist:"Mozart"} or {artist:"Wolfgang Amadeus Mozart"} | Prefer VAS to resolve to full composer name. |

*Figure 8B (5/7)*

| Example No. | REQUEST TYPE 880 | EXAMPLE UTTERANCE 882 | DESIRED PAYLOAD 884 | ACTIONS/INACTIONS 886 |
|---|---|---|---|---|
| 39 | Produced by | "Play music produced by Alexander Grant" | {producer:"Alexander Grant", suggestedItems:[ {artist:"Alex Da Kid", track:"Not Easy"}, {artist:"Alex Da Kid", track:"American Funeral"}, ... ]} | Requires VAS to resolve, as producer metadata is not supported. |
| 40 | Remastered version | "Play I Want to Hold Your Hand remastered" | {traits:["remastered"], track:"I Want to Hold Your Hand", suggestedItems:[ {artist:"The Beatles", album:"1 (Remastered)", track: "I Want to Hold Your Hand - Remastered 2015"} ]} | Prefer VAS to resolve, but would like to also have the "remastered" tag. |
| 41 | Cover version of song | "Play a cover version of Ring of Fire" | {traits:["cover"], track:"Ring of Fire", suggestedItems:[ {artist:"Alan Jackson", album:"The Essential Alan Jackson", track: "Ring of Fire"} ]} | Requires VAS to resolve. |
| 42 | Artist deep tracks | "Play deep tracks by Tom Petty" | {traits:["deep tracks"], artist:"Tom Petty", suggestedItems:[...]} | Requires VAS to resolve. |
| 43 | Something else | "Play something else by the Beatles" | {suggestedItems:[...]} | Requires VAS to resolve, based on Now Playing metadata. |
| 44 | More like this | "Play more music like this" | {suggestedItems:[...]} | Requires VAS to resolve, based on Now Playing metadata. |
| 45 | Goes like this...lyrics | "Play the song that goes 'brown eyed girl'" | {artist:"Van Morrison", lyrics:"brown eyed girl", suggestedItems:[ {artist:"Van Morrison", album="Blowin' Your Mind!", track="Brown Eyed Girl"} ]} | Requires VAS to resolve. |

*Figure 8B (6/7)*

| Example No. | REQUEST TYPE 880 | EXAMPLE UTTERANCE 882 | DESIRED PAYLOAD 884 | ACTIONS/INACTIONS 886 |
|---|---|---|---|---|
| 46 | More upbeat/faster/slower/more chill (steering) | "Play something more upbeat" | {suggestedItems:[...]} | Requires VAS to resolve, based on Now Playing metadata. |
| 47 | Ambiguous request for multiple people (with voice recognition) | "Play music Jordan and I like" | {suggestedItems:[...]} | Requires VAS to resolve. |
| 48 | Ambiguous request that matches both song name and album name | "Play Born on the 4th of July" | {suggestedItems:[...]} | Prefer VAS to resolve. |

*Figure 8B (7/7)*

| PLAYBACK - Initiation | |
|---|---|
| COMMAND | COGNATES |
| play | turn on |
| | play some/my music |
| | let's rock/jam |
| | break it down |
| | bust it |
| | kick it |
| play (content) | play (content) |
| | play me (content) |
| | please play (content) |
| | can you/will you play (content) |
| | I'd love to hear (content) |
| | can I hear some (content)? |
| | put on some (content) |
| | switch (content) |
| play (content) for mood | play (content) for (mood) |
| play (content) for activity | play (content) for (activity) |
| play (content) ... service target | play (content) ... service target |
| | play (content) on Spotify |
| play radio | play/turn on/put on the radio |
| | find a station that's playing music |
| play news | play the news |
| | play my news |
| find/create station for (artist/song) | find/create station for (artist/song) |
| playback steering | play artists/song like x |
| | play more x |
| | play more/less like x |
| | play something more (descriptive) |
| playback multi-turn | |

⋮

| CONTROL |
|---|

⋮

| TARGETING |
|---|

⋮

| INQUIRY |
|---|

*Figure 9A*

| PLAYBACK - Initiation | |
|---|---|

| CONTROL | |
|---|---|
| COMMAND | COGNATES |
| pause | pause |
| stop | stop, shut up, (turn) off |
| next | next/skip |
| | next song/track/chapter/episode |
| previous | previous/back |
| | skip back/go back |
| restart track | start over/repeat this song |
| | start this song/track over |
| | play this from the top/beginning |
| repeat | repeat |
| | play that again (track or container) |
| shuffle on/off | shuffle/unshuffle/randomize |
| Go to specific location or track | skip to halfway through this song |
| | go to last minute of this song |
| Resume | resume/continue |

Transport { (spans the rows above)

| | |
|---|---|
| volume up/down | louder/quieter |
| | turn it up/down |
| tune volume a lot/little | turen it up/down a lot/little |
| | a lot softer/quieter/louder |
| | volume 50 percent/volume half |
| | volume 5 |
| | mute |
| Source | turn on/off |
| | turn on/off quiet mode |
| | enhance speech |
| | switch to line in |
| | switch/change to music/TV |

| TARGETING | |
|---|---|

| INQUIRY | |
|---|---|

*Figure 9B*

| PLAYBACK - Initiation | |
|---|---|
⋮

| CONTROL | |
|---|---|
⋮

| TARGETING - Zone/Group/Device | |
|---|---|
| COMMANDS | COGNATES |
| device grouping | *group/join/combine (devices)* |
| | *group/join/combine (groups)* |
| | *ungroup (devices)* |
| | *ungroup (groups)* |
| | *add/drop (devices/groups)* |
| | *turn off* |
| calibrate | *calibrate (devices/groups)* |
| | *trueplay (devices/groups)* |
| pairing/consolidating | *pair/bond (devices)* |
| | *separate (devices/groups)* |
| | *break apart (devices/groups)* |
| group volume | *increase/decrease (group volume)* |
| | *mute/unmute (device(s)) in (group)* |
| | *raise/lower volume of (device(s))* |
| group head | *select (device) as (group) head* |
| | *make (device) (group) head* |
| calibrate multi-turn commands<br>pairing multi-turn commands<br>consolidating multi-turn commands | |

⋮

| TARGETING | |
|---|---|

⋮

| INQUIRY | |
|---|---|

*Figure 9C*

SYSTEMS AND METHODS FOR VOICE-ASSISTED MEDIA CONTENT SELECTION

CROSS-REFERENCE TO RELATED APPLICATION(S)

This application claims the benefit of priority under 35 USC § 119(e) to U.S. Provisional Application No. 62/669,385, filed May 10, 2018, entitled "Systems and Methods for Voice-Assisted Media Content Selection," which is incorporated by reference herein in its entirety.

TECHNICAL FIELD

The present technology relates to consumer goods and, more particularly, to methods, systems, products, features, services, and other elements directed to voice-assisted media content selection or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The SONOS Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 8A is a table showing example attributes of media content that may be received by a media playback system in accordance with aspects of the disclosure;

FIG. 8B is a table with example voice input commands, associated attributes, and media playback system and/or VAS actions, and in accordance with aspects of the disclosure; and FIGS. 9A, 9B, and 9C are tables with example voice input commands and associated information in accordance with aspects of the disclosure.

Figure 1A:
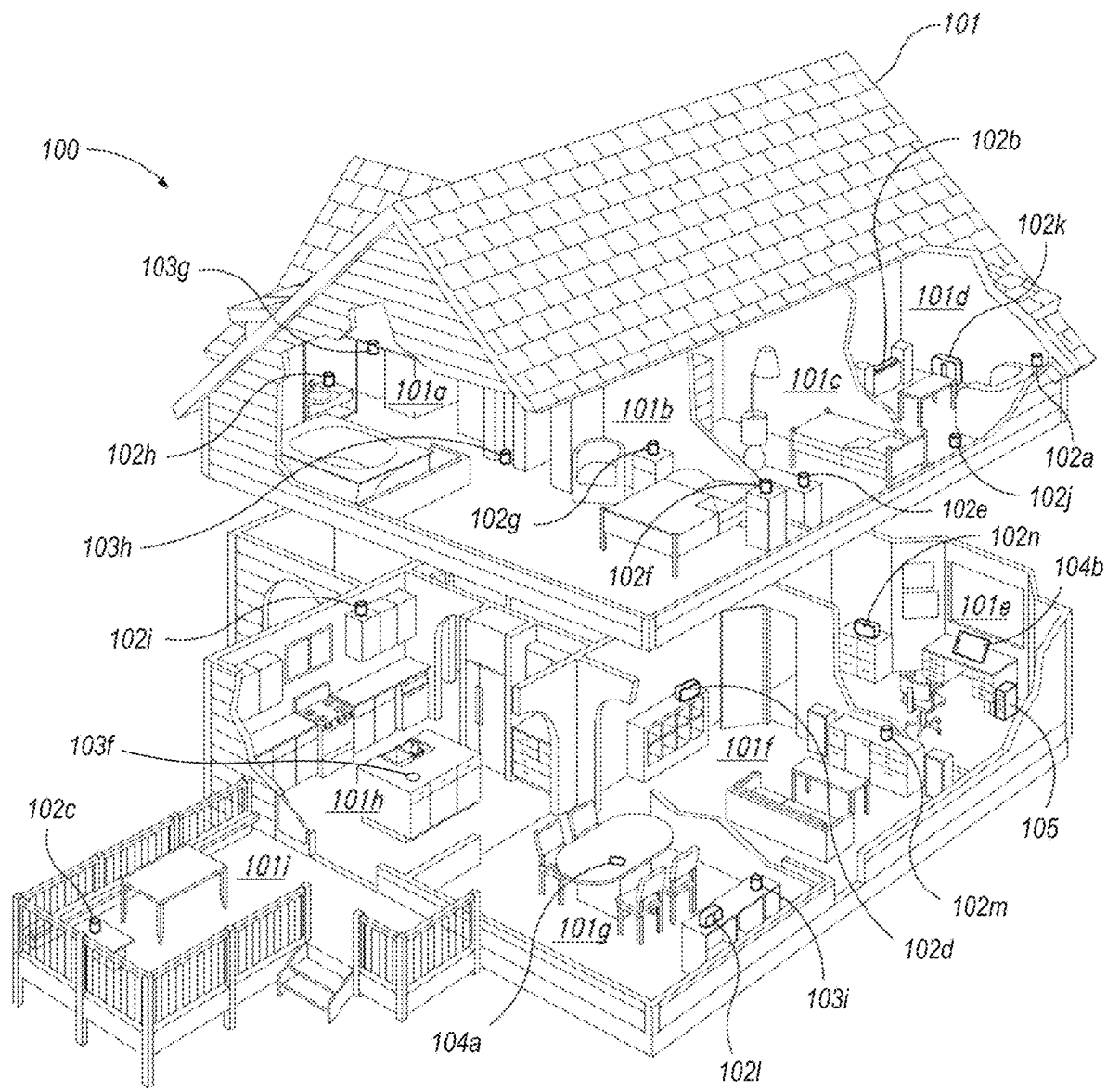
FIG. 1A is a partial cutaway view of an environment having a media playback system configured in accordance with aspects of the disclosed technology.

The drawings are for purposes of illustrating example embodiments, but it is understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103a is first introduced and discussed with reference to FIG. 1A.

DETAILED DESCRIPTION

I. Overview

Voice control can be beneficial for a "smart" home having smart appliances and related devices, such as wireless illumination devices, home-automation devices (e.g., thermostats, door locks, etc.), and audio playback devices. In some implementations, networked microphone devices may be used to control smart home devices. A network microphone device will typically include a microphone for receiving voice inputs. The network microphone device can forward voice inputs to a voice assistant service (VAS), such as AMAZON's ALEXA, APPLE's SIRI, MICROSOFT's CORTANA, GOOGLE ASSISTANT, etc. A traditional VAS may be a remote service implemented by cloud servers to process voice inputs. A VAS may process a voice input to determine an intent of the voice input. Based on the response, the network microphone device may cause one or more smart devices to perform an action. For example, the network microphone device may instruct an illumination device to turn on/off based on the response to the instruction from the VAS.

A voice input detected by a network microphone device will typically include a wake word followed by an utterance containing a user request. The wake word is typically a predetermined word or phrase used to "wake up" and invoke the VAS for interpreting the intent of the voice input. For instance, in querying the AMAZON VAS, a user might speak the wake word "Alexa." Other examples include "Ok, Google" for invoking the GOOGLE VAS and "Hey, Siri" for invoking the APPLE VAS, or "Hey, Sonos" for a VAS offered by SONOS. In various embodiments, a wake word may also be referred to as, e.g., an activation-, trigger-, wakeup-word or phrase, and may take the form of any suitable word; combination of words, such as phrases; and/or audio cues indicating that the network microphone device and/or an associated VAS is to invoke an action.

A network microphone device listens for a user request or command accompanying a wake word in the voice input. In some instances, the user request may include a command to control a third-party device, such as a thermostat (e.g., NEST thermostat), an illumination device (e.g., a PHILIPS HUE lighting device), or a media playback device (e.g., a SONOS playback device). For example, a user might speak the wake word "Alexa" followed by the utterance "set the thermostat to 68 degrees" to set the temperature in a home using the Amazon VAS. A user might speak the same wake word followed by the utterance "turn on the living room" to turn on illumination devices in a living room area of the home. The user may similarly speak a wake word followed by a request to play a particular song, an album, or a playlist of music on a playback device in the home.

A VAS may employ natural language understanding (NLU) systems to process voice inputs. NLU systems typically require multiple remote servers that are programmed to detect the underlying intent of a given voice input. For example, the servers may maintain a lexicon of language; parsers; grammar and semantic rules; and associated processing algorithms to determine the user's intent.

As it relates to voice control of media playback systems, however, such as multi-zone playback systems, conventional VAS(es) may be particularly limited. For example, a traditional VAS may only support voice control for rudimentary device playback or require the user to use specific and stilted phraseology to interact with a device rather than natural dialogue. Further, a traditional VAS may not support multi-zone playback or other features that a user wishes to control, such as device grouping, multi-room volume, equalization parameters, and/or audio content for a given playback scenario. Controlling such functions may require significantly more resources beyond those needed for rudimentary playback.

In addition to the above-mentioned limitations, typical VAS(es) may integrate with relatively few, if any, media content services. Thus, users generally can only interact with less than a handful of media content services through typical VAS(es), and are usually restricted to only those providers associated with a particular VAS.

Restricting voice control-enabled media content searching and playing to a single media content service may greatly limit the media content available to a user on a voice-requested basis, as different media content services have different media content catalogs. For example, some artists/albums/songs are only available on select media content services, and certain types of media content, such as podcasts and audiobooks, are only available on select media content services. Moreover, different media content services employ different algorithms for suggesting new media content to users and, when taken together, these varying discovery tools expose users to a wider variety of media content than do the discovery tools of any individual media content service. This and other benefits to subscribing to multiple media content services are lost, however, on a user that is restricted to searching and playing back media from only one or two media content services.

For example, consider a user that pays a monthly subscription to a VAS provider for a first music service (such as a VAS-sponsored music service, e.g., AMAZON's AMAZON MUSIC UNLIMITED) and another monthly subscription for a second music service (e.g., SPOTIFY, I HEART RADIO, PANDORA, TUNEIN, etc.). If the user asks the VAS to play music by [Artist A], the VAS will not play back songs by [Artist A] for the user if neither of the first and second music services include songs by [Artist A] in their respective media libraries. Also, if a user has access to [Artist A]'s songs through a third music service that is not supported by the VAS, such as APPLE's iTUNES, the VAS will not provide access to this service, despite the user paying a monthly fee to have access to these songs. To access the media library of the third music service, the user will need to access the library through an alternate service, such as the iTUNES service). A related inconvenience is that the user will not be able to voice-request play back of any media content unique to iTUNES, such as user- and iTUNES-created playlists, iTUNES radio stations (such as Beats 1), etc.

In addition, it would be prohibitively difficult for those media content services not associated with any VAS (such as I HEART RADIO, PANDORA, TUNEIN, etc.) and those media playback systems not associated with a VAS to develop voice-processing technology that could be even moderately competitive with that of the already-existing VAS(es). This is because NLU processing is computationally intensive, and providers of VAS(es) must maintain and continually develop processing algorithms and deploy an increasing number of resources, such as additional cloud servers, to process and learn from the myriad voice inputs that are received from users all over the world. Specifically with respect to media playback systems, inclusion of a sophisticated VAS would add significant cost, and also cause the system to consume considerably more energy, which of course is undesirable.

The media playback systems detailed herein address the above-mentioned and other challenges associated with searching and accessing media content across multiple media content services by providing a cross-service content platform that functions as a gateway between the VAS (or multiple VAS(es)) and the media content services. For example, the media playback system may include a network microphone device that captures a voice input including a request to play particular media content. To identify or "find" the requested media content based on the voice input, the media playback system may send a message including the voice input and other information (if necessary) to a VAS to derive information related to the requested media content from the voice input. In some embodiments, the media playback system may send a VAS only certain information (e.g., only certain metadata) that is needed by the VAS to interpret the voice input and provide an interpretation sufficient for the VAS to conduct a search to resolve one or more aspects of the request (if necessary). For example, a knowledge base of user intent data handled by the media playback system and/or the VAS may learn a household's preferences for certain types of content (e.g., preferred albums, live versions of songs over radio recordings, etc.) independent of and even unaware of the media content service that ultimately provides the desired content. In one aspect, this enables media content to be selected for play back by the media playback system in a way that does not discriminate one media content service over the other. In another aspect, certain metadata may be excluded in the exchanges between the media playback system and the VAS, such as information that would expressly identify a media content service. Thus, although the VAS performs the initial search of the media content request, the media playback system maintains control of the parameters of the search, as the VAS's search is based only on information provided to the VAS by the media playback system. In some embodiments described below, the VAS may be instructed by the media playback system to provide a voice output to the user that indicates which media content service is selected or available to play the desired media content without biasing the initial search toward a particular media content service.

The media playback systems of the present technology may also dictate that the VAS identify certain attributes, such as possible songs, artists, album titles that are suitable and/or intended by the user, such as within a specific data structure generated by the VAS (for example, as a result of the determination of intent by the VAS), as well as the types of information contained within the predefined structure. Once the media playback system receives a message with attributes (e.g., one more packets with requested payload from the VAS), the media playback system then sends a request to one or more media content services to find (e.g., search) for media content corresponding to the information of the messages received from the VAS. A predefined data structure and payload requested from the VAS by the media playback system may, for example, be driven by the data structure and payload required by one or more of the media content services in order to search for a particular media content.

Unlike typical VAS(es) that may only communicate or exchange data with a limited number of media content services (as described above), the media playback systems detailed herein are configured to send data to and receive data from a VAS (and in some embodiments multiple VAS(es)) and multiple media content services. As such, when conducting a voice-assisted media content search, the user is not limited to media content from the limited number of media content services associated with (e.g., sponsored by) a particular VAS. Rather, the user may search for media content on SPOTIFY and APPLE's iTunes, even though the VAS may sponsor or directly support searching iTUNEs and/or SPOTIFY. Thus, a user is provided access to a greater and more diverse array of media content via voice control.

While some embodiments described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

Figure 1B:
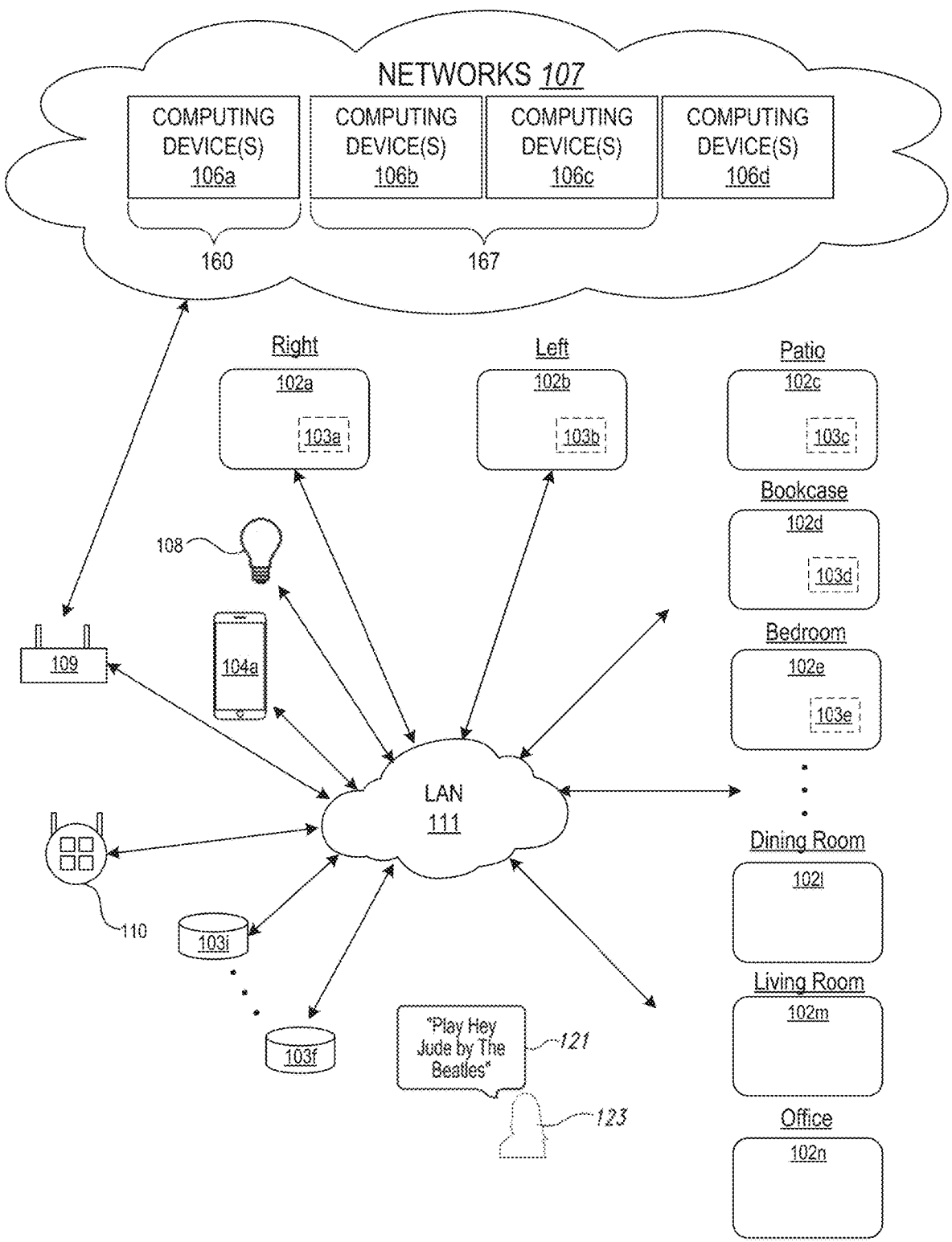
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment" or "environment 101". The environment 101 comprises a household having several rooms, spaces, and/or playback zones, including a master bathroom 101a, a master bedroom 101b (referred to herein as "Nick's Room"), a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102a-102n), network microphone devices 103 (identified individually as "NMD(s)" 103a-103i), and controller devices 104a and 104b (collectively "controller devices 104"). The home environment may include additional and/or other computing devices, including local network devices, such as one or more smart illumination devices 108 (FIG. 1B), and a smart thermostat 110, and a local computing device 105 (FIG. 1A).

Referring to FIG. 1B, the various playback, network microphone, and controller devices 102-104 and/or other network devices of the MPS 100 may be coupled to one another via point-to-point connections and/or over other connections, which may be wired and/or wireless, via a LAN 111 including a network router 109. For example, the playback device 102j (which may be designated as "Left") in the Den 101d (FIG. 1A) may have a point-to-point connection with the playback device 102a in the Den 101d (which may be designated as "Right"). In one embodiment, the Left playback device 102j may communicate over the point-to-point connection with the Right playback device 102a. In a related embodiment, the Left playback device 102j may communicate with other network devices via the point-to-point connection and/or other connections via the LAN 111.

As further shown in FIG. 1B, in some embodiments the MPS 100 is coupled to one or more remote computing devices 106, which may comprise different groups of remote computing devices 106a-106c associated with various services, including voice assistant services ("VAS(es)"), media content services ("MCS(es)"), and/or services for supporting operations of the MPS 100 via a wide area network (WAN) 107. In some embodiments, the remote computing device(s) may be cloud servers. The remote computing device(s) 106 may be configured to interact with computing devices in the environment 101 in various ways. For example, the remote computing device(s) 106 may be configured to facilitate streaming and controlling playback of media content, such as audio, in the home environment. In one aspect of the technology described in greater detail below, the various playback devices, network microphone devices, and/or controller devices 102-104 are coupled to at least one remote computing device associated with a VAS, and at least one remote computing device associated with an MCS. Also, as described in greater detail below, in some embodiments the various playback devices, network microphone devices, and/or controller devices 102-104 may be coupled to several remote computing devices, each associated with a different VAS and/or to a plurality of remote computing devices associated with multiple different media content services.

In some embodiments, one or more of the playback devices 102 may include an on-board (e.g., integrated) network microphone device. For example, the playback devices 102a-e include corresponding NMDs 103a-e, respectively. Playback devices that include network microphone devices may be referred to herein interchangeably as a playback device or a network microphone device unless indicated otherwise in the description.

In some embodiments, one or more of the NMDs 103 may be a stand-alone device. For example, the NMDs 103f and 103g may be stand-alone network microphone devices. A stand-alone network microphone device may omit components typically included in a playback device, such as a speaker or related electronics. In such cases, a stand-alone network microphone device may not produce audio output or may produce limited audio output (e.g., relatively low-quality audio output).

In use, a network microphone device may receive and process voice inputs from a user in its vicinity. For example, a network microphone device may capture a voice input upon detection of the user speaking the input. In the illustrated example, the NMD 103d of the playback device 102d in the Living Room may capture the voice input of a user in its vicinity. In some instances, other network microphone devices (e.g., the NMDs 103f and 103i) in the vicinity of the voice input source (e.g., the user) may also detect the voice input. In such instances, network microphone devices may arbitrate between one another to determine which device(s) should capture and/or process the detected voice input. Examples for selecting and arbitrating between network microphone devices may be found, for example, in U.S. application Ser. No. 15/438,749 filed Feb. 21, 2017, and titled "Voice Control of a Media Playback System," which is incorporated herein by reference in its entirety.

In certain embodiments, a network microphone device may be assigned to a playback device that may not include a network microphone device. For example, the NMD 103f may be assigned to the playback devices 102i and/or 102l in its vicinity. In a related example, a network microphone device may output audio through a playback device to which it is assigned. Additional details regarding associating network microphone devices and playback devices as designated or default devices may be found, for example, in previously referenced U.S. patent application Ser. No. 15/438,749.

In use, the network microphone devices 103 are configured to interact with a voice assistant service VAS, such as a first VAS 160 hosted by one or more of the remote computing devices 106a. For example, as shown in FIG. 1B, the NMD 103f is configured to receive voice input 121 from a user 123. The NMD 103f transmits data associated with the received voice input 121 to the remote computing devices 106a of the VAS 160, which are configured to (i) process the received voice input data and (ii) transmit a corresponding command to the MPS 100. In some aspects, for example, the remote computing devices 106a comprise one or more modules and/or servers of a VAS (e.g., a VAS operated by one or more of SONOS, AMAZON, GOOGLE APPLE, MICROSOFT). The remote computing devices 106a can receive the voice input data from the NMD 103f, for example, via the LAN 111 and the router 109. In response to receiving the voice input data, the remote computing devices 106a process the voice input data (i.e., "Play Hey Jude by The Beatles"), and may determine that the processed voice input includes a command to play a song (e.g., "Hey Jude"). In response, one of the computing devices 106a of the VAS 160 transmits a command to one or more remote computing devices (e.g., remote computing devices 106d) associated with the MPS 100. In this example, the VAS 160 may transmit a command to the MPS 100 to play back "Hey Jude" by the Beatles. As described below, the MPS 100, in turn, can query a plurality of suitable media content services ("MCS(es)") 167 for media content, such as by sending a request to a first MCS hosted by first one or more remote computing devices 106b and a second MCS hosted by second one or more remote computing devices 106c. In some aspects, for example, the remote computing devices 106b and 106c comprise one or more modules and/or servers of a corresponding MCS (e.g., an MCS operated by one or more of SPOTIFY, PANDORA, AMAZON MUSIC , etc.).

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment as shown in FIG. 1A. For instance, the technologies described herein may be useful in other home environment configurations comprising more or fewer of any of the playback, network microphone, and/or controller devices 102-104. For example, the technologies herein may be utilized within an environment containing a single playback device 102 and/or a single network microphone device 103. In such cases, the LAN 111 may be eliminated and the single playback device 102 and/or the single network microphone device 103 may communicate directly with the remote computing devices 106a-d. In some embodiments, a telecommunication network (e.g., an LTE network, a 5G network) may communicate with the various playback, network microphone, and/or controller devices 102-104 independent of a LAN.

a. Example Playback and Network Microphone Devices

Figure 2A:
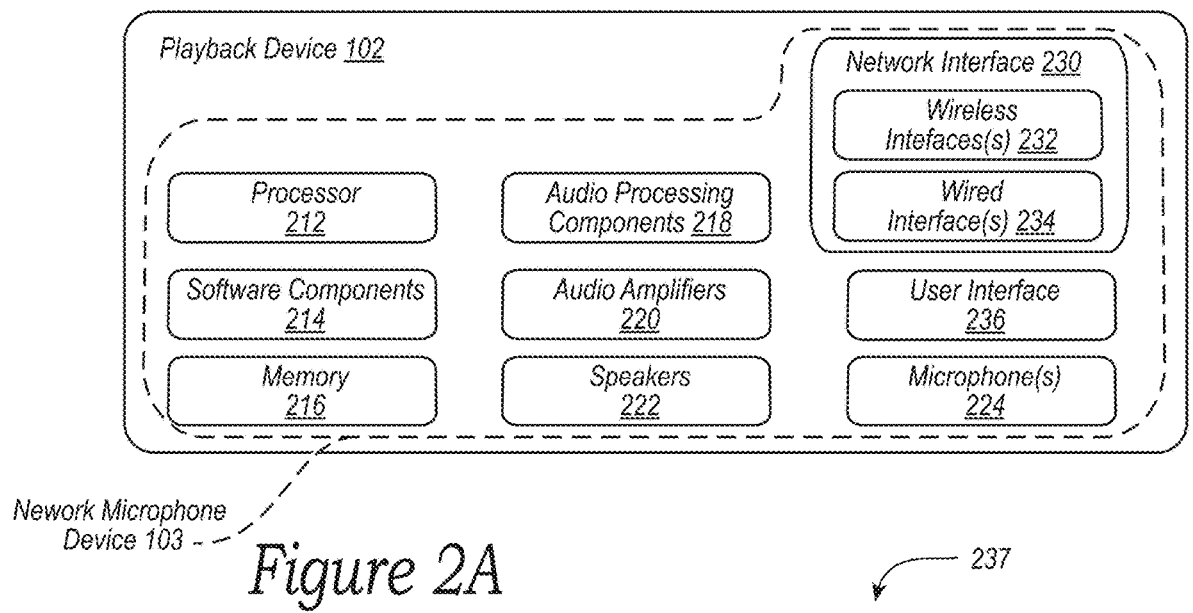
FIG. 2A is a functional block diagram of an example playback device.

FIG. 2A is a functional block diagram illustrating certain aspects of a selected one of the playback devices 102 shown in FIG. 1A. As shown, such a playback device may include a processor 212, software components 214, memory 216, audio processing components 218, audio amplifier(s) 220, speaker(s) 222, and a network interface 230 including wireless interface(s) 232 and wired interface(s) 234. In some embodiments, a playback device may not include the speaker(s) 222, but rather a speaker interface for connecting the playback device to external speakers. In certain embodiments, the playback device may include neither the speaker(s) 222 nor the audio amplifier(s) 222, but rather an audio interface for connecting a playback device to an external audio amplifier or audio-visual receiver.

A playback device may further include a user interface 236. The user interface 236 may facilitate user interactions independent of or in conjunction with one or more of the controller devices 104. In various embodiments, the user interface 236 includes one or more of physical buttons and/or graphical interfaces provided on touch sensitive screen(s) and/or surface(s), among other possibilities, for a user to directly provide input. The user interface 236 may further include one or more of lights and the speaker(s) to provide visual and/or audio feedback to a user.

In some embodiments, the processor 212 may be a clock-driven computing component configured to process input data according to instructions stored in the memory 216. The memory 216 may be a tangible computer-readable medium configured to store instructions executable by the processor 212. For example, the memory 216 may be data storage that can be loaded with one or more of the software components 214 executable by the processor 212 to achieve certain functions. In one example, the functions may involve a playback device retrieving audio data from an audio source or another playback device. In another example, the functions may involve a playback device sending audio data to another device on a network. In yet another example, the functions may involve pairing of a playback device with one or more other playback devices to create a multi-channel audio environment.

Certain functions may involve a playback device synchronizing playback of audio content with one or more other playback devices. During synchronous playback, a listener may not perceive time-delay differences between playback of the audio content by the synchronized playback devices. U.S. Pat. No. 8,234,395 filed Apr. 4, 2004, and titled "System and method for synchronizing operations among a plurality of independently clocked digital data processing devices," which is hereby incorporated by reference in its entirety, provides in more detail some examples for audio playback synchronization among playback devices.

The audio processing components 218 may include one or more digital-to-analog converters (DAC), an audio preprocessing component, an audio enhancement component or a digital signal processor (DSP), and so on. In some embodiments, one or more of the audio processing components 218 may be a subcomponent of the processor 212. In one example, audio content may be processed and/or intentionally altered by the audio processing components 218 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback, the audio processing components 208 may be configured to process audio content to be sent to one or more other playback devices for playback.

Audio content to be processed and/or played back by a playback device may be received from an external source, such as via an audio line-in input connection (e.g., an auto-detecting 3.5 mm audio line-in connection) or the network interface 230.

The network interface 230 may be configured to facilitate a data flow between a playback device and one or more other devices on a data network. As such, a playback device may be configured to receive audio content over the data network from one or more other playback devices in communication with a playback device, network devices within a local area network, or audio content sources over a wide area network such as the Internet. In one example, the audio content and other signals transmitted and received by a playback device may be transmitted in the form of digital packet data containing an Internet Protocol (IP)-based source address and IP-based destination addresses. In such a case, the network interface 230 may be configured to parse the digital packet data such that the data destined for a playback device is properly received and processed by the playback device.

As shown, the network interface 230 may include wireless interface(s) 232 and wired interface(s) 234. The wireless interface(s) 232 may provide network interface functions for a playback device to wirelessly communicate with other devices (e.g., other playback device(s), speaker(s), receiver(s), network device(s), control device(s) within a data network the playback device is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 234 may provide network interface functions for a playback device to communicate over a wired connection with other devices in accordance with a communication protocol (e.g., IEEE 802.3). While the network interface 230 shown in FIG. 2A includes both wireless interface(s) 232 and wired interface(s) 234, the network interface 230 may in some embodiments include only wireless interface(s) or only wired interface(s).

Figure 2B:
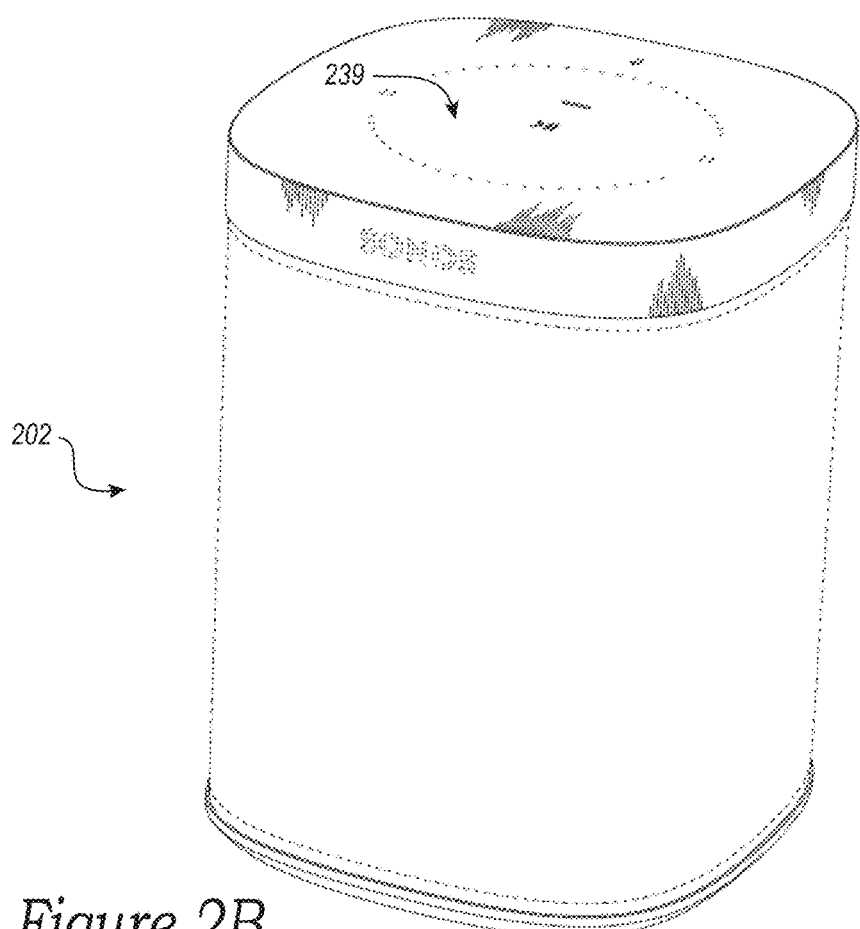
FIG. 2B is an isometric diagram of an example playback device that includes a network microphone device.

As discussed above, a playback device may include a network microphone device, such as one of the NMDs 103 shown in FIG. 1A. A network microphone device may share some or all the components of a playback device, such as the processor 212, the memory 216, the microphone(s) 224, etc. In other examples, a network microphone device includes components that are dedicated exclusively to operational aspects of the network microphone device. For example, a network microphone device may include far-field microphones and/or voice processing components, which in some instances a playback device may not include. In another example, a network microphone device may include a touch-sensitive button for enabling/disabling a microphone. In yet another example, a network microphone device can be a stand-alone device, as discussed above. FIG. 2B is an isometric diagram showing an example playback device 202 incorporating a network microphone device. The playback device 202 has a control area 237 at the top of the device for enabling/disabling microphone(s). The control area 237 is adjacent another area 239 at the top of the device for controlling playback.

By way of illustration, SONOS, Inc. presently offers (or has offered) for sale certain playback devices including a "PLAY:1," "PLAY:3," "PLAY:5," "PLAYBAR," "PLAYBASE," "BEAM," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2A or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Device Configurations

Figure 3A:
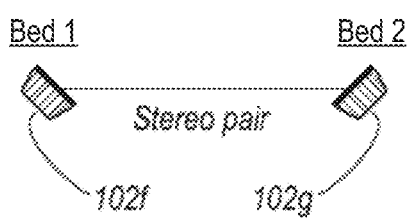
FIGS. 3A-3E are diagrams showing example zones and zone groups in accordance with aspects of the disclosure.
Figure 3B:
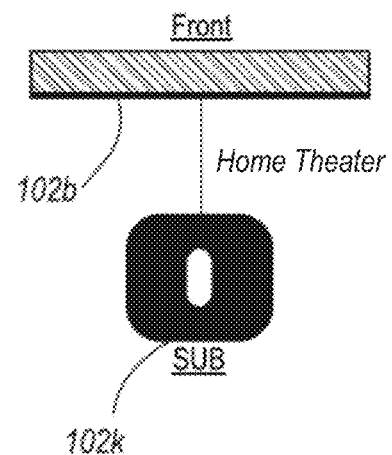
Figure 3C:
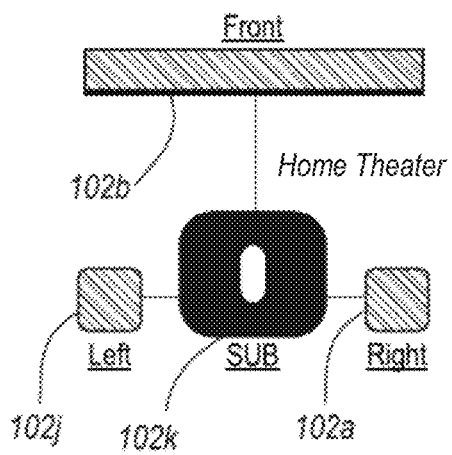
Figure 3D:
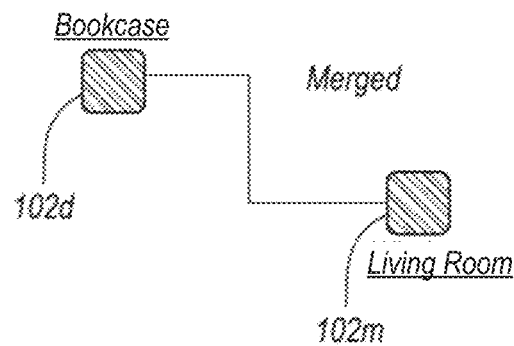
Figure 3E:
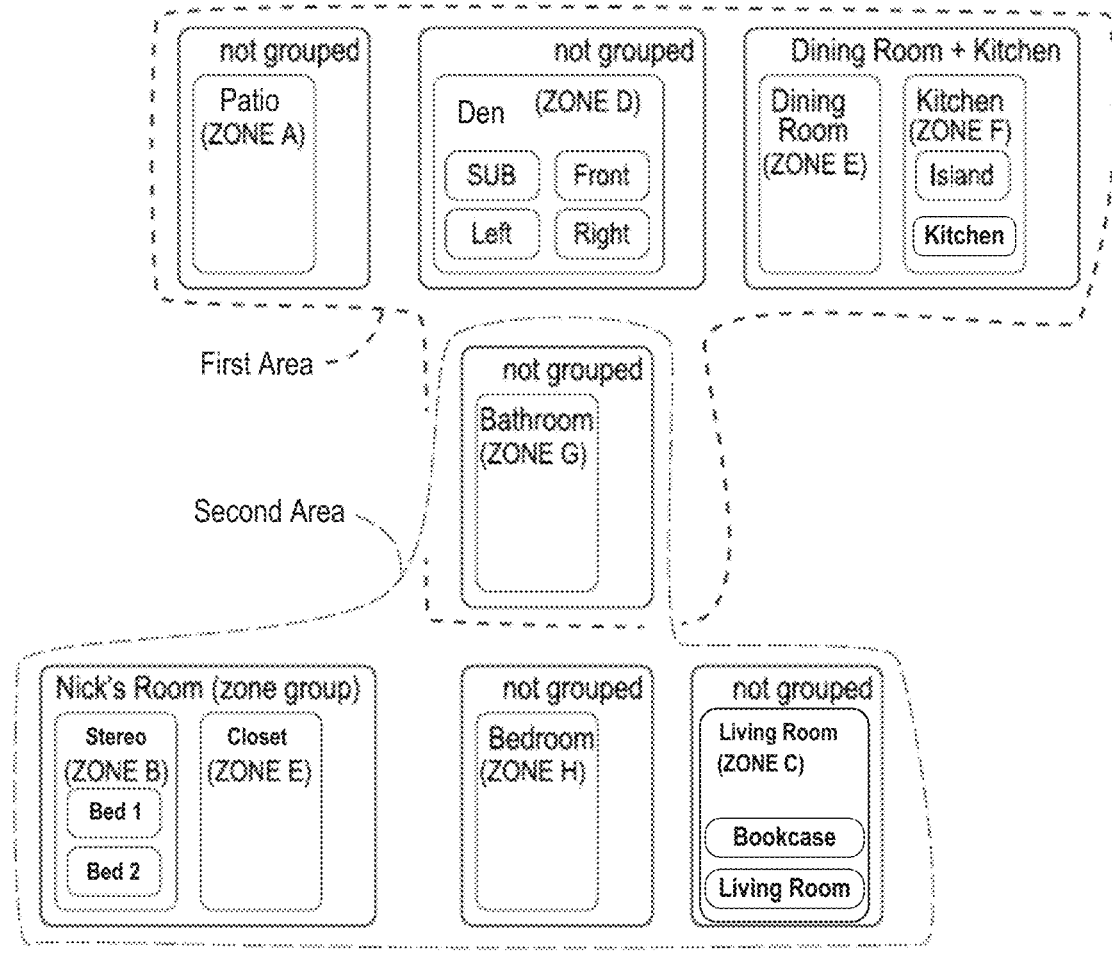

FIGS. 3A-3E show example configurations of playback devices in zones and zone groups. Referring first to FIG. 3E, in one example, a single playback device may belong to a zone. For example, the playback device 102c on the Patio may belong to Zone A. In some implementations described below, multiple playback devices may be "bonded" to form a "bonded pair" which together form a single zone. For example, the playback device 102f (FIG. 1A) named Bed1 in FIG. 3E may be bonded to the playback device 102g (FIG. 1A) named Bed2 in FIG. 3E to form Zone B. Bonded playback devices may have different playback responsibilities (e.g., channel responsibilities). In another implementation described below, multiple playback devices may be merged to form a single zone. For example, the playback device 102d named Bookcase may be merged with the playback device 102m named Living Room to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

Each zone in the MPS 100 may be provided for control as a single user interface (UI) entity. For example, Zone A may be provided as a single entity named Patio. Zone C may be provided as a single entity named Living Room. Zone B may be provided as a single entity named Stereo.

In various embodiments, a zone may take on the name of one of the playback device(s) belonging to the zone. For example, Zone C may take on the name of the Living Room device 102m (as shown). In another example, Zone C may take on the name of the Bookcase device 102d. In a further example, Zone C may take on a name that is some combination of the Bookcase device 102d and Living Room device 102m. The name that is chosen may be selected by user. In some embodiments, a zone may be given a name that is different than the device(s) belonging to the zone. For example, Zone B is named Stereo but none of the devices in Zone B have this name.

Playback devices that are bonded may have different playback responsibilities, such as responsibilities for certain audio channels. For example, as shown in FIG. 3A, the Bed1 and Bed2 devices 102f and 102g may be bonded so as to produce or enhance a stereo effect of audio content. In this example, the Bed1 playback device 102f may be configured to play a left channel audio component, while the Bed2 playback device 102g may be configured to play a right channel audio component. In some implementations, such stereo bonding may be referred to as "pairing."

Additionally, bonded playback devices may have additional and/or different respective speaker drivers. As shown in FIG. 3B, the playback device 102b named Front may be bonded with the playback device 102k named SUB. The Front device 102b may render a range of mid to high frequencies and the SUB device 102k may render low frequencies as, e.g., a subwoofer. When unbonded, the Front device 102b may render a full range of frequencies. As another example, FIG. 3C shows the Front and SUB devices 102b and 102k further bonded with Right and Left playback devices 102a and 102k, respectively. In some implementations, the Right and Left devices 102a and 102k may form surround or "satellite" channels of a home theater system. The bonded playback devices 102a, 102b, 102j, and 102k may form a single Zone D (FIG. 3E).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback device 102d and 102m in the Living Room have the single UI entity of Zone C. In one embodiment, the playback devices 102d and 102m may each output the full range of audio content each respective playback device 102d and 102m are capable of, in synchrony.

In some embodiments, a stand-alone network microphone device may be in a zone by itself. For example, the NMD 103h in FIG. 1A is named Closet and forms Zone E. A network microphone device may also be bonded or merged with another device so as to form a zone. For example, the NMD device 103f named Island may be bonded with the playback device 102i Kitchen, which together form Zone G, which is also named Kitchen. Additional details regarding associating network microphone devices and playback devices as designated or default devices may be found, for example, in previously referenced U.S. patent application Ser. No. 15/438,749. In some embodiments, a stand-alone network microphone device may not be associated with a zone.

Zones of individual, bonded, and/or merged devices may be grouped to form a zone group. For example, referring to FIG. 3E, Zone A may be grouped with Zone B to form a zone group that includes the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group, such as Dining Room+Kitchen, as shown in FIG. 3E. In some embodiments, a zone group may be given a unique name selected by a user, such as Nick's Room, as also shown in FIG. 3E.

Referring again to FIG. 2A, certain data may be stored in the memory 216 as one or more state variables that are periodically updated and used to describe the state of a playback zone, the playback device(s), and/or a zone group associated therewith. The memory 216 may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102a, 102b, 102j, and 102k. Identifiers associated with the Dining Room may indicate that the Dining Room is part of Dining Room+Kitchen group and that devices 103f and 102i are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3. An area may involve a cluster of zone groups and/or zones not within a zone group. For instance, FIG. 3E shows a first area named First Area and a second area named Second Area. The First Area includes zones and zone groups of the Patio, Den, Dining Room, Kitchen, and Bathroom. The Second Area includes zones and zone groups of the Bathroom, Nick's Room, the Bedroom, and the Living Room. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

The memory 216 may be further configured to store other data. Such data may pertain to audio sources accessible by a playback device or a playback queue that the playback device (or some other playback device(s)) may be associated with. In embodiments described below, the memory 216 is configured to store a set of command data for selecting a particular VAS when processing voice inputs.

During operation, one or more playback zones in the environment of FIG. 1A may each be playing different audio content. For instance, the user may be grilling in the Patio zone and listening to hip hop music being played by the playback device 102*c* while another user may be preparing food in the Kitchen zone and listening to classical music being played by the playback device 102*i*. In another example, a playback zone may play the same audio content in synchrony with another playback zone. For instance, the user may be in the Office zone where the playback device 102*n* is playing the same hip-hop music that is being playing by playback device 102*c* in the Patio zone. In such a case, playback devices 102*c* and 102*n* may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102*c* from the Patio zone to the Office zone, the Office zone may now include both the playback devices 102*c* and 102*n*. In some cases, the use may pair or group the moved playback device 102*c* with the Office zone and/or rename the players in the Office zone using, e.g., one of the controller devices 104 and/or voice input. As another example, if one or more playback devices 102 are moved to a particular area in the home environment that is not already a playback zone, the moved playback device(s) may be renamed or associated with a playback zone for the particular area.

Further, different playback zones of the MPS 100 may be dynamically combined into zone groups or split up into individual playback zones. For example, the Dining Room zone and the Kitchen zone may be combined into a zone group for a dinner party such that playback devices 102*i* and 102*l* may render audio content in synchrony. As another example, bonded playback devices 102 in the Den zone may be split into (i) a television zone and (ii) a separate listening zone. The television zone may include the Front playback device 102*b*. The listening zone may include the Right, Left, and SUB playback devices 102*a*, 102*j*, and 102*k*, which may be grouped, paired, or merged, as described above. Splitting the Den zone in such a manner may allow one user to listen to music in the listening zone in one area of the living room space, and another user to watch the television in another area of the living room space. In a related example, a user may implement either of the NMD 103*a* or 103*b* (FIG. 1B) to control the Den zone before it is separated into the television zone and the listening zone. Once separated, the listening zone may be controlled, for example, by a user in the vicinity of the NMD 103*a*, and the television zone may be controlled, for example, by a user in the vicinity of the NMD 103*b*. As described above, however, any of the NMDs 103 may be configured to control the various playback and other devices of the MPS 100.

c. Example Controller Devices

Figure 4A:
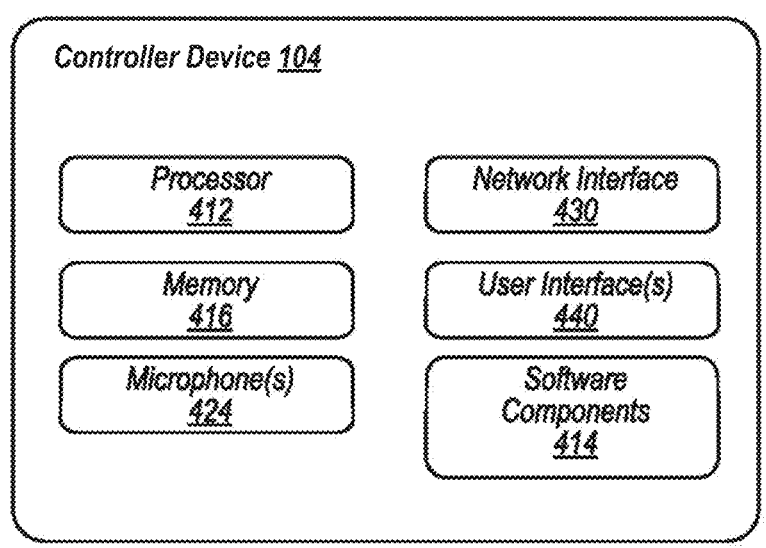
FIG. 4A is a functional block diagram of an example controller device in accordance with aspects of the disclosure.

FIG. 4A is a functional block diagram illustrating certain aspects of a selected one of the controller devices 104 of the MPS 100 of FIG. 1A. Such controller devices may also be referred to as a controller. The controller device shown in FIG. 4A may include components that are generally similar to certain components of the network devices described above, such as a processor 412, memory 416, microphone(s) 424, and a network interface 430. In one example, a controller device may be a dedicated controller for the MPS 100. In another example, a controller device may be a network device on which media playback system controller application software may be installed, such as for example, an iPhone™, iPad™ or any other smart phone, tablet or network device (e.g., a networked computer such as a PC or Mac™).

The memory 416 of a controller device may be configured to store controller application software and other data associated with the MPS 100 and a user of the system 100. The memory 416 may be loaded with one or more software components 414 executable by the processor 412 to achieve certain functions, such as facilitating user access, control, and configuration of the MPS 100. A controller device communicates with other network devices over the network interface 430, such as a wireless interface, as described above.

In one example, data and information (e.g., such as a state variable) may be communicated between a controller device and other devices via the network interface 430. For instance, playback zone and zone group configurations in the MPS 100 may be received by a controller device from a playback device, a network microphone device, or another network device, or transmitted by the controller device to another playback device or network device via the network interface 406. In some cases, the other network device may be another controller device.

Playback device control commands such as volume control and audio playback control may also be communicated from a controller device to a playback device via the network interface 430. As suggested above, changes to configurations of the MPS 100 may also be performed by a user using the controller device. The configuration changes may include adding/removing one or more playback devices to/from a zone, adding/removing one or more zones to/from a zone group, forming a bonded or merged player, separating one or more playback devices from a bonded or merged player, among others.

Figures 4B, 4C:
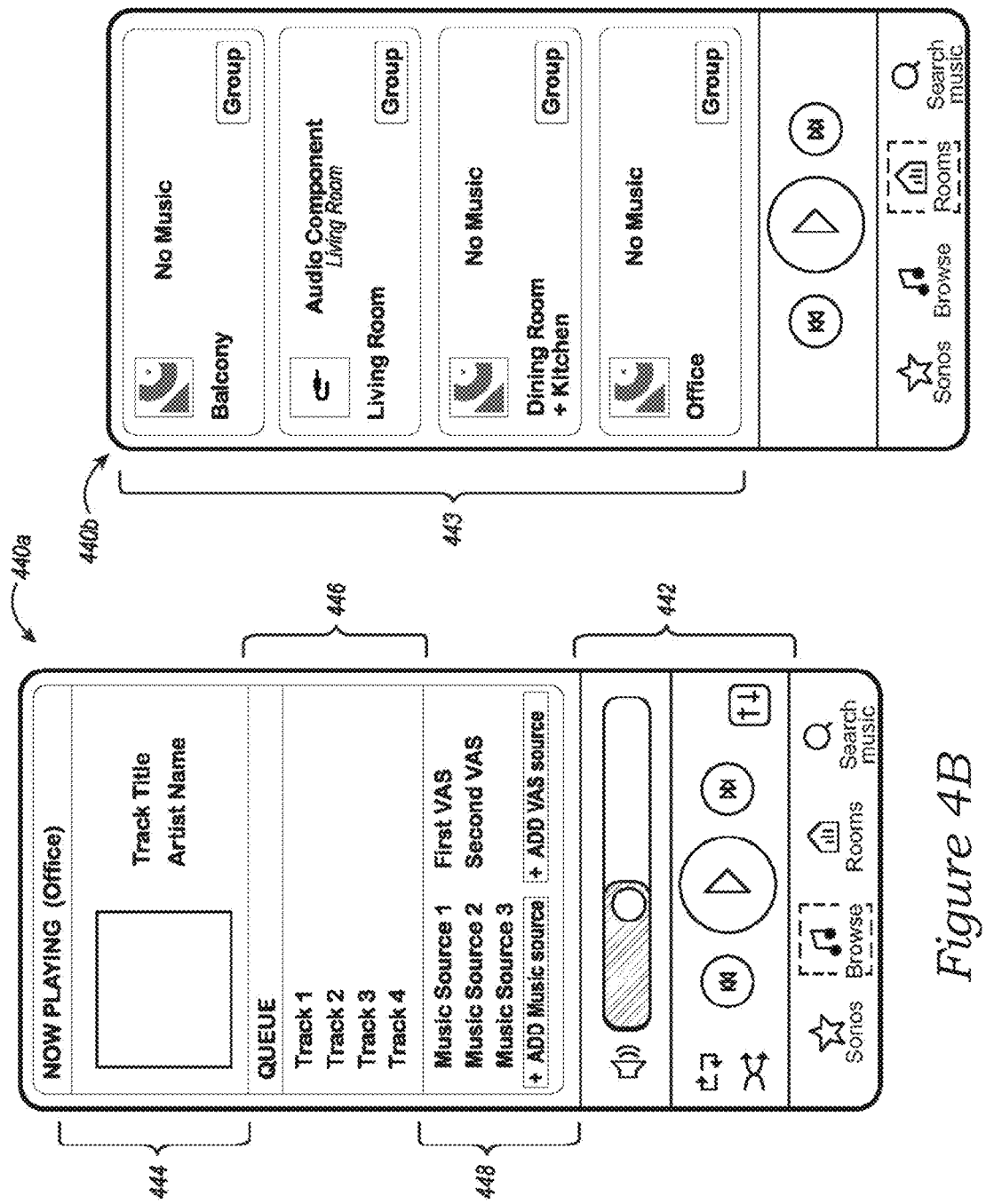
FIGS. 4B and 4C are controller interfaces in accordance with aspects of the disclosure.

The user interface(s) 440 of a controller device may be configured to facilitate user access and control of the MPS 100, by providing controller interface(s) such as the controller interfaces 440*a* and 440*b* shown in FIGS. 4B and 4C, respectively, which may be referred to collectively as the controller interface 440. Referring to FIGS. 4B and 4C together, the controller interface 440 includes a playback control region 442, a playback zone region 443, a playback status region 444, a playback queue region 446, and a sources region 448. The user interface 400 as shown is just one example of a user interface that may be provided on a network device such as the controller device shown in FIG. 4A and accessed by users to control a media playback system such as the MPS 100. Other user interfaces of varying formats, styles, and interactive sequences may alternatively be implemented on one or more network devices to provide comparable control access to a media playback system.

The playback control region 442 (FIG. 4B) may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 442 may also include selectable icons to modify equalization settings, and playback volume, among other possibilities.

The playback zone region 443 (FIG. 4C) may include representations of playback zones within the MPS 100. The playback zones regions may also include representation of zone groups, such as the Dining Room+Kitchen zone group, as shown. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 443 (FIG. 4C) may be dynamically updated as playback zone or zone group configurations are modified.

The playback status region 444 (FIG. 4B) may include graphical representations of audio content that is presently being played, previously played, or scheduled to play next in the selected playback zone or zone group. The selected playback zone or zone group may be visually distinguished on the user interface, such as within the playback zone region 443 and/or the playback status region 444. The graphical representations may include track title, artist name, album name, album year, track length, and other relevant information that may be useful for the user to know when controlling the media playback system via the user interface 440.

The playback queue region 446 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

With reference still to FIGS. 4B and 4C, the graphical representations of audio content in the playback queue region 446 (FIG. 4B) may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and selectable voice assistants associated with a corresponding VAS. The VAS(es) may be selectively assigned. In some examples, multiple VAS(es), such as AMAZON's ALEXA, MICROSOFT's CORTANA, etc., may be invokable by the same network microphone device. In some embodiments, a user may assign a VAS exclusively to one or more network microphone devices. For example, a user may assign a first VAS to one or both of the NMDs 102*a* and 102*b* in the Living Room shown in FIG. 1A, and a second VAS to the NMD 103*f* in the Kitchen. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices. As described in greater detail below, in some embodiments audio content may be provided by one or more media content services.

Example audio content sources may include a memory of one or more playback devices in a media playback system such as the MPS 100 of FIG. 1A, local music libraries on one or more network devices (such as a controller device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the MPS 100 of FIG. 1A. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

e. Example Network Microphone Devices

Figure 5A:
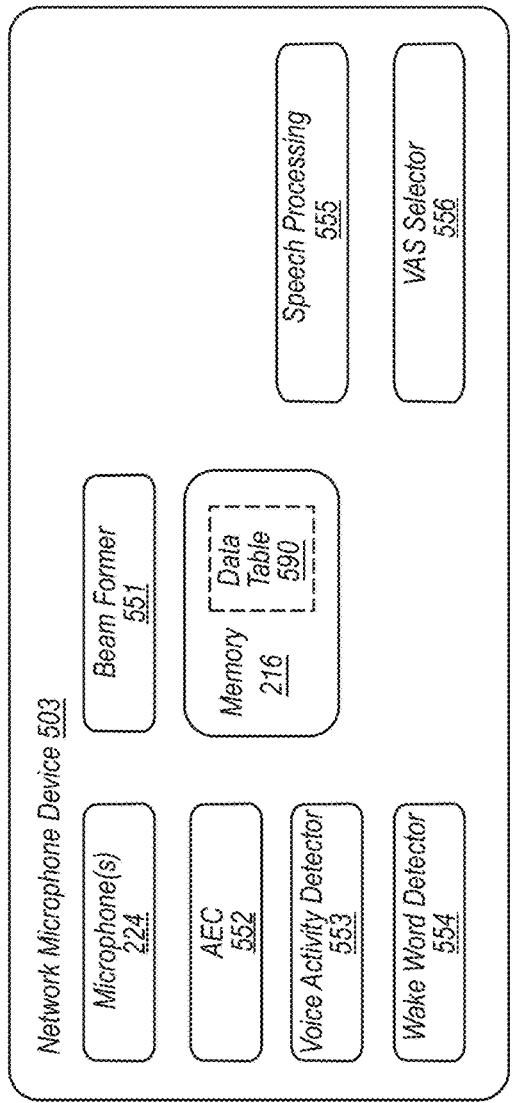
FIG. 5A is a functional block diagram of an example network microphone device in accordance with aspects of the disclosure.

FIG. 5A is a functional block diagram showing example features of an example NMD 503 in accordance with aspects of the disclosure. One or more of the NMDs 103 (FIG. 1A) may comprise the NMD 503. The network microphone device shown in FIG. 5A may include components that are generally similar to certain components of network microphone devices described above, such as the processor 212 (FIG. 2A), network interface 230 (FIG. 2A), microphone(s) 224 (FIG. 2A), and the memory 216 (FIG. 2A). Although not shown for purposes of clarity, a network microphone device may include other components, such as speakers, amplifiers, signal processors, as discussed above.

The microphone(s) 224 may be a plurality of microphones arranged to detect sound in the environment of the network microphone device. In one example, the microphone(s) 224 may be arranged to detect audio from one or more directions relative to the network microphone device. The microphone(s) 224 may be sensitive to a portion of a frequency range. In one example, a first subset of the microphone(s) 224 may be sensitive to a first frequency range, while a second subset of the microphone(s) 224 may be sensitive to a second frequency range. The microphone(s) 224 may further be arranged to capture location information of an audio source (e.g., voice, audible sound) and/or to assist in filtering background noise. In some embodiments the microphone(s) 224 may have a single microphone rather than a plurality of microphones.

A network microphone device further includes components for detecting and facilitating capture of voice input. For example, the network microphone device 503 shown in FIG. 5A includes beam former components 551, acoustic echo cancellation (AEC) components 552, voice activity detector components 553, and/or wake word detector components 554. In various embodiments, one or more of the components 551-556 may be a subcomponent of the processor 512. The beamforming and AEC components 551 and 552 are configured to detect an audio signal and determine aspects of voice input within the detect audio, such as the direction, amplitude, frequency spectrum, etc. For example, the beamforming and AEC components 551 and 552 may be used in a process to determine an approximate distance between a network microphone device and a user speaking to the network microphone device. In another example, a network microphone device may detective a relative proximity of a user to another network microphone device in a media playback system.

The voice activity detector activity components 553 are configured to work closely with the beamforming and AEC components 551 and 552 to capture sound from directions where voice activity is detected. Potential speech directions can be identified by monitoring metrics which distinguish speech from other sounds. Such metrics can include, for example, energy within the speech band relative to background noise and entropy within the speech band, which is measure of spectral structure. Speech typically has a lower entropy than most common background noise.

The wake-word detector components 554 are configured to monitor and analyze received audio to determine if any wake words are present in the audio. The wake-word detector components 554 may analyze the received audio using a wake word detection algorithm. If the wake-word detector 554 detects a wake word, a network microphone device may process voice input contained in the received audio. Example wake word detection algorithms accept audio as input and provide an indication of whether a wake word is present in the audio. Many first- and third-party wake word detection algorithms are known and commercially available. For instance, operators of a voice service may make their algorithm available for use in third-party devices. An algorithm may be trained to detect certain wake words.

In some embodiments, a network microphone device may include additional and/or alternate components for detecting and facilitating capture of voice input. For example, a network microphone device may incorporate linear filtering components (e.g., in lieu of beam former components), such as components described in U.S. patent application Ser. No. 15/984,073, filed May 18, 2018, titled "Linear Filtering for Noise-Suppressed Speech Detection," which is incorporated by reference herein in its entirety.

In some embodiments, the wake word detector 554 includes multiple detectors configured to run multiple wake word detection algorithms on the received audio simultaneously (or substantially simultaneously). As noted above, different voice services (e.g. AMAZON's ALEXA, APPLE's SIRI, MICROSOFT's CORTANA, GOOGLE'S Assistant, etc.) each use a different wake word for invoking their respective voice service. To support multiple services, the wake word detector 554 may run the received audio through the wake word detection algorithm for each supported voice service in parallel. In such embodiments, the network microphone device 103 may include VAS selector components 556 configured to pass voice input to the appropriate voice assistant service. In other embodiments, the VAS selector components 556 may be omitted.

In some embodiments, a network microphone device may include speech processing components 555 configured to further facilitate voice processing, such as by performing voice recognition that is trained to recognize a particular user or a particular set of users associated with a household. Voice recognition software may implement voice-processing algorithms that are tuned to specific voice profile(s).

In some embodiments, one or more of the components described above, such as one or more of the components 551-556, can operate in conjunction with the microphone(s) 224 to detect and store a user's voice profile, which may be associated with a user account of the MPS 100. In some embodiments, voice profiles may be stored as and/or compared to variables stored in the set of command information, or data table 590, as shown in FIG. 5A. The voice profile may include aspects of the tone or frequency of user's voice and/or other unique aspects of the user such as those described in previously referenced U.S. patent application Ser. No. 15/438,749.

In some embodiments, one or more of the components described above, such as one or more of the components 551-556, can operate in conjunction with the microphone array 524 to determine the location of a user in the home environment and/or relative to a location of one or more of the NMDs 103. Techniques for determining the location or proximity of a user may include or more techniques disclosed in previously referenced U.S. patent application Ser. No. 15/438,749, U.S. Pat. No. 9,084,058 filed Dec. 29, 2011, and titled "Sound Field Calibration Using Listener Localization," and U.S. Pat. No. 8,965,033 filed Aug. 31, 2012, and titled "Acoustic Optimization." Each of these applications is incorporated herein by reference in its entirety.

Figure 5B:
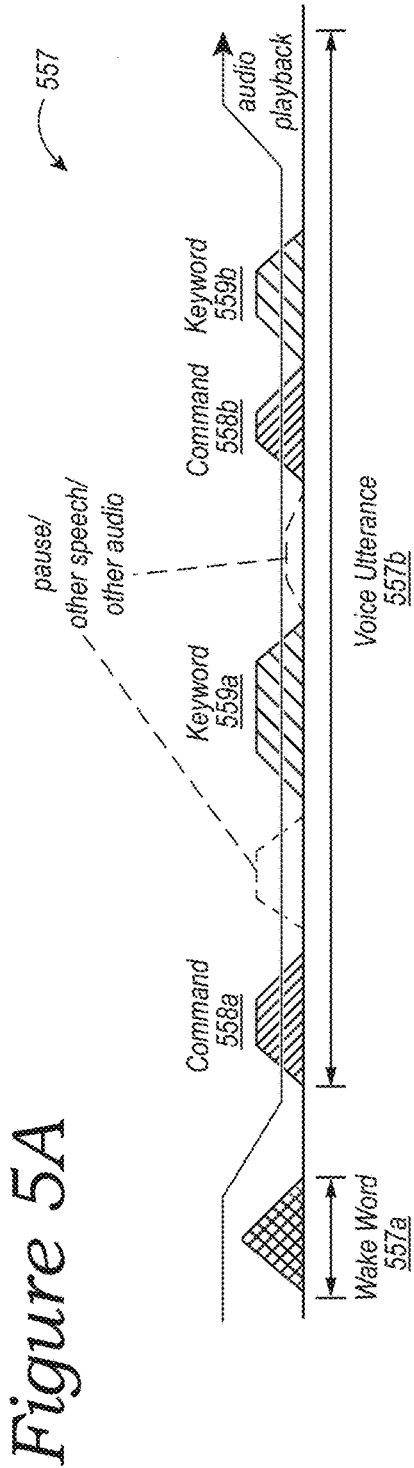
FIG. 5B is a diagram of an example voice input in accordance with aspects of the disclosure.

FIG. 5B is a diagram of an example voice input in accordance with aspects of the disclosure. The voice input may be captured by a network microphone device, such as by one or more of the network microphone devices 103 (FIG. 1A) and 503 (FIG. 5A). Capturing the voice input may include storing the voice input in physical memory storage used to temporarily store data, such as in conjunction with transmitting a request to a voice assistant service, as described in greater detail below. In some embodiments, a network microphone device may include one or more buffers, such as a buffer disclosed in U.S. patent application Ser. No. 15/989,715 filed Jun. 13, 2018, and titled "Determining and Adapting to Changes in Microphone Performance of Playback Devices," which is incorporated by reference herein in its entirety. Each of these applications is incorporated herein by reference in its entirety.

The voice input may include a wake word portion 557a and a voice utterance portion 557b (collectively "voice input 557"). In some embodiments, the wake word 557a can be a known wake word, such as "Alexa," which is associated with AMAZON's ALEXA. In other embodiments, the voice input 557 may not include a wake word.

In some embodiments, a network microphone device may output an audible and/or visible response upon detection of the wake word portion 557a. In addition or alternately, a network microphone device may output an audible and/or visible response after processing a voice input and/or a series of voice inputs (e.g., in the case of a multi-turn request).

The voice utterance portion 557b of the voice input 557 may include, for example, one or more spoken commands 558 (identified individually as a first command 558a and a second command 558b) and one or more spoken keywords 559 (identified individually as a first keyword 559a and a second keyword 559b). A keyword may be, for example, a word in the voice input identifying a particular device or group in the MPS 100. As used herein, the term "keyword" may refer to a single word (e.g., "Bedroom") or a group of words (e.g., "the Living Room"). In one example, the first command 557a can be a command to play music, such as a specific song, album, playlist, etc. In this example, the keywords 559 may be one or more words identifying one or more zones in which the music is to be played, such as the Living Room and the Dining Room (FIG. 1A). In some examples, the voice utterance portion 557b can include other information, such as detected pauses (e.g., periods of non-speech) between words spoken by a user, as shown in FIG. 5B. The pauses may demarcate the locations of separate commands, keywords, or other information spoke by the user within the voice utterance portion 557b.

In some embodiments, the MPS 100 is configured to temporarily reduce the volume of audio content that it is playing while detecting the wake word portion 557a. The MPS 100 may restore the volume after processing the voice input 557, as shown in FIG. 5B. Such a process can be referred to as ducking, examples of which are disclosed in previously referenced U.S. patent application Ser. No. 15/438,749.

f. Example Network and Remote Computing Systems

Figure 6:
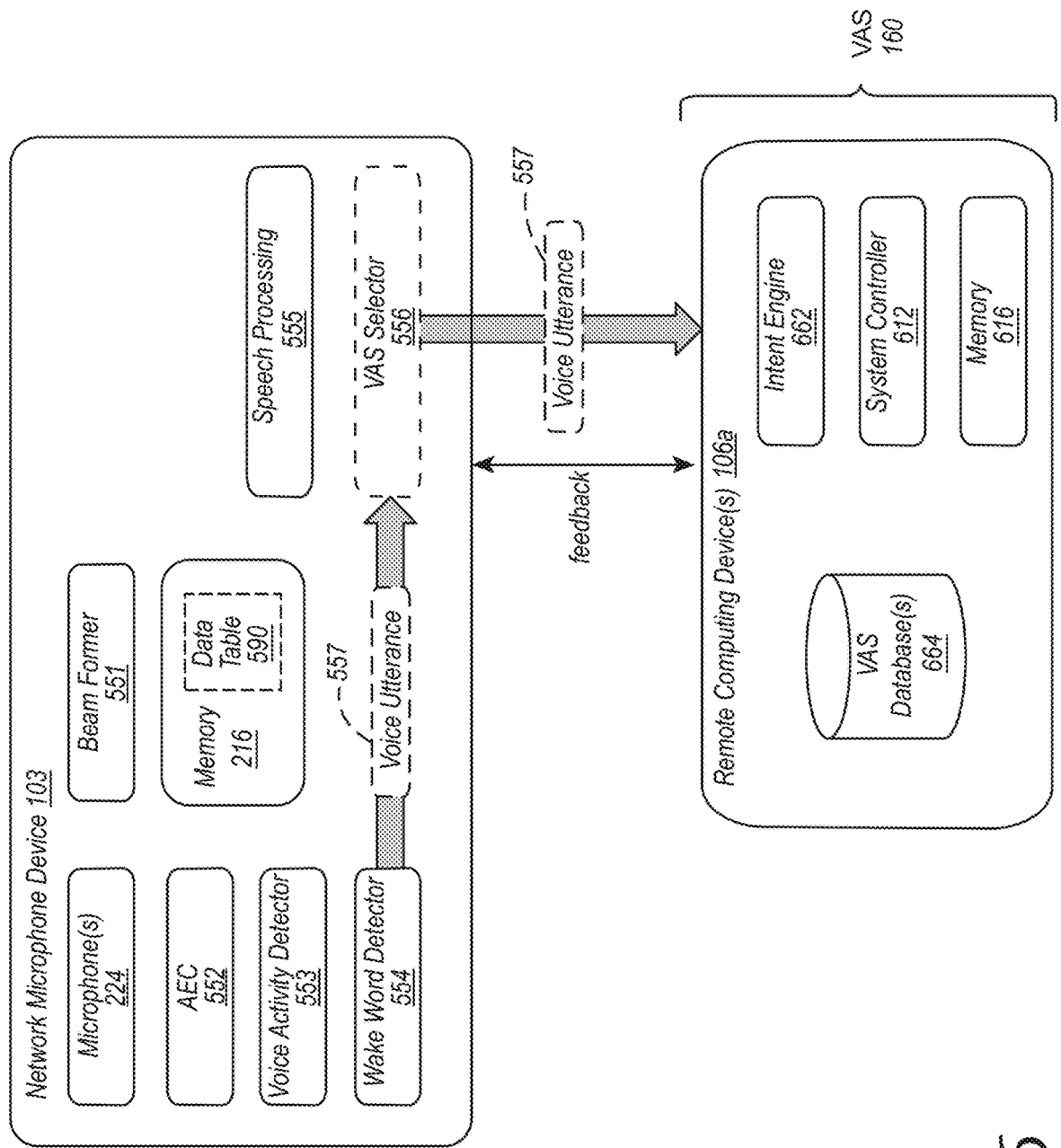
FIG. 6 is a functional block diagram of example remote computing device(s) in accordance with aspects of the disclosure.

As discussed above, the MPS 100 may be configured to communicate with one or more remote computing devices (e.g., cloud servers) associated with one or more VAS(es). FIG. 6 is a functional block diagram showing remote computing devices associated with an example VAS configured to communicate with the MPS 100. As shown in FIG. 6, in various embodiments one or more of the NMDs 103 may send voice inputs over the WAN 107 to the one or more remote computing device(s) associated with the one or more VAS(es). For purposes of illustration, selected communication paths of the voice input 557 are represented by arrows in FIG. 6. In some embodiments, the one or more NMDs 103 only send the voice utterance portion 557b (FIG. 5B) of the voice input 557 to the remote computing device(s) associated with the one or more VAS(es) (and not the wake word portion 557a). In some embodiments, the one or more NMDs 103 send both the voice utterance portion 557b and the wake word portion 557a (FIG. 5B) to the remote computing device(s) associated with the one or more VAS(es).

As shown in FIG. 6, the remote computing device(s) associated with the VAS(es) may include a memory 616, an intent engine 662, and a system controller 612 comprising one or more processors. In some embodiments, the intent engine 662 is a subcomponent of the system controller 612. The memory 616 may be a tangible computer-readable medium configured to store instructions executable by the system controller 612 and/or one or more of the playback devices, NMDs, and/or controller devices 102-104.

The intent engine 662 may receive a voice input from the MPS 100 after it has been converted to text by a speech-to-text engine (not shown). A speech-to-text engine may be located at or distributed across one or more other computing devices, such as the one or more remote computing devices 106d (FIG. 1B).

Upon receiving the voice input 557 from the MPS 100, the intent engine 662 processes the voice input 557 and determines an intent of the voice input 557. While processing the voice input 557, the intent engine 662 may determine if certain command criteria are met for particular command(s) detected in the voice input 557. Command criteria for a given command in a voice input may be based, for example, on the inclusion of certain keywords within the voice input. In addition or alternately, command criteria for given command(s) may involve detection of one or more control state and/or zone state variables in conjunction with detecting the given command(s). Control state variables may include, for example, indicators identifying a level of volume, a queue associated with one or more device(s), and playback state, such as whether devices are playing a queue, paused, etc. Zone state variables may include, for example, indicators identifying which, if any, zone players are grouped. The command information may be stored in memory of e.g., the databases 664 and/or the memory 216 of the one or more network microphone devices.

In some embodiments, the intent engine 662 is in communication with one or more database(s) 664 associated with the selected VAS and/or one or more database(s) of the MPS 100. The VAS database(s) 664 and/or database(s) of the MPS 100 may store various user data, analytics, catalogs, and other information for NLU-related and/or other processing. The VAS database(s) 664 may reside in the memory 616 of the remote computing device(s) associated with the VAS or elsewhere, such as in memory of one or more of the remote computing devices 106d and/or local network devices (e.g., the playback devices, NMDs, and/or controller devices 102-104) of the MPS 100 (FIG. 1A). Likewise, the media playback system database(s) may reside in the memory of the remote computing device(s) and/or local network devices (e.g., the playback devices, NMDs, and/or controller devices 102-104) of the MPS 100 (FIG. 1A). In some embodiments, the VAS database(s) 664 and/or database(s) associated with the MPS 100 may be updated for adaptive learning and feedback based on the voice input processing.

The various local network devices 102-105 (FIG. 1A) and/or remote computing devices 106d of the MPS 100 may exchange various feedback, information, instructions, and/or related data with the remote computing device(s) associated with the selected VAS. Such exchanges may be related to or independent of transmitted messages containing voice inputs. In some embodiments, the remote computing device(s) and the media playback system 100 may exchange data via communication paths as described herein and/or using a metadata exchange channel as described in previously referenced U.S. patent application Ser. No. 15/438, 749.

Figure 7A:
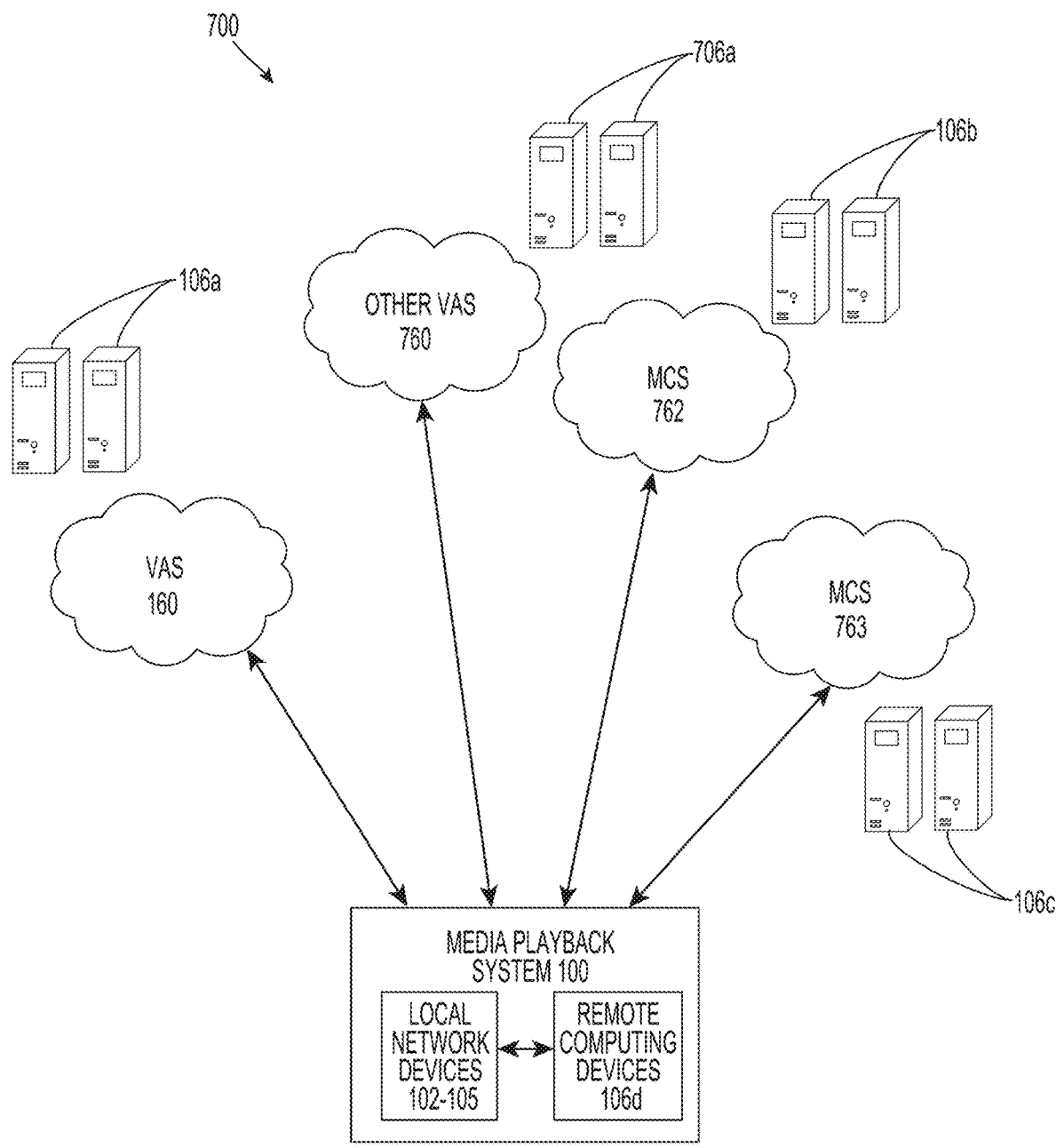
FIG. 7A is a schematic diagram of an example network system in accordance with aspects of the disclosure.

FIG. 7A depicts an example network system 700 in which a voice-assisted media content selection process is performed. The network system 700 comprises the MPS 100 coupled to: (i) the VAS 160 and associated remote computing devices 106a; (ii) one or more other VAS(es) 760, each hosted by one or more corresponding remote computing devices 706a, and (iii) a plurality of MCS(es) 167, such as a first media content service 762 (or "MCS 762") hosted by one or more corresponding remote computing devices 106b, and a second media content service 763 (or "MCS 763") hosted by one or more corresponding remote computing devices 106c. In some embodiments, the MPS 100 may be coupled to more or fewer VAS(es) (e.g., one VAS, three VAS(es), four VAS(es), five VAS(es), six VAS(es), etc.) and/or more or fewer media content services (e.g., one MCS, three MCS(es), four MCS(es), five MCS(es), six MCS(es), etc.).

The MPS 100 may be coupled to the VAS(es) 160, 760 and/or the first and second MCSes 762, 763 (and/or their associated remote computing devices 106a, 706a, 106b, and 106c) via a WAN and/or a LAN 111 connected to the WAN 107 and/or one or more routers 109 (FIG. 1B). In this way, the various local network devices 102-105 of the MPS 100 and/or the one or more remote computing devices 106d of the MPS 100 may communicate with the remote computing device(s) of the VAS(es) 160, 760 and the MCSes 762, 763.

In some embodiments, the MPS 100 may be configured to concurrently communicate with both the MCSes 167 and/or the VAS(es) 160, 760. For example, the MPS 100 may transmit search requests for particular content to both the first and second MCS(es) 762, 763 in parallel, and may send voice input data to one or more of the VAS(es) 160, 760 in parallel.

III. Find & Play

Figure 7B:
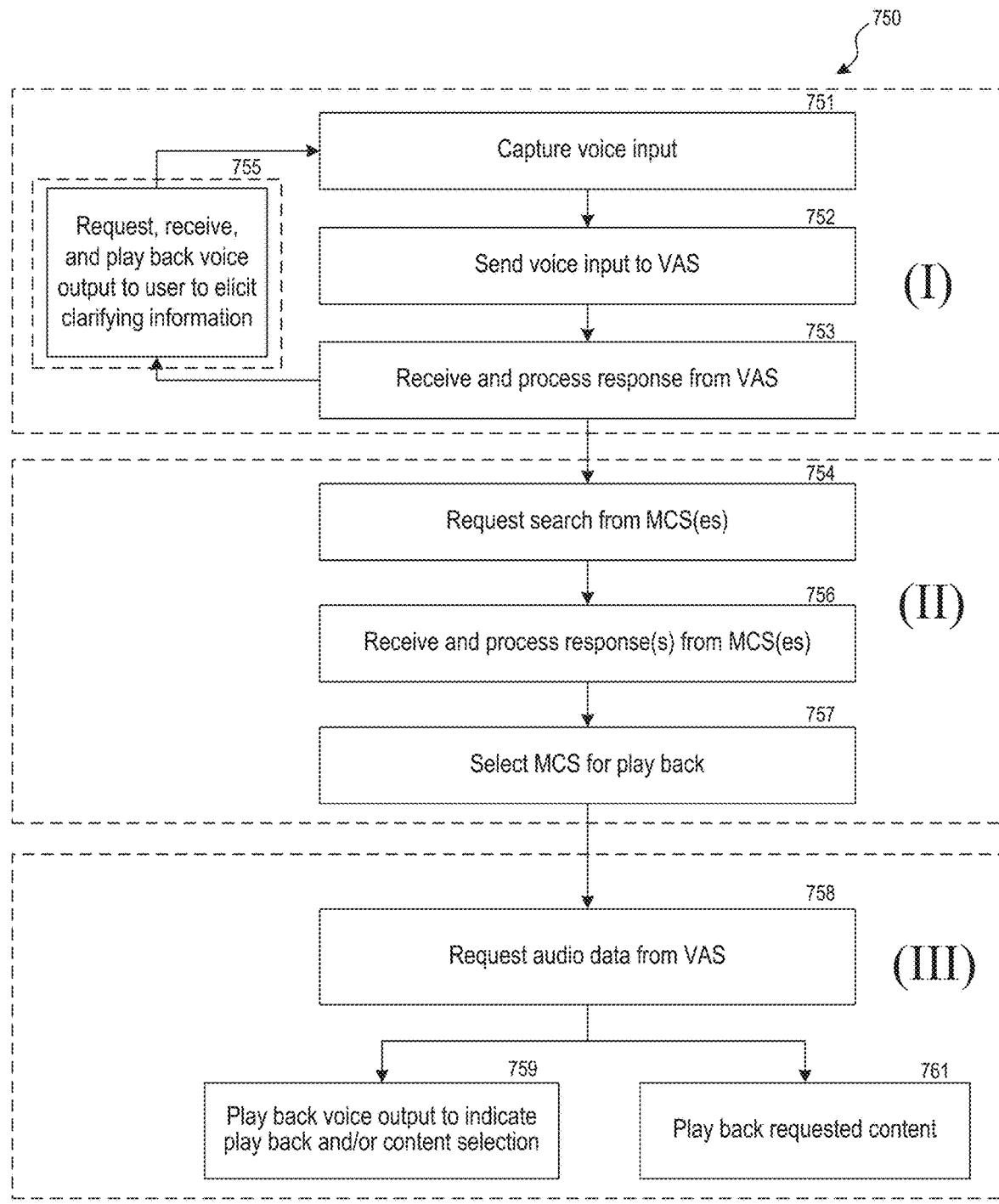
FIG. 7B is a flow diagram showing a process for voice-assisted media content selection implemented by the example network system of FIG. 7A.

FIG. 7B shows an example embodiment of a method 750 that can be implemented by the media playback systems disclosed and/or described herein (such as MPS 100) to identify (Group I), select (Group II), and play back media content (Group III) requested by a user. The processes shown in FIG. 7B may occur, for example, within the network system 700 of FIG. 7A and include data exchanges between the MPS 100, one or more VAS(es) 160, 760, and one or more MCS(es) 167 (such as first and second MCS(es) 762 and 763).

Method 750 begins at block 751, which includes the MPS 100 capturing a voice input via a network microphone device, such as via one or more of the network microphone devices 103 (FIG. 1A) and 503 (FIG. 5A) described above. The voice input comprises a request for media content. As shown at block 752, the MPS 100 may transmit the voice input to the one or more remote computing devices 106a associated with the VAS 160 and, as depicted at block 753, receives a response from the VAS 160 comprising intent information derived from the request for media content. If the derived intent information does not identify and/or describe the requested media content adequately for the MCS(es) to search for the media content, the MPS 100 may request additional information from the user, as shown at block 755. In some embodiments, to prompt the user for additional information, the MPS 100 may play back a voice output to the user provided by the VAS (which may in some embodiments by requested by the MPS 100 from the VAS) and, upon receiving the voice data corresponding to the voice output, play back the voice data to the user to request the additional information. For example, if the user commands "Play Crash by Dave Matthews," the MPS 100 may request voice data from the VAS that enables the MPS 100 to play back "Would you like to hear the album 'Crash' by the Dave Matthews Band or the song 'Crash' by the Dave Matthews Band?" Additional details regarding data exchanges between the MPS 100 and the VAS 160 to identify the requested media content are discussed in greater detail below with reference to FIGS. 7C and 7D.

Once the MPS 100 has obtained information sufficient to proceed with a search of the requested media content, the method advances to block 754 in which the MPS 100 requests a search for the requested media content across a plurality of MCS(es) 167. The remote computing devices associated with the MCS(es) 167 perform the search and send a response to the MPS 100 with the results. As shown at block 756, the MPS 100 processes the results to determine what MCS options are available to the user and, as shown at block 757 the MPS 100 selects an MCS for play back. Additional details regarding the data exchanges between the MPS 100, the VAS 160, and the MCS(es) 167 to locate and select the requested media content are discussed in greater detail below with reference to FIGS. 7C and 7D.

Figure 7C:
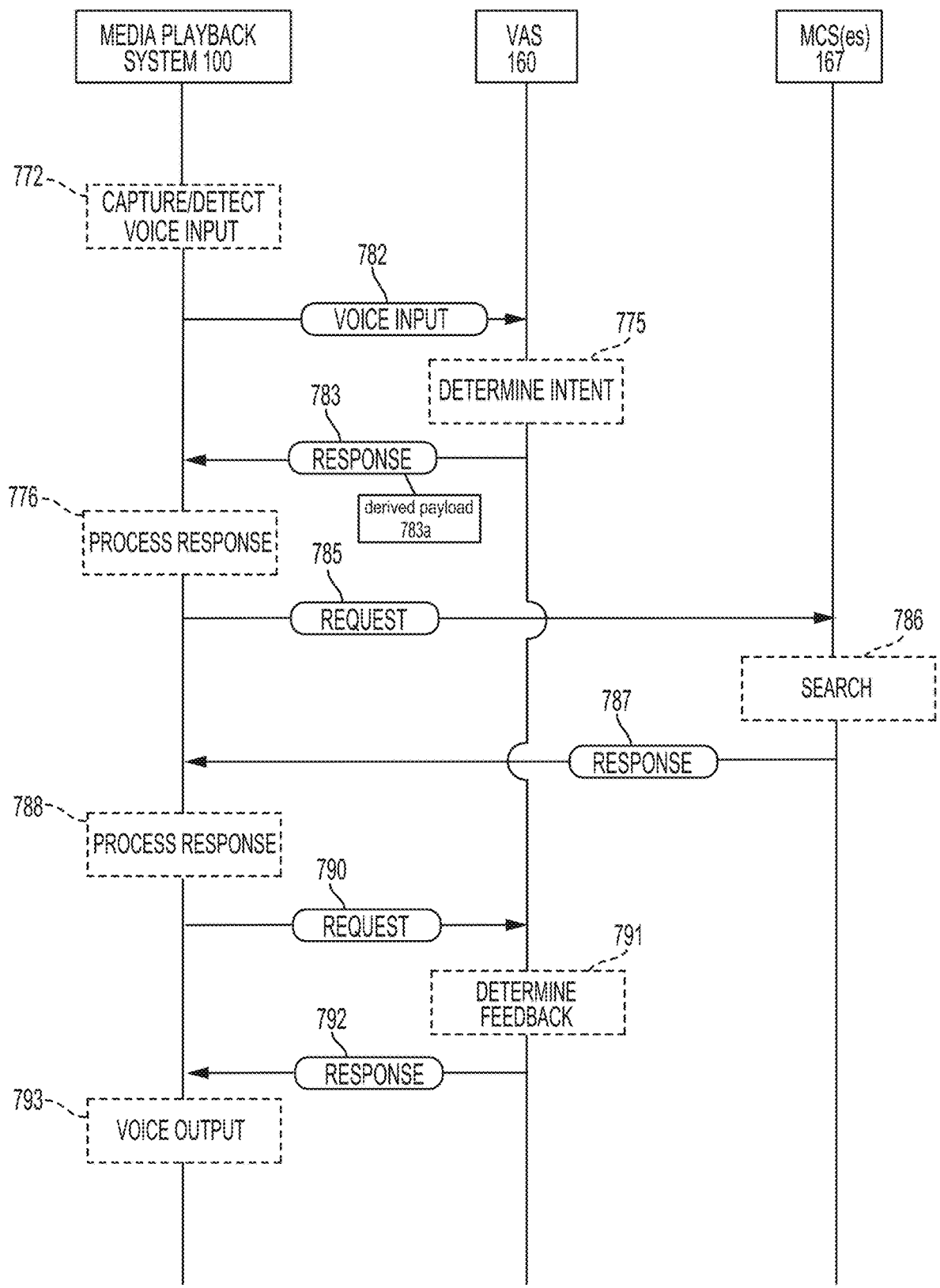
FIG. 7C is an example message flow implemented by the example network system of FIG. 7A in accordance with aspects of the disclosure.

Finally, as shown at blocks 758 and 759, the MPS 100 may request voice data from the VAS 160 and, upon receiving the requested audio data, play back a voice output to confirm play back of the requested media content. Before, during, and/or after playing back the voice output, the MPS 100 may begin play back of the requested media content, as shown at block 761. Additional details regarding the data exchanges between the MPS 100, the VAS 160, and the MCS(es) 167 to play back the requested media content are discussed in greater detail below with reference to FIG. 7D.

a. Examples of Data Exchanges for Identifying and Finding Media Content i. Identify As shown in FIG. 7C, the process begins with the MPS 100 capturing a voice input (block 772) via a network microphone device, such as one or more of the NMDs 103 shown in FIGS. 1A and 1B. The MPS 100 may then transmit one or more messages 782 containing all or a portion of the captured input to one or more remote computing devices associated with a VAS, such as remote computing devices 106a associated with VAS 160. The transmitted voice input may include the wake-word portion (or a portion thereof) and/or the voice utterance portion (or a portion thereof). As discussed above, in some embodiments the MPS 100 selects an appropriate VAS from a plurality of VAS options based on commands and associated command criteria in the set of command information 590 (FIG. 5A). For example, in some embodiments, the MPS 100 selects the ALEXA VAS when the voice input is, e.g., "Alexa, play some INXS," or selects the GOOGLE VAS when the voice input includes the same voice utterance but a different preceding wake word, such as "Hey Google, play some INXS."

In some embodiments, the MPS 100 transmits secondary information to the VAS 160 along with the message 782 containing the voice input. In addition or alternately, the MPS 100 may transmit secondary information as a separate message or packet before, after, and/or at the same time as the message 782. Secondary information may include, for example, zone state information, control state information, a user's playback history, a user's playlists, a user's media content preferences, the media content service(s) available to the user, the user's preferred media content service, etc. In some embodiments, the MPS 100 may transmit data over a metadata channel, as described in U.S. patent application Ser. No. 15/131,244, filed Apr. 18, 2016, titled "Metadata Exchange Involving a Networked Playback System and a Networked Microphone System," which is incorporated by reference herein in its entirety.

In some embodiments, the MPS 100 sends the voice input to the VAS 160 without any initial processing of the voice input (other than that required to transmit the data to the VAS 160). In some embodiments, the MPS 100 processes all or a portion of the voice input prior to sending the message 782 to derive media content information from the voice input and/or determine what secondary information, if any, should be transmitted with or in addition to the message 782. In some embodiments, the MPS 100 automatically sends secondary information to the VAS 160 without processing the voice input.

As shown at block 775, upon receiving the message 782 containing the voice input, the remote computing devices 106a of the VAS 160 may process the voice input to determine the user's intent. This may include deriving information that identifies or facilitates identification of the requested media content in the voice input (if any). When the remote computing devices 106a are finished processing the voice input, the remote computing devices 106a may transmit a response 783 (e.g., one or more packets) to the MPS 100 that contains derived intent information from the voice input as payload for processing by the MPS 100. As described in greater detail below, the payload depends at least in part on the contents of the voice input and the extent to which the VAS was able to determine the intent of the voice input.

(A) If the voice input does not contain any media content—for example, if the voice input is a simple command such as "Play," "Pause," "Turn up the volume," etc.—the remote computing devices 106a may send an empty structure or packet (e.g., having a null payload) or otherwise communicate to the MPS 100 that no additional media content searching is needed.

(B) If the voice input contains a request for media content, such as for media content to be ultimately played back by the MPS 100, the payload of the response 783 may include information that enables the MPS 100 to request a search for the media content from one or more MCS(es). The payload may be used by the MPS 100 to build request(s) suitable for communicating with and requesting information from an MCS, such as via the Sonos Music API (SMAPI). For example, the MPS 100 may build separate first, second, and third requests suitable to search for content the SPOTIFY, PANDORA, and APPLE MUSIC platforms, respectively. In some instances, the voice input may be a relatively straightforward request that may be readily resolved by the VAS 160 without the VAS 160 having to perform extensive NLU processing and/or Internet searching. Examples of requests include commands to play a particular artist (i.e., "Play George Strait"), play a particular song, play a particular album, etc. In some embodiments, a VAS may determine to "resolve" a request on its own rather than going through the MPS 100. For example, if a user speaks "Play Dave Mathew's Crash on GOOGLE PLAY," the VAS may directly communicate with one or more MCS(es) without the MPS 100 intervening. In such embodiments, the VAS may resolve requests if certain conditions are met. For example, the VAS may resolve a request in cases where both of the following conditions are satisfied: (i) the request is straightforward and (ii) the media content service is directly supported by the VAS. A media content service may be directly supported by a VAS, for example, when the VAS has an affiliation with the media content service and the user has authorized a link between the media content service and the VAS. An example of a sponsored media content service may be SPOTIFY, which today may be linked with VASes provided by both AMAZON and GOOGLE. In some embodiments, the MPS 100 may intervene between the VAS and the media content service even in cases where the VAS sponsors a media content service, such as when the voice input is relatively less straightforward and/or when MPS intervention is preferred to find and possibly play back media content as described above and in further detail below.

(C) If the intent of the voice input is ambiguous to the VAS 160, the VAS 160 may: (1) perform a search to further clarify the intent (e.g., on the Internet, on a database associated with the remote computing devices 106*a*, within the metadata provided by the MPS 100, etc.), and/or (2) send a response to the MPS 100 that includes a request for the MPS 100 to supply additional information. In some instances, the additional information will require the MPS 100 to request additional input from the user.

In any of the above scenarios, the response 783 received by the MPS 100 may have a predefined data structure with a format having at least one predefined field. The packet/response 783 comprises the derived payload 783*a* (FIG. 7B) according to the format. For example, the MPS 100 may expect the payload to include a plurality of fields representing various media content attributes, such as "artist," "album," "song," "genre," "activity," etc. Non-exhaustive examples of field types 870 and derived payload 783*a* that may be included in the payload are displayed at FIGS. 8A and 8B, respectively.

The remote computing devices 106*a* associated with the VAS 160 may process the voice input by converting the voice input to text (for example, via a speech-to-text component, discussed above with reference to FIG. 6) and analyzing the text to determine the intent of the request. In some embodiments, the remote computing devices 106*a* may employ NLU systems that maintain and utilize a lexicon of language, parsers, grammar and semantic rules, and associated processing algorithms to derive information related to the requested media content. For example, the VAS 160 may (i) identify derived payload 783*a* and/or field types 870 within the voice input that correspond to the intent of the voice input, and (ii) associate the derived payload 783*a* with one or more of the fields. The derived payload 783*a* and/or field types 870 identified by the VAS 160 and contained within the packet 783 may be derived by the VAS 160 based on a search and/or metadata provided by the MPS 100 (described in greater detail below) and/or may be stated explicitly by the user. For example, the voice input "Play the 'In the Zone' album" explicitly names derived payload 783*a* (i.e., "In the Zone") and a field type (i.e., "album"); as such, the resulting response 783 would include {album: "In the Zone"}. In some embodiments, the response 783 contains only the fields populated with derived payload 783*a*. In particular embodiments, the response 783 contains all of the predefined fields, whether null or populated. In certain cases, the response 783 from the VAS does not include any metadata derived from the voice input.

In some instances, the intent of all or a portion of the voice input remains ambiguous to the VAS 160 after processing. In such scenarios, the remote computing devices 106*a* associated with the VAS 160 may perform a search to further clarify the ambiguous portion(s) and/or may send a request to the MPS 100 to supply additional information. Should the VAS 160 conduct a search, the information used to conduct the search may be limited to the text of the voice input. For example, when processing the voice input "Play the latest album from John Legend" (Example No. 20 of FIG. 8B), the remote computing devices 106*a* of the VAS 160 may populate the artist field with "John Legend" but conduct a search to resolve which John Legend album is the "latest album." The remote computing devices 106*a* will then populate the album field with the results of the search (i.e., John Legend's latest album, "Darkness and Light"). In some embodiments, a predefined descriptor may be updated to reduce response time for similar future queries. For instance, for the foregoing example, the payload may be tagged with a "latest" descriptor, as shown at Example 20 of FIG. 8B.

The remote computing devices 106*a* associated with the VAS 160 may also search the secondary information and/or metadata already provided by the MPS 100 to resolve any ambiguity. For example, for the voice input "Play my cooking playlist" (Example No. 15 in FIG. 8B), the remote computing devices 106*a* may search a list of the user's playlist names provided by the MPS 100 and determine that the request is referring to the user's playlist titled "Cooking." As another example, for the voice input "Play 'Callin' Baton Rouge,'" the remote computing devices 106*a* may access the user intent metadata provided by the MPS 100 to determine which version of Callin' Baton Rouge' is intended by the user. If the user intent metadata provided by the MPS 100 shows that the user only plays the live version of "Callin' Baton Rouge" from Garth Brooks' album "Double Live," the remote computing devices 106*a* may send a response 783 with {song: "Callin' Baton Rouge", album: "Double Live"}. In some instances, the particular song, album, artist may also be tagged with one or more additional descriptors, such as with a "live" descriptor, for similar future queries as appropriate to improve searching and response time.

In some embodiments, the MPS 100 may send the remote computing devices 106*a* associated with the VAS 160 only certain information (e.g., only certain metadata) that is needed by the VAS 160 to interpret the voice input and/or conduct a search to resolve one or more aspects of the request. For example, in some aspects, certain metadata may be excluded in the exchanges between the MPS 100 and the VAS 160, such as information that would expressly identify an MCS. Excluding MCS preferences in the metadata may be beneficial as it enables media content to be selected for play back by the MPS 100 (and/or the user) in a way that does not discriminate one MCS over another. Accordingly, although the remote computing devices 106*a* of the VAS 160 may perform the initial search of the media content request, the MPS 100 maintains control of the parameters of the search and, to some extent, the search results. This may be beneficial as it precludes the VAS 160 from providing search results that could bias the subsequent MCS selection.

In some instances, the MPS 100 may send additional messages 782 and receive multiple responses 783 before it ultimately determines the user's intent and the appropriate information to send to the MCS(es) for media content searching (only one message 782 and one response 783 are shown in FIG. 7C). For example, where all or a portion of the utterance is ambiguous, the VAS 160 may request additional information from the MPS 100. This determination may be made with or without the remote computing devices 106*a* of the VAS 160 first determining the intent. In response, the MPS 100 may retrieve the requested additional information (for example, from a database associated with the MPS's remote computing devices 106*d*) and send the information back to the VAS 160 for further processing. In some embodiments, the VAS 160 may request more information by including a URI and/or a hyperlink in the response 783 that identifies an action to be taken by the MPS 100 to retrieve the additional information. For example, the URI may be a playlist associated with a media content service. The playlist may be spoken by the user in the initial voice utterance, and the VAS may access the tracks in the playlist, assuming the user and/or the VAS has been granted the appropriate permissions to do so by the MPS 100 and/or the MCS(es) that provide the content within the playlist.

The VAS 160 may also instruct the MPS 100 to request the additional information from the user. For example, for the voice input "Play my Running playlist," the VAS 160 may determine that the request is ambiguous because the user has a playlist titled "Running" on multiple MCS(es) 167. In this scenario, the remote computing devices 106*a* associated with the VAS 160 may request that the MPS 100 asks the user which playlist the user is referring to. For example, the MPS 100 may ask the user "Would you like to play your 'Running' playlist from iTUNES or your 'Running' playlist from SPOTIFY?" As another example, a voice input requesting a song or album for which multiple versions exist may require the MPS 100 to ask the user which version of the song or which album the user would like played back. For the voice input "Play West Side Story" (see column 4 for Example No. 23 in FIG. 8B), the VAS 160 may determine that the "West Side Story" album has a Broadway version and a concert hall version and require clarification from the user as to which of the two albums the user is referring to.

For the MPS 100 to request and obtain clarifying information from the user, the VAS 160 may send a packet 783 that includes voice data for a voice output that may be played back by MPS 100 to the user. Likewise, the MPS 100 may process the response 783 (block 776) and determine that additional user input is required, even if the VAS has determined otherwise. In some aspects, the MPS 100 may receive feedback from the MCS(es) 167 that the requested media content could not be found (discussed in greater detail below). In the latter two scenarios, the MPS 100 may send a message to the remote computing devices 106*a* associated with the VAS 160 that includes a request for voice data of a voice output that the MPS 100 can play back to the user (e.g., via one or more of the playback devices 102) to obtain clarifying information. The remote computing devices 106*a* may perform the requested text-to-speech conversion and transmit a packet containing the voice data to the MPS 100. The MPS 100 may then play back the voice output to the user and capture the user's responsive voice input. To determine the intent of the user's responsive voice input, the exchanges described above with reference to blocks 772-776 may be repeated as necessary until the MPS 100 has sufficient descriptive information of the requested media content to request a search.

ii. Search

Once the MPS 100 has received or is otherwise in possession of information sufficiently descriptive of the requested media content from the response(s) 783, the MPS 100 may send a search request 785 to a plurality of remote computing devices associated with the plurality of MCS(es) 167. For example, the MPS 100 may send a search request to (i) first remote computing devices 106*b* associated with the first MCS 762 and (ii) second remote computing devices 106*c* associated with the second MCS 763. The first and second remote computing devices 106*b*, 106*c* may then search their respective libraries for the media content described in the payload, as depicted at block 786. Preferably, the VAS 160 does not exchange information directly with the first and second remote computing devices 106*b*, 106*c* of the first and second MCS(es) 762, 763 and the MPS 100 is the single contact point between all of the VAS(es) and all of the MCS(es).

After completing the search request, each of the first and second remote computing devices 106*b*, 106*c* may send a response (shown collectively as "response 787") to the MPS 100 indicating whether the corresponding first and second MCS(es) have the requested media content. Any MCS that has the requested media content may also send instructions for playing back the media content. If only a single MCS returns the requested media content, the MPS 100 may proceed to play back the media content from the single MCS without requesting additional input from the user. However, in some cases it may be beneficial for the MPS 100 to solicit additional input from the user. For example, when multiple MCS(es) send instructions for playing back the requested media content, the MPS 100 may ask the user which MCS the user would like to use. In some embodiments, the MPS 100 may display a list of media content (e.g., songs, albums, etc.) and/or MCS(es) that have the requested media content on the display of a controller device 104 (FIGS. 1A and 1B), and the user may select the desired media content and/or MCS from the list. In these and other embodiments, the MPS 100 may automatically select one of the available MCS(es) based on the user's preferred media content service and/or other secondary information.

The MPS 100 may also request additional information from the user when the voice input identifies a specific MCS for playing back the requested media content and the requested MCS's search does not turn up the requested media content. Should a different, non-requested MCS (to which the user also subscribes or otherwise has access to) have the requested media content, the MPS 100 may (a) inform the user that the requested MCS does not have the requested media content, (b) inform the user that the media content was found on a different MCS, and (c) ask the user if the user would like the MPS 100 to play back the requested media content on the other MCS.

To request clarification from the user, the MPS 100 may send a request 790 to the VAS 160 for voice data related to a specific voice output, and the VAS 160 may process the request 791 to generate the voice output to be played back by the MPS 100 to the user. The VAS 160 may send a message 792 to the MPS 100 including the voice output, and the MPS 100 may play back the voice output 793 to the user to obtain clarification from the user.

Whether selected automatically by the MPS 100 or in response to feedback from the user, the MPS 100 ultimately selects one of the MCS(es). for playing back or potentially playing back the requested media content (assuming the user's request was resolvable). The MPS 100 foregoes selection of other MCS(es) once the ultimate MCS has been selected. In some instances, playback may begin automatically after the search without further input from the user (e.g., if the user requested to play the media content in the voice input(s) prompting the search). In other instances, playback may be initiated by the user depending on the results of the search and upon confirmation by the user. The following discussion with reference to FIG. 7D describes the various data exchanges that may occur between the MPS 100, the VAS 160, and/or the MCS(es) 167 in order to play back the selected media content.

b. Examples of Data Exchanges for Playing Back Media Content

Figure 7D:
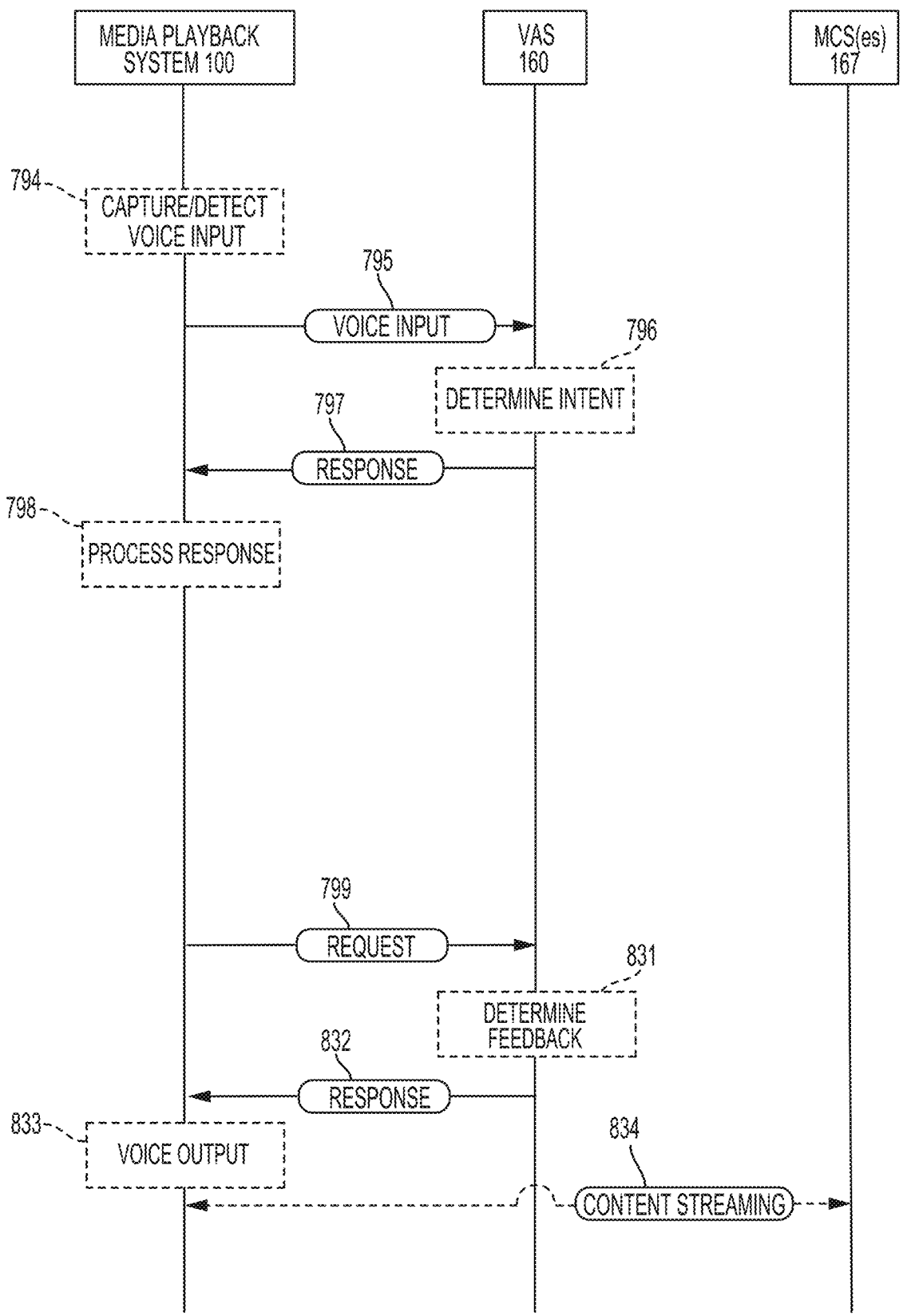
FIG. 7D is an example message flow implemented by the example network system of FIG. 7A in accordance with aspects of the disclosure.

Referring to block 784 of FIG. 7D, the MPS 100 may capture a user's voice input in response to the MPS's 100 request for the user to select one of the available MCS(es). The MPS 100 may then send the voice input 795 to the VAS 160 for processing to determine the intent (block 796) of the voice input. The VAS 160 may send a response or packet 797 to the MPS 100 that contains information identifying the MCS selection made by the user. The MPS 100 may then process the response 797 (block 798) and generate a desired message for the user. The MPS 100 may send a request 799 to the VAS to convert the MPS's 100 message into voice data that can be played back as a voice output by the MPS 100 to the user. In some embodiments, the message may be a confirmation to the user that the MPS 100 will play or is already playing the user's requested media content on a certain one of the MCS(es). For example, the MPS 100 may play back a voice output such as "You are listening to 'Jagged Little Pill' on SPOTIFY." At block 831, the VAS converts the message into the requested audio data and transmits a packet 832 containing the voice data to the MPS 100. Before, concurrently with, and/or after playing back the voice output (at block 833) to the user, the MPS 100 may exchange data (block 834) with the selected MCS to play back the requested and found media content (for example, via one or more of the playback devices 102). In some instances it may be beneficial to play the voice output confirming the media content and/or MCS selection prior to playing back the media content, as retrieving the media content from the MCS for playback may create a latency and the voice output can fill that latency for the user.

In some embodiments, the MPS 100 may indicate to the user that the requested media content is being played back without interacting or receiving additional data from the VAS 160. For example, the MPS 100 may have stored voice outputs not specific to the requested media content (e.g., "Playing requested audio") or may provide an indication that does not include any voice output (such as a ding, displaying a certain color, etc.).

In some embodiments, the MPS 100, the VAS 160, and/or the MCS(es) 167 may use voice inputs that result in successful (or unsuccessful) responses from the VAS 160 and/or MCS(es) 167 for training and adaptive training and learning. Training and adaptive learning may enhance the accuracy of voice processing by the MPS 100, the VAS 160, and/or the MCS(es) 167. In some embodiments, the intent engine 662 (FIG. 6) may update and maintain training learning data in the VAS database(s) 664 for one or more user accounts associated with the MPS 100.

c. Examples of Commands for Controlling Media Content Playback

Commands for controlling the media playback system, such as playback of content identified via the search in FIG. 7C, can include, for example, a command for initiating playback, such as when the user says "play music." Another command may be a control command, such as a transport control command, for e.g., pausing, resuming, skipping, playback. For example, a command may be a command involving a user asking to "skip to the next track in a song." Yet another command may be a zone targeting command, such as command for grouping, bonding, and merging playback devices. For example, the command may be a command involving a user asking to "group the Living Room and the Dining Room." In such cases, the command may not involve a search for media content, but rather directs media content to be streamed to a group of targeted devices in a particular group of devices.

The commands described above are examples and other commands are possible. For example, FIGS. 9A-9C show tables with additional example playback initiation, control, and zone targeting commands. As an additional example, commands may include inquiry commands. An inquiry command may involve, for example, a query by a user as to what audio is currently playing. For example, the user may speak an inquiry command of "Tell me what is playing in the Living Room." Other suitable commands are shown and described, for example, in U.S. patent application Ser. No. 15/721,141 filed Sep. 29, 2017, and titled "Media Playback System with Voice Assistance," and U.S. Pat. No. 9,947,316 filed Jul. 29, 2016, and titled "Voice Control of a Media Playback System," each of which is incorporated herein by reference in their entirety.

The intent for commands and associated variable instances that may be detected in voice input may be based on any of number predefined syntaxes that may be associated with a user's intent (e.g., play, pause, adding to queue, grouping, other transport controls, controls available via, e.g., the controller devices 104). In some implementations, processing of commands and associated variable instances may be based on predetermined "slots" in which command(s) and/or variable(s) are expected to be specified in the syntax. In these and other implementations, sets of words or vocabulary used for determining user intent may be updated in response to user customizations and preferences, feedback, and adaptive learning, as discussed above.

In some embodiments, different words, syntaxes, and/or phrases used for a command may be associated with the same intent. For example, including the command word "play," "listen," or "hear" in a voice input may correspond to a cognate reflecting the same intent that the media playback system play back media content.

FIGS. 9A-9C show further examples of cognates. For instance, the commands in the left-hand side of the table 900 may have certain cognates represented in the right-hand side of the table. Referring to FIG. 9A, for example, the "play" command in the left-hand column has the same intent as the cognate phrases in the right-hand column, including "break it down," "let's jam", "bust it." In various embodiments, commands and cognates may be added, removed, or edited in the table 900. For example, commands and cognates may be added, removed, or edited in response to user customizations and preferences, feedback, training, and adaptive learning, as discussed above. FIGS. 9B and 9C show examples cognates related to control and zone targeting, respectively.

In some embodiments, variable instances may have cognates that are predefined in a manner similar to cognates for commands. For example, a "Patio" zone variable in the MPS 100 may have the cognate "Outside" representing the same zone variable. As another example, the "Living Room" zone variable may have the cognates "Living Area", "TV Room," "Family Room," etc.

A command may be compared to multiple sets of command criteria. In some embodiments, command criteria may determine if a voice input includes more than one command. For example, a voice input with a command to "play [media variable]" may be accompanied by a second command to "also play in [zone variable]." In this example, the MPS 100 may recognize "play" as one command and recognize "also play" as command criteria that is satisfied by the inclusion of the latter command. In some embodiments, when the above example commands are spoken together in the same voice input this may correspond to a grouping intent.

In similar embodiments, the voice input may include two commands or phrases which are spoken in sequence. The method 800 may recognize that such commands or phrases in sequence may be related. For example, the user may provide the voice input "play some classical music" followed by in "the Living Room" and the "Dining Room," which is an inferential command to group the playback devices in the Living Room and the Dining Room.

In some embodiments, the MPS 100 may detect for pause(s) of a limited duration (e.g., 1 to 2 seconds) when processing words or phrases in sequence. In some implementations, the pause may be intentionally made by the user to demarcate between commands and phrases to facilitate voice processing of a relatively longer chain of commands and information. The pause may have a predetermined duration sufficient for capturing the chain of commands and information without causing the MPS 100 to idle back to wake word monitoring at block 802. In one aspect, a user may use such pauses to execute multiple commands without having to re-utter a wake word for each desired command to be executed.

In some embodiments, processing commands may involve updating playback queues stored on the playback devices in response to the change in a playlist or playback queue stored on a cloud network, such that the portion of the playback queue matches a portion or entirety of the playlist or playback queue in cloud network.

In some embodiments, processing a command may lead to a determination that the VAS needs additional information and audibly prompting a user for this information. For instance, a user may be prompted for additional information when executing a multi-turn command.

While the methods and systems have been described herein with respect to media content (e.g., music content, video content), the methods and systems described herein may be applied to a variety of content which may have associated audio that can be played by a media playback system. For example, pre-recorded sounds which might not be part of a music catalog may be played in response to a voice input. One example is the voice input "what does a nightingale sound like?" The networked microphone system's response to this voice input might not be music content with an identifier and may instead be a short audio clip. The media playback system may receive information associated with playing back the short audio clip (e.g., storage address, link, URL, file) and a media playback system command to play the short audio clip. Other examples are possible including podcasts, news clips, notification sounds, alarms, etc.

CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

It will be appreciated that FIGS. 8A and 8B are provided merely by way of example and do not represent an exhaustive list of request types 880, example utterances 882, desired payloads 884, and/or actions/inactions 886 associated with the media playback systems of the present technology. Moreover, although the actions/inactions column 886 provides that many of the example requests "[r]equire[] the VAS to resolve," in some embodiments such types of requests do not require the VAS to resolve and instead can be resolved by the MPS 100 and/or a combination of the MPS 100 and the VAS.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1: a method, comprising: capturing voice input via a network microphone device of a media playback system, wherein the voice input comprises a request for media content; transmitting the voice input from the media playback system to one or more remote computing devices associated with a voice assistant service for deriving intent information regarding the request for media content based at least on the voice input; receiving, at the media playback system, a response from the one or more remote computing devices, wherein the response comprises the derived intent information; based at least in part on the derived intent information, requesting via the media playback system, media content information from a plurality of media content services, wherein the requesting comprises requesting the media content information from (i) at least one first remote computing device associated with a first media content service and (ii) at least one second remote computing device associated with a second media content service; receiving, at the media playback system, first information from the at least one first remote computing device and second information from the at least one second remote computing device, wherein the first information identifies first media content available via the first media content service for playback and the second information identifies second media content available via the second media content service for playback; and after receiving at least one of the first information and the second information, (i) selecting the first media content and foregoing selection of the second media content and (ii) playing back the first media content. Example 2: the method of Example 1, further comprising: (i) transmitting, via the media playback system, a request for a voice response to the one or more computing devices of the voice assistant service, wherein the request for the voice response is based at least on one of the first information and the second information; and (ii) receiving and playing back, via the media playback system, the voice response. Example 3: the method of Example 2, wherein the voice response is at least one of (a) a request for additional information regarding the request for media content, and (b) an acknowledgement of receipt of the request for media content. Example 4: the method of Example 2 or Example 3, wherein the voice response identifies the first media content available via the first media content service, the first media content service, the second media content available via the second media content service, and the second media content service. Example 5: the method of any one of Examples 1 to 4, further comprising, after transmitting the first and second information, (i) receiving, via the media playback system, a selection of media content related to the first information and (ii) requesting, via the media playback system, the selection of media content from the at least one remote computing device of the first media content service for playback. Example 6: the method of any one of Examples 1 to 5, further comprising, (i) after receiving the selection, initiating the playback of the first media content, and (ii) after initiating the playback of the first media content, transmitting a request for a voice response to the one or more remote computing devices of the voice assistant service. Example 7: the method of any one of Examples 1 to 6, wherein the response received from the one or more remote computing devices associated with the voice assistant service includes a message comprising a plurality of predetermined fields, wherein at least one of the predetermined fields is populated by the voice assistant service with at least a portion of the derived intent information. Example 8: the method of any of Examples 1 to 7, wherein the media playback system includes one or more remote computing devices. Example 9: the method of any one of Examples 1 to 8, wherein media content available via the first media content service comprises media content that is not available via the second media content service. Example 10: the method of any one of Examples 1 to 9, further comprising receiving, at the network microphone device, the particular media content from the selected media content service. Example 11: the method of any one of Examples 1 to 10, further comprising causing a playback device associated with the network microphone device to play back the particular media content from the selected media content service. Example 12: the method of any one of Examples 1 to 11, wherein the response includes a payload having at least a first field, a second field, and a third field, and wherein the first field corresponds to a song, the second field corresponds to an album, and the third field corresponds to an artist. Example 13: the method of Example 12, wherein the first field, the second field, and/or the third field may be a null value. Example 14: the method of any one of Examples 1 to 13, further comprising selecting the first media content service over the second media content service. Example 15: the method of any one of Examples 1 to 14, further comprising selecting a first voice assistant service over a second voice assistant service. Example 16: the method of any one of Examples 1 to 15, further comprising transmitting secondary information to the voice assistant service with the voice input. Example 17: the method of Example 16, wherein the secondary information includes at least one of zone state information, a user's playback history, a user's playlists, and a user's media content preferences. Example 18: the method of any one of Examples 1 to 17, further comprising outputting, via the network microphone device, an audible and/or visible indicator. Example 19: the method of Example 18, wherein the indicator is output after the network microphone device sends data related to the voice input to the voice assistant service. Example 20: the method of Example 18, wherein the indicator is output after the network microphone device receives the response from the voice assistant service. Example 21: the method of any one of Examples 1 to 20, wherein the response from the voice assistant service includes an indication of the requested media content service. Example 22: the method of any one of Examples 1 to 21, wherein the response from the voice assistant service includes metadata identifying particular audio content. Example 23: the method of any one of Examples 1 to 22, wherein the voice input is a first voice input, the method further comprises: (i) after receiving the response from the voice assistant service, outputting, via the media playback system, an audible prompt for additional information, (ii) receiving a second voice input via the media playback system, and (iii) transmitting data related to the second voice input to the voice assistant service.

Example 24: a media playback system comprising one or more processors, at least one network microphone device comprising at least one microphone, and a computer-readable medium storing instructions executable by one or more processors to cause the media playback system to perform operations comprising the method of any one of Examples 1 to 23.

Example 25: a tangible, non-transitory computer-readable medium comprising instructions executable by one or more processors, causing the processor to perform the method of any one of Examples 1 to 23.

We claim:
1. A method, comprising:
capturing voice input via a network microphone device (NMD) of a media playback system, the media playback system comprising one or more local network devices, including the network microphone device, within a physical environment and one or more first remote computing devices, wherein the voice input comprises a request for media content;
transmitting the voice input from the NMD to one or more second remote computing devices associated with a voice assistant service for deriving intent information regarding the request for media content based at least on the voice input;
receiving, at the media playback system, a response from the one or more second remote computing devices associated with the voice assistant service, wherein the response comprises the derived intent information;
based at least in part on the derived intent information, requesting, via the media playback system and independent of the voice assistant service, media content information from a plurality of media content services, wherein the requesting comprises requesting the media content information from (i) at least one third remote computing device associated with a first media content service and (ii) at least one fourth remote computing device associated with a second media content service;
receiving, at the media playback system and independent of the voice assistant service, first information from the at least one third remote computing device and second information from the at least one fourth remote computing device, wherein the first information identifies first media content available via the first media content service for playback and the second information identifies second media content available via the second media content service for playback; and
after receiving at least one of the first information and the second information, (i) selecting, via the media playback system, the first media content and forgoing selection of the second media content, (ii) transmitting a uniform resource identifier (URI) or uniform resource locator (URL) associated with the first media content from the one or more first remote computing devices of the media playback system to the NMD, and (iii) requesting, via the NMD, the first media content, via the URI or URL, from the at least one third remote computing device of the first media content service for playback, and (iv) playing back the first media content via the NMD.

2. The method of claim 1, further comprising:
transmitting, via the media playback system, a request for a voice response to the one or more second computing devices of the voice assistant service, wherein the request for the voice response is based at least on one of the first information and the second information; and
receiving and playing back, via the media playback system, the voice response.

3. The method of claim 2, wherein the voice response is at least one of (a) a request for additional information regarding the request for media content, and (b) an acknowledgement of receipt of the request for media content.

4. The method of claim 2, wherein the voice response identifies the first media content available via the first media content service, the first media content service, the second media content available via the second media content service, and the second media content service.

5. The method of claim 1, further comprising, (i) after receiving the selection initiating the playback of the first media content, and (ii) after initiating the playback of the first media content, transmitting a request for a voice response to the one or more second remote computing devices of the voice assistant service.

6. The method of claim 1, wherein the response received from the one or more second remote computing devices associated with the voice assistant service includes a message comprising a plurality of predetermined fields, wherein at least one of the predetermined fields is populated by the voice assistant service with at least a portion of the derived intent information.

7. The method of claim 1, wherein the derived intent information comprises a predefined data structure including one or more media content attributes, and wherein requesting media content information from the plurality of media content services comprises querying the media content services for media corresponding to the media content attributes.

8. A media playback system, comprising:
one or more processors;
at least one network microphone device (NMD) comprising at least one microphone;
one or more first remote computing devices; and
tangible, non-transitory, computer-readable media storing instructions executable by one or more processors to cause the media playback system to perform operations comprising:
capturing voice input via the NMD, wherein the voice input comprises a request for media content;
transmitting the voice input to one or more second remote computing devices associated with a voice assistant service for deriving intent information regarding the request for media content based at least on the voice input;
receiving a response from the one or more second remote computing devices, wherein the response comprises the derived intent information;
based at least in part on the derived intent information, requesting, independent of the voice assistant service, media content information from a plurality of media content services, wherein the requesting comprises requesting the media content information from (i) at least one third remote computing device associated with a first media content service and (ii) at a least one fourth remote computing device associated with a second media content service;
receiving, independent of the voice assistant service first information from the at least one third remote computing device and second information from the at least one fourth remote computing device, wherein the first information identifies first media content available via the first media content service for playback and the second information identifies second media content available via the second media content service for playback; and
after receiving at least one of the first information and the second information, (i) selecting, via the media playback system the first media content and forgoing selection of the second media content, (ii) transmitting a uniform resource identifier (URI) or uniform resource locator (URL) associated with the first media content from the one or more first remote computing devices of the media playback system to the NMD, and (iii) requesting, via the NMD, the first media content, via the URI or URL, from the at least one third remote computing device of the first media content service for playback, and (iv) playing back the first media content via the NMD.

9. The media playback system of claim 8, the operations further comprising:
transmitting, via the media playback system, a request for a voice response to the one or more second computing devices of the voice assistant service, wherein the request for the voice response is based at least on one of the first information and the second information; and
receiving and playing back, via the media playback system, the voice response.

10. The media playback system of claim 9, wherein the voice response is at least one of (a) a request for additional information regarding the request for media content, and (b) an acknowledgement of receipt of the request for media content.

11. The media playback system of claim 9, wherein the voice response identifies the first media content available via the first media content service, the first media content service, the second media content available via the second media content service, and the second media content service.

12. The media playback system of claim 8, the operations further comprising, (i) after receiving the selection initiating the playback of the first media content, and (ii) after initiating the playback of the first media content, transmitting a request for a voice response to the one or more second remote computing devices of the voice assistant service.

13. The media playback system of claim 8, wherein the derived intent information comprises a predefined data structure including one or more media content attributes, and wherein requesting media content information from the plurality of media content services comprises querying the media content services for media corresponding to the media content attributes.

14. Tangible, non-transitory, computer-readable media storing instructions executable by one or more processors to cause a media playback system to perform operations comprising:
capturing voice input via a network microphone device (NMD) of a media playback system, the media playback system comprising one or more local network devices, including the network microphone device, within a physical environment and one or more first remote computing devices, wherein the voice input comprises a request for media content;

transmitting the voice input from the media playback system to one or more second remote computing devices associated with a voice assistant service for deriving intent information regarding the request for media content based at least on the voice input;

receiving, at the media playback system, a response from the one or more second remote computing devices associated with the voice assistant service, wherein the response comprises the derived intent information;

based at least in part on the derived intent information, requesting, independent of the voice assistant service, media content information from a plurality of media content services, wherein the requesting comprises requesting the media content information from (i) at least one third remote computing device associated with a first media content service and (ii) at a least one fourth remote computing device associated with a second media content service;

receiving, at the media playback system and independent of the voice assistant service, first information from the at least one third remote computing device and second information from the at least one fourth remote computing device, wherein the first information identifies first media content available via the first media content service for playback and the second information identifies second media content available via the second media content service for playback; and after receiving at least one of the first information and the second information, (i) selecting, via the media playback system, the first media content and forgoing selection of the second media content, (ii) transmitting a uniform resource identifier (URI) or uniform resource locator (URL) associated with the first media content from the one or more first remote computing devices of the media playback system to the NMD, and (iii) requesting, wia the NMD, the first media content, wia the URI or URL, from the at least one third remote computing device of the first media content service for the playback, and (iv) playing back the first media content via the NMD.

15. The tangible, non-transitory, computer-readable media of claim 14, the operations further comprising:
transmitting, via the media playback system, a request for a voice response to the one or more second computing devices of the voice assistant service, wherein the request for the voice response is based at least on one of the first information and the second information; and
receiving and playing back, via the NMD, the voice response.

16. The tangible, non-transitory, computer-readable media of claim 15, wherein the voice response is at least one of (a) a request for additional information regarding the request for media content, and (b) an acknowledgement of receipt of the request for media content.

17. The tangible, non-transitory, computer-readable media of claim 15, wherein the voice response identifies the first media content available via the first media content service, the first media content service, the second media content available via the second media content service, and the second media content service.

18. The tangible, non-transitory, computer-readable media of claim 14, the operations further comprising, (i) after receiving the selection initiating the playback of the first media content, and (ii) after initiating the playback of the first media content, transmitting a request for a voice response to the one or more second remote computing devices of the voice assistant service.

19. The tangible, non-transitory, computer-readable media of claim 14, the operations further comprising, wherein the derived intent information comprises a predefined data structure including one or more media content attributes, and wherein requesting media content information from the plurality of media content services comprises querying the media content services for media corresponding to the media content attributes.

* * * * *

UNITED STATES PATENT AND TRADEMARK OFFICE
CERTIFICATE OF CORRECTION

PATENT NO. : 11,175,880 B2  
APPLICATION NO. : 16/109375  
DATED : November 16, 2021  
INVENTOR(S) : Liu et al.

Page 1 of 1

It is certified that error appears in the above-identified patent and that said Letters Patent is hereby corrected as shown below:

In the Claims

In Column 35, in Claim 1, Line 4, delete "comprising" and insert -- computing --, therefor.

In Column 36, in Claim 8, Line 2, delete "at a" and insert -- at --, therefor.

In Column 36, in Claim 8, Line 5, after "service" insert -- , --.

In Column 36, in Claim 8, Line 16, after "system" insert -- , --.

In Column 37, in Claim 14, Line 18, delete "at a" and insert -- at --, therefor.

In Column 37, in Claim 14, Line 38, after "requesting," delete "wia" and insert -- via --, therefor.

In Column 37, in Claim 14, Line 38, after "content," delete "wia" and insert -- via --, therefor.

In Column 38, in Claim 14, Line 2, delete "the playback," and insert -- playback, --, therefor.

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*